Figure 1:
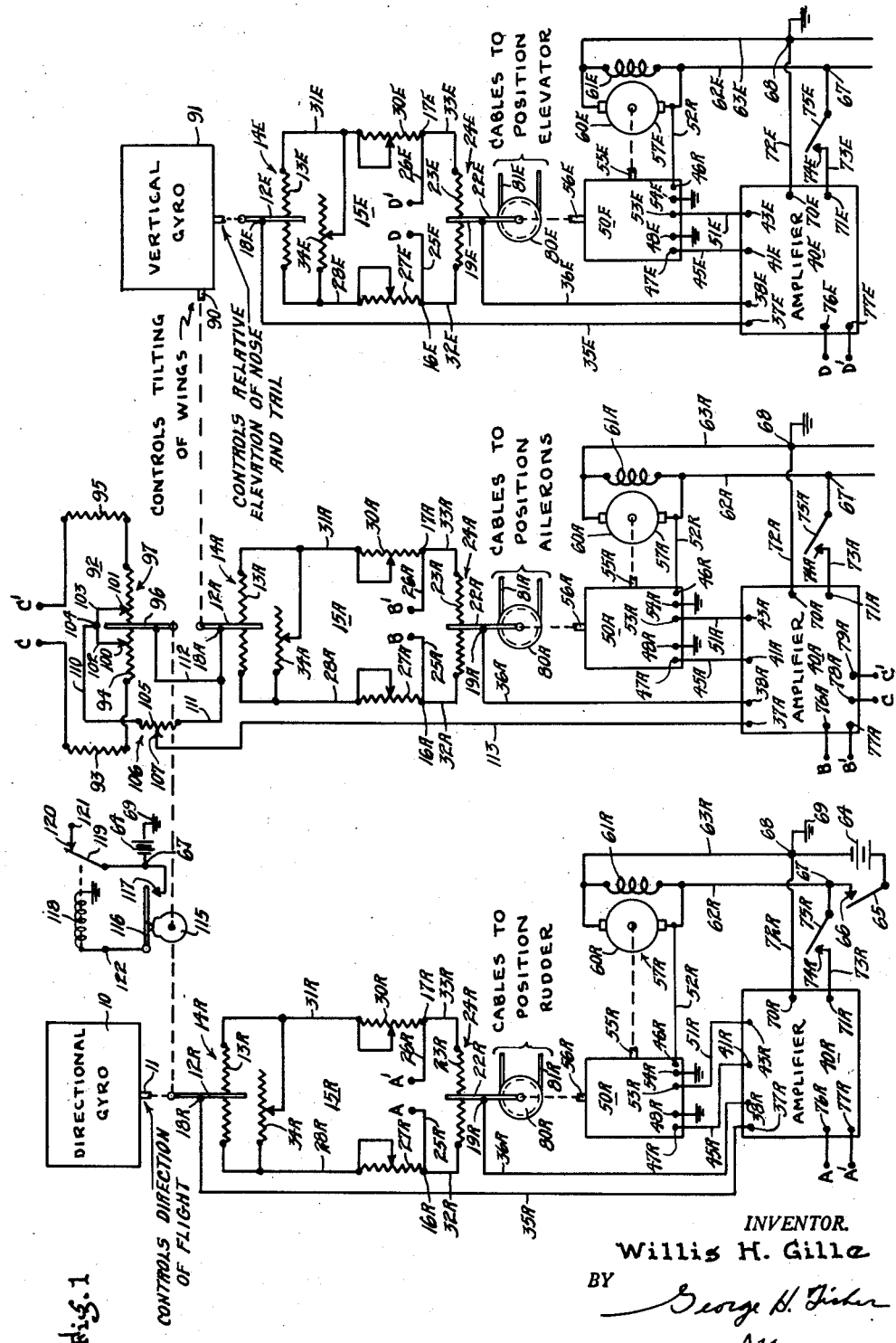

April 24, 1962 W. H. GILLE 3,031,158
AIRCRAFT CONTROL APPARATUS
Filed June 22, 1942 6 Sheets-Sheet 1

INVENTOR.
Willis H. Gille
BY
George H. Fisher
Attorney

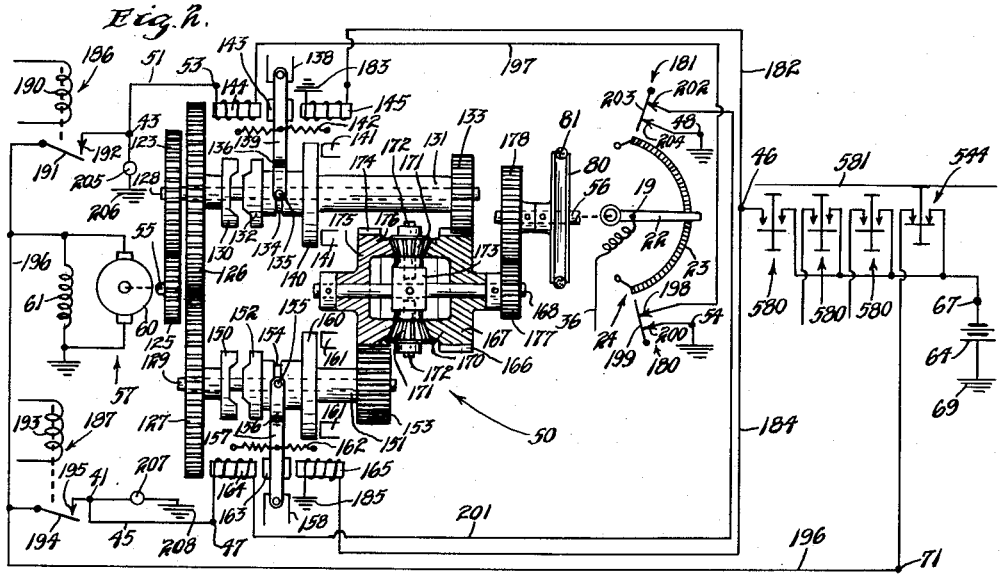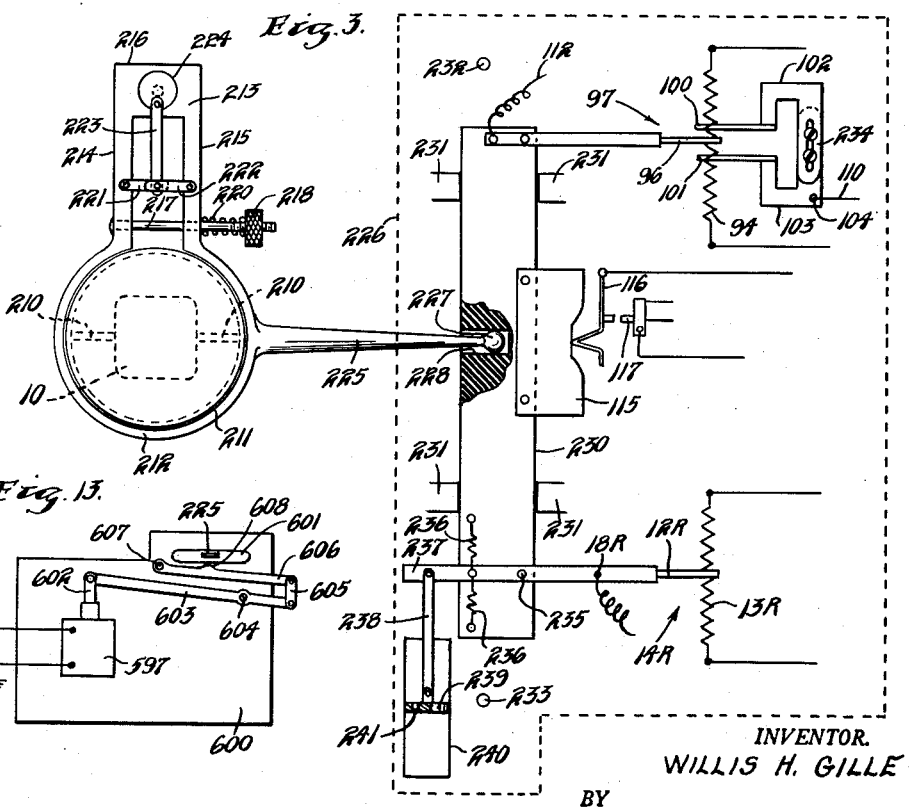

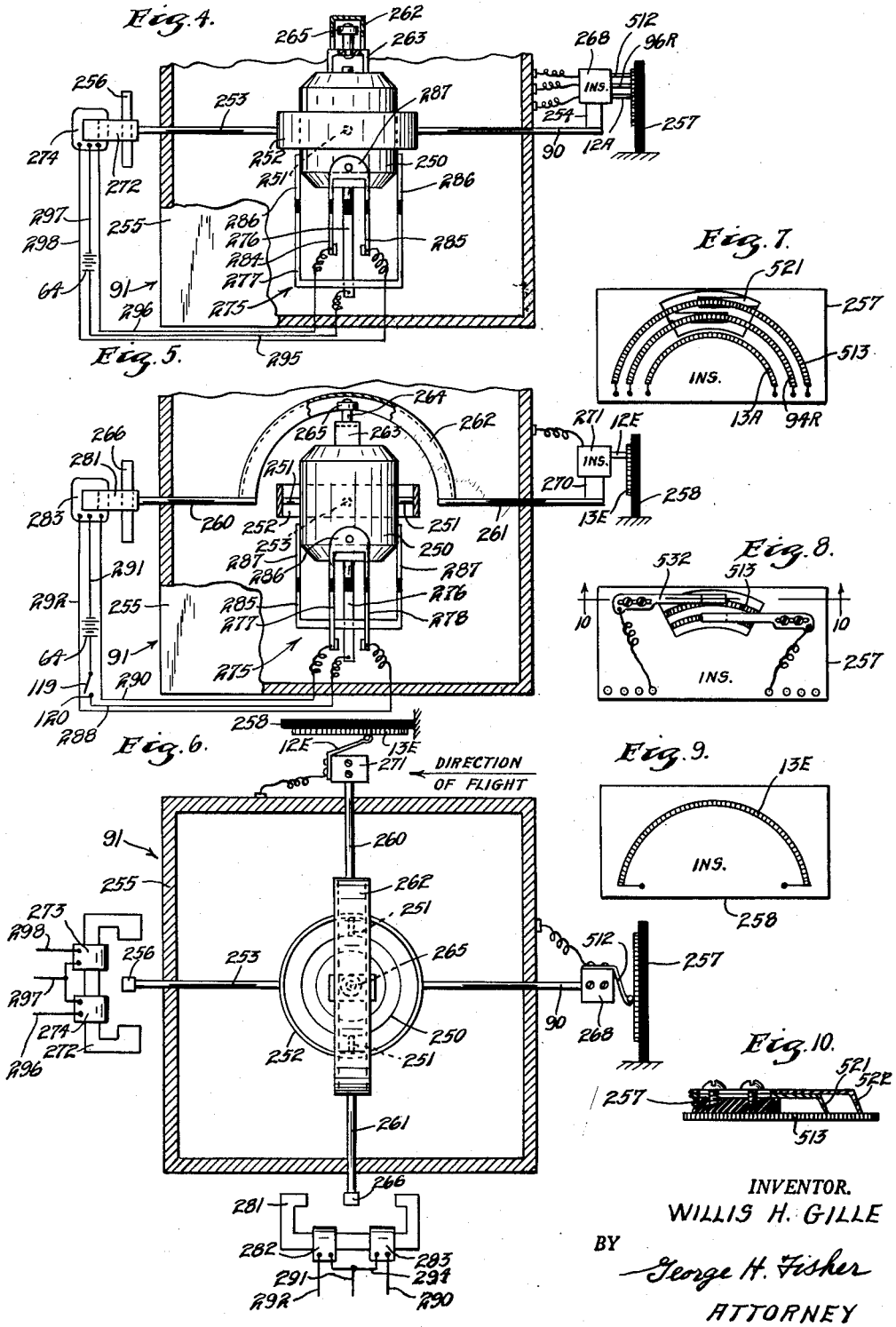

April 24, 1962 W. H. GILLE 3,031,158
AIRCRAFT CONTROL APPARATUS
Filed June 22, 1942 6 Sheets-Sheet 4

INVENTOR.
Willis H. Gille
BY
George H. Fisher
Attorney

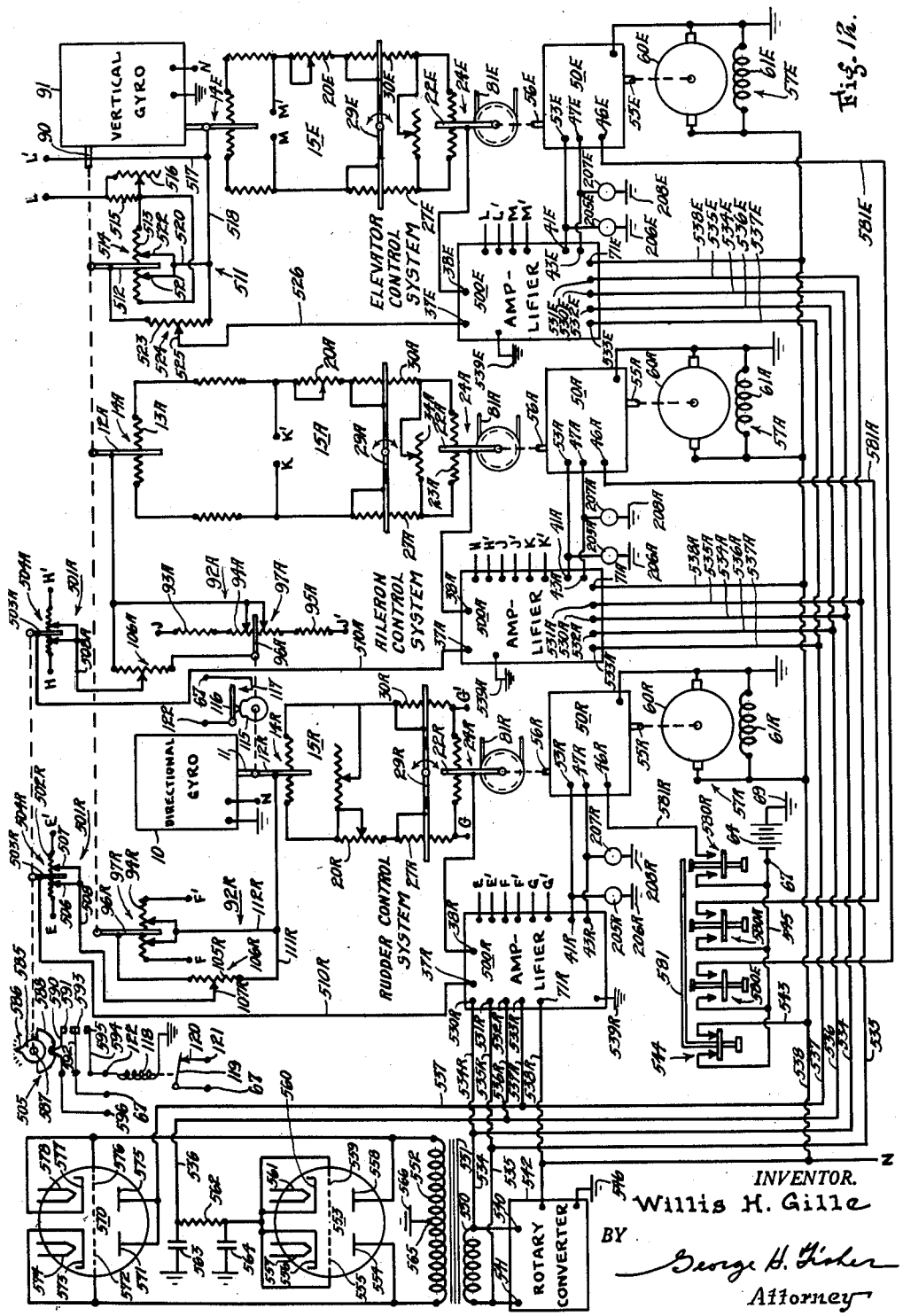

April 24, 1962 W. H. GILLE 3,031,158
AIRCRAFT CONTROL APPARATUS
Filed June 22, 1942 6 Sheets-Sheet 6
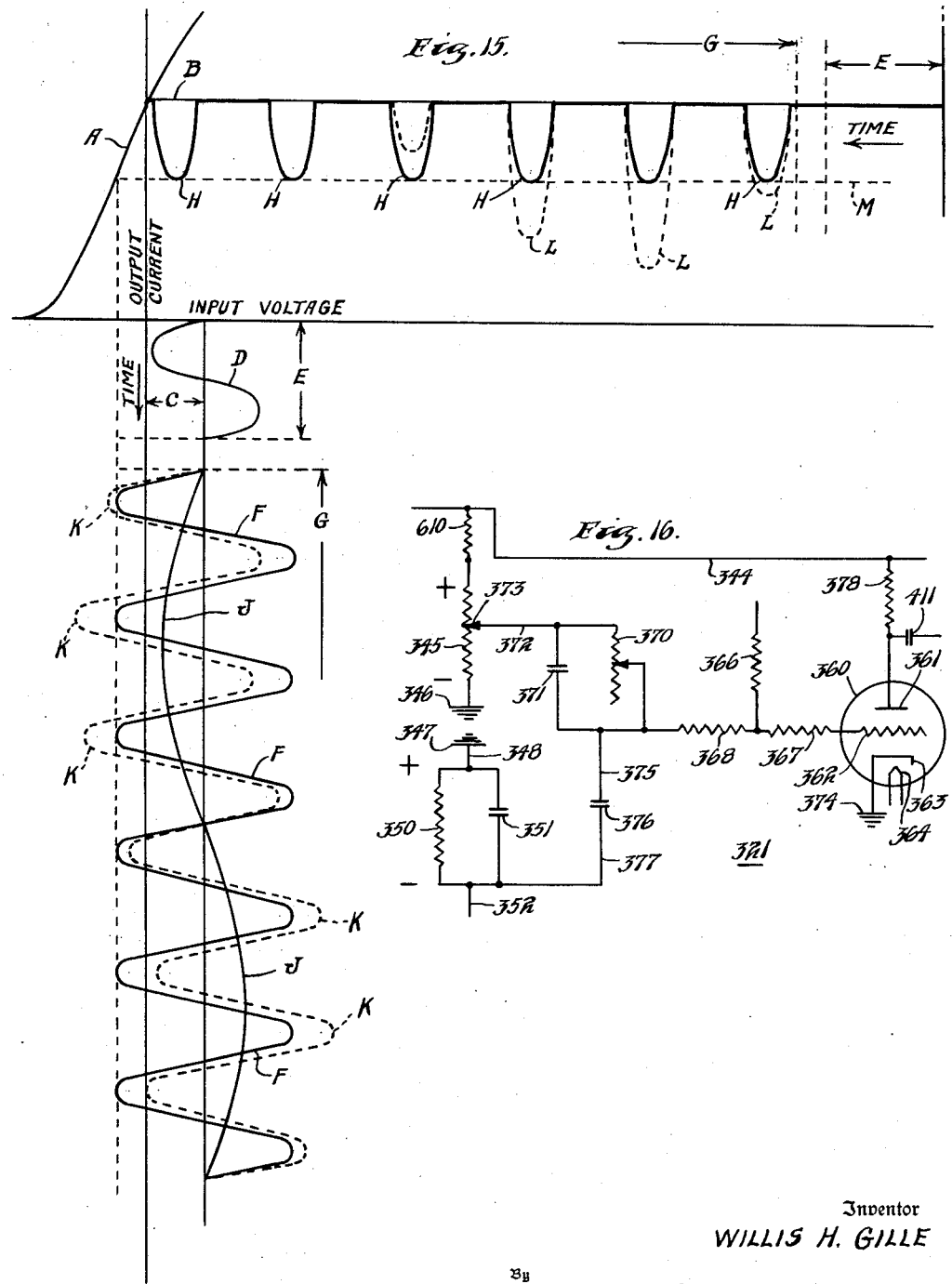
Inventor
WILLIS H. GILLE
By
George H. Fisher
Attorney

United States Patent Office 3,031,158
Patented Apr. 24, 1962

3,031,158
AIRCRAFT CONTROL APPARATUS
Willis H. Gille, St. Paul, Minn., assignor to Minneapolis-Honeywell Regulator Company, Minneapolis, Minn., a corporation of Delaware
Filed June 22, 1942, Ser. No. 447,989
108 Claims. (Cl. 244—77)

The present invention relates generally to automatic control systems for positioning a movable member, and more particularly to apparatus for positioning the flight controlling surfaces of an aircraft.

In an aircraft of conventional type, the direction of flight is controlled by a rudder, usually mounted at the rear of the fuselage and movable about a vertical axis. The tilting of the wings is controlled by a pair of horizontal control surfaces termed ailerons, one mounted near the extremity of each wing and movable about a horizontal axis. The attitude, or angle of attack, is controlled by one or more horizontal control surfaces termed elevators, mounted usually at the rear of the fuselage and movable about a horizontal axis. The terms "attitude" and "angle of attack" have reference to the relative elevations of the nose and tail of the plane. The control surfaces are normally in a position where they present little or no resistance to the stream of air moving past the plane. When it is desired to turn the plane or otherwise change its position, the proper control surface is deflected into the air stream, and the reactive force set up by the air stream against the control surface moves the plane in the desired direction.

The positioning of the various control surfaces is conventionally done manually by the pilot. It has been proposed, however, to operate the rudder automatically by means of a servo-motor under the control of a direction-indicating device, such as a compass or directional gyroscope. It has also been proposed to operate the ailerons and elevators automatically by means of servo-motors under the control of an "artificial horizon," such as a gyroscope rotating about a vertical axis, and free to move about either of two mutually perpendicular horizontal axes.

When an aircraft turns, a considerable centrifugal force is set up, which, if unopposed, causes the aircraft to move radially with respect to the axis of curvature about which the plane is turned. Such forces are customarily opposed by banking the aircraft, that is, by tilting the wings so that the aircraft encounters greater resistance from the air in the direction of radial movement. For any given aircraft, operating at a given speed and moving along a curve of predetermined radius, there is a certain angle of bank which will make the resistance of the air to radial movement equal to the centrifugal force. If the ailerons are operated so as to impart this angle of bank to the aircraft, it will move along a true arc without any radial movement. If the angle of bank is too small, the air resistance to radial movement is too small, and the aircraft moves radially outward from the center of curvature of the arc. Under these conditions, the aircraft is said to "skid." On the other hand, if the angle of bank is too large, the wings do not provide sufficient lifting surface to maintain the altitude of the craft, and it moves toward the center of curvature of the arc. Under these conditions, it is said to "slip."

A system for automatically operating the control surfaces of an aircraft must coordinate the control of the rudder and ailerons if skidding or slipping on the turns is to be prevented. While previous attempts have been made to coordinate these controls, such coordinated control systems have been more or less imperfect, in that they failed to completely prevent skidding or slipping on the turns. I have discovered a new principle of coordination for such controls which entirely prevents skidding or slipping when properly applied to the control system. This principle and its application to a flight control system are outstanding features of the present invention.

I have found that while a certain predetermined deflection of the control surfaces of an aircraft may be necessary to change the craft from straight level flight to flight along a desired arcuate course at a predetermined degree of bank, that after the craft has been changed to the desired arcuate course and bank, a lesser deflection of the control surfaces is sufficient to maintain it on the arcuate course. Furthermore, if the original deflection of the control surfaces is maintained, skidding or slipping of the craft from the true arcuate course will occur. This new principle may therefore be defined as a reduction in the deflection of the control surfaces after a response of the craft to an original deflection.

Furthermore, it has been found that such a reduction in the deflection of the control surfaces is in some cases not desirable, from a practical standpoint, unless the original deflection exceeds a predetermined amount, and that in some instances, to properly maintain stability of the aircraft, the rudder and aileron controls should operate independently of each other as long as the radius of curvature and the angle of bank are small. The present invention therefore comprises improved means for coordinating the rudder and aileron operation in an automatic flight control system so as to improve banking on the turns, and additional means for maintaining the rudder and aileron controls independent for small movements of those surfaces where such operation is desired. It has been noted that the turn radius and angle of bank at which coordination of these controls should begin differs for different aircraft, and means have therefore been provided in the present invention for adjusting the minimum values of turn radius and angle of bank at which the interaction of these controls is initiated.

I have also found that in order to bank an aircraft perfectly, an adjustment of the position of the elevator surfaces must be made. I have therefore provided in the control system described herein, means for automatically making such an adjustment when the aircraft is banked.

It is well-known that many conditions such as "roughness" of the air, the speed of the aircraft and the density of the air, which is in turn affected by altitude, temperature, and weather conditions, must be considered by the pilot in operating the control surfaces of an aircraft. For example, the pilot does not attempt, in rough air, to maintain the craft perfectly level at all times, but lets it bounce, or wallow, to a certain extent away from the desired course or position before he moves any of the control surfaces to correct its position. With regard to the effect of air speed and air density, it will be readily understood that the reactive force available at a control surface to change the position of an aircraft is greater for a given deflection of the control surface when the craft is travelling at high speeds than at low speeds, and is greater when the air density is high than when the air density is low. Therefore, in order to produce equal controlling effects on the position of the aircraft, the deflections of the control surfaces should be reduced at high speeds and high air densities, and increased at low speeds and low air densities.

Where the control surfaces are operated manually, the pilot must take these variable factors into account. In automatic flight control systems built in accordance with the present invention, means have been provided whereby the pilot can introduce compensating adjustments to change the sensitivity of the system and to change the amount of control surface movement in response to a given change in the controlling condition. For example, in that part of the system where a directional gyroscope controls the rudder, the pilot is provided with means to determine the amount of movement of the gyroscope which may take place before the rudder is moved, and with other means by which he may determine the amount of rudder deflection produced in response to a given movement of the gyroscope.

It has also been found desirable to move the control surfaces of an aircraft at a rate variable in accordance with the magnitude of the departure of the craft from its desired position. The present invention includes improved means for accomplishing this result.

On a large aircraft, it requires considerable exertion on the part of the pilot to operate the control surfaces. When an automatic flight control system is used, other motive power is available for operating the control surfaces. In order to reduce the burden placed upon the pilot, I have provided in the flight control system described herein, means whereby the pilot may manually control the motive power for the control surfaces by manipulating simple control devices which are easily operated manually without the exertion of any appreciable force.

It is therefore an object of the present invention to provide an improved system for controlling the operation of the flight control surfaces of an aircraft.

Another object of the present invention is to provide a flight control system for aircraft wherein the movements of the rudder, ailerons, and elevator are coordinated so as to permit turning of the aircraft substantially without skidding or sideslipping. A further object is to provide, in such a system, means for simultaneously operating the rudder and ailerons so as to produce a properly banked turn, and means for automatically deflecting the elevator so as to maintain the altitude of the aircraft during the turn.

A further object of the present invention is to provide, in an automatic flight control system for aircraft, improved means whereby the pilot may make adjustments to compensate for various external flight conditions which affect the operation of the control surfaces. A still further object is to provide, in such a system, means whereby the pilot may adjust the position of any control surface with respect to the position of the device which controls it; means whereby the pilot may adjust the ratio between a given movement of the controlling device and the responsive movement of the control surface; means whereby the pilot may adjust the sensitivity of the system, i.e., the minimum movement of the controlling device which will cause a responsive movement of the control surface; and means whereby the pilot may adjust the rate at which the control surface is moved in response to a movement of the controlling device.

A further object is to provide an improved electrical motor control system, wherein the motor is operated at a variable rate depending on the magnitude of a controlling condition. A still further object is to provide, in such a motor control system, means responsive to a controlling condition for operating the motor intermittently when the controlling condition departs slightly from a predetermined value and for operating the motor continuously when the condition departs to a greater extent from that value.

Another object of the present invention is to provide a motor control system including a condition responsive device for producing a continuously variable electrical signal, and an electronic amplifier for controlling a motor in response to that signal, wherein the amplifier is provided with means wherein it produces an intermittent output when the signal is relatively small, and a continuous output when the signal is relatively large.

A further object of the present invention is to provide an improved electronic amplifier circuit whose output is selectively intermittent or continuous, depending on the magnitude of the input signal.

Another object of my invention is to provide an improved power supply for a system including a plurality of electronic amplifier units.

Another object of my invention is to provide an automatic flight control system including improved means whereby the pilot of an aircraft may control a suitable source of mechanical energy for operating the control surfaces.

Figure 11:
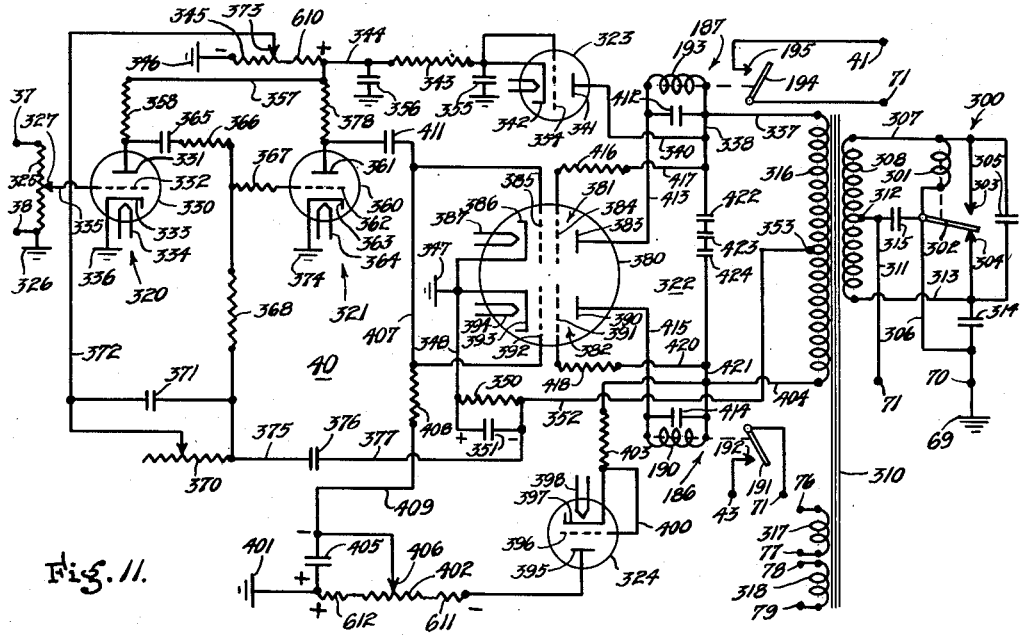
Figure 14:
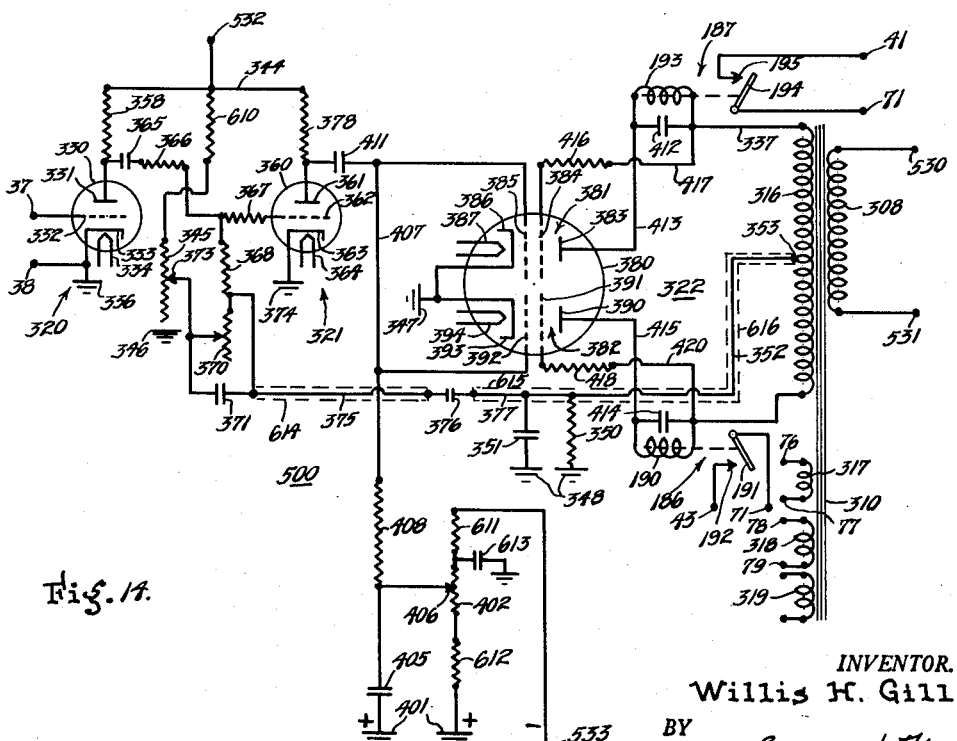

Other objects and advantages of my invention will become apparent from a consideration of the appended specification, claims, and drawings, in which FIGURE 1 represents, somewhat diagrammatically, a relatively simple electrical flight control system embodying certain features of my invention, FIGURE 2 is a schematic illustration of a servo-motor unit used in the system of FIGURE 1, FIGURE 3 is a somewhat diagrammatic illustration of certain electrical control devices operated by a directional gyroscope and used in the system of FIGURE 1, FIGURE 4 is a somewhat schematic front elevational view, partly in section, of a vertical gyroscope and electrical control devices operated thereby and used in the system of FIGURE 1, FIGURE 5 is another somewhat schematic side elevational view of the gyroscope and control devices of FIGURE 4, FIGURE 6 is a somewhat schematic plan view of the gyroscope and control devices of FIGURES 4 and 5, certain parts being omitted for the sake of clarity, FIGURES 7 and 8 are detail views of one of the electrical control devices of FIGURES 4, 5 and 6, FIGURE 9 is a detail view of another of the electrical control devices of FIGURES 4, 5 and 6, FIGURE 10 is a detail sectional view of a portion of the control device of FIGURES 7 and 8, FIGURE 11 is a circuit diagram of an electronic amplifier used in the system of FIGURE 1, FIGURE 12 represents, somewhat diagrammatically, a complete flight control system embodying additional features of my invention, FIGURE 13 is a somewhat diagrammatic illustration of a control device used in the system of FIGURE 12, FIGURE 14 is a circuit diagram of an electronic amplifier unit used in the system of FIGURE 12, FIGURE 15 is a graphical illustration of the operation of a portion of the circuit of FIGURE 11, and FIGURE 16 is a portion of the circuit of FIGURE 11, redrawn so that the relationship of the circuit elements to each other may be more clearly understood.

There is shown in FIGURE 1, somewhat diagrammatically, a system for controlling the rudder, ailerons, and elevators of an aircraft. This system may be considered as comprising motors for each of the control surfaces, and more or less separate motor control systems for each motor. Since there are corresponding, fully equivalent elements in each of the three motor control systems, the complete details of the rudder control system only are described herein. The corresponding elements of the three systems bear reference characters which include numerals corresponding to the particular elements, and letters identifying the particular system. Each element of the rudder control system bears a reference numeral followed by the letter R, while the corresponding elements of the aileron and elevator control systems bear the same reference numeral followed by the letters A and E, respectively.

Referring now to FIGURE 1, there is shown a direction-responsive device 10 which is adapted to rotate a shaft 11 in accordance with the deviation from a predetermined course of an aircraft on which the device 10 is mounted. The device 10 may be a compass of either the magnetic or any well known type, or any other suitable direction-responsive device. For the purposes of the present illustration, it is indicated by way of example, that the device 10 is a directional gyroscope.

Fixed on the shaft 11 for rotation therewith is a slider 12R which cooperates with a slide wire resistance 13R. The slider 12R and the slidewire resistance 13R together form a potentiometer generally indicated at 14R, hereinafter referred to as the rudder control potentiometer. The potentiometer 14R forms a part of a balanced circuit generally indicated at 15R, and hereinafter referred to as the rudder control network. The rudder control network 15R is a balanced circuit generally of the Wheatstone bridge type, and includes input terminals 16R and 17R, and output terminals 18R and 19R. Output terminal 18R is in electrical connection with slider 12R, and output terminal 19R is in electrical connection with a slider 22R which cooperates with a slidewire resistance 23R. Slider 22R and slidewire 23R together form a potentiometer hereinafter referred to as the rudder rebalancing potentiometer. Input terminals 16R and 17R of rudder control network 15R are connected through conductors 25R and 26R, respectively, to power supply terminals A and A'.

The network 15R includes the customary four branches of a Wheatstone bridge circuit connecting each of the input terminals with each of the output terminals. The upper left branch of network 15R connects input terminal 16R and output terminal 18R, and may be traced from input terminal 16 through a variable resistance 27R, a conductor 28R, and the left hand part of slidewire resistance 13R to slider 12R and output terminal 18R. The upper right branch of the network 15R connects input terminal 17R with output terminal 18R and may be traced from input terminal 17R through a variable resistance 30R, a conductor 31R, and the right hand section of slidewire resistance 13R to slider 12R and output terminal 18R. The lower left branch of network 15R connects input terminal 16R with output terminal 19R and may be traced from input terminal 16R through a conductor 32R and the left hand section of slidewire resistance 23R to slider 22R and output terminal 19R. The lower right branch of network 15R connects input terminal 17R with output terminal 19R and may be traced from input terminal 17R through a conductor 33R and the right hand section of slidewire resistance 23R to slider 22R and output terminal 19R.

The variable resistance devices 27R and 30R are hereinafter referred to as the rudder centering adjustment rheostats, for reasons to be more fully set forth in the description of the operation of this system.

A variable resistance device 34R is connected in parallel with the slidewire resistance 13R. The resistance device 34R is hereinafter referred to as the rudder ratio adjusting rheostat, for reasons to be described in connection with the operation of this system.

Output terminals 18R and 19R of rudder control network 15R are connected through conductors 35R and 36R, respectively, to input terminals 37R and 38R of an amplifier and power supply unit 40R, which, for the sake of simplicity, will be hereinafter referred to as the amplifier 40R.

The amplifier 40R, which is described in detail in connection with FIGURE 11, operates to selectively control the energization of a pair of output terminals 41R and 43R. Output terminals 41R and 43R are connected by conductors 45R and 51R, respectively, to terminals 47R and 53R on a power transmission unit indicated schematically at 50R. The power transmission unit 50R is provided with a pair of grounded terminals 48R and 54R.

Power transmission unit 50R is provided with a power input shaft 55R and a power output shaft 56R. Power input shaft 55R is continuously rotated in one direction by a direct current shunt motor 57R, having an armature 60R and a field winding 61R. The terminals of armature 60R and field winding 61R are connected through conductors 62R and 63R to the terminals of a suitable source of electrical energy, shown as a battery 64. A switch including a switch arm 65 which is operable into engagement with a stationary contact 66 is connected in the conductor 62R, so that the motor 57R may be deenergized. The conductor 63R is connected to ground at 69, thereby grounding one terminal of battery 64.

The amplifier 40R is provided with power input terminals 70R and 71R. Terminal 70R is connected through a conductor 72R to the grounded terminal of battery 64. Power input terminal 71R is connected through a conductor 73R, in which a switch comprising a stationary contact 74R and a movable contact arm 75R is inserted, to conductor 62R, and thence to the opposite terminal of battery 64.

Amplifier 40R is also provided with a pair of power output terminals 76R and 77R, which are connected through suitable conductors to power supply terminals A, A' of the rudder control network 15R.

There is mounted on power output shaft 56R of the servo-motor unit 50R, a pulley 80R over which passes a cable 81R, the ends of which are connected to suitable mechanism for operating the rudder of the aircraft on which the system is mounted. The slider 22R of the rudder rebalancing potentiometer 24R is also fixed on the shaft 56R to rotate therewith.

*Operation of Rudder Control in FIGURE 1*

When the parts are in the positions shown in the drawing, the control slider 12R and the follow-up slider 22R are engaging the mid-points of their respective slidewires. Furthermore, the centering rheostats 27R and 30R have equal settings. Under these conditions, the electrical potentials of the output terminals 18R and 19R of network 15R are both equal to the median potential of the source of energy connected to input terminals 16R and 17R. Since there is no potential difference between output terminals 18R and 19R, no signal is applied to the signal input terminals 37R and 38R of amplifier 40R.

The amplifier 40R operates, as more fully described hereinafter in connection with FIGURE 11, in such a manner that when no signal appears at the signal input terminal 37R and 38R, neither output terminal 41R nor 43R is energized. When an alternating signal voltage is impressed on the signal input terminals 37R and 38R, either of the output terminals 41R or 43R is energized, depending upon the phase of the input signal.

As previously described, the power input shaft 55R of power transmission unit 50R is continuously rotated by the motor 57R. The operation of power transmission unit 50R is fully described in connection with FIGURE 2. It may now be stated, however, that when no current flows either in the circuit including terminals 47R and 48R or in the circuit including terminals 53R and 54R, the power output shaft 56R is stationary. When the circuit including terminals 47R and 48R is energized, or when the circuit including terminals 53R and 54R is energized, a connection is completed between power input shaft 55R and power output shaft 56R, such that the shaft 56R is rotated in one direction or the other, selectively, depending upon which of the two circuits mentioned is energized.

Summarizing, it may be stated that the operation of amplifier 40R and operation power transmission unit 50R are such that when an alternating potential of the same phase as that applied to input terminals 16R and 17R of network 15R is impressed on the signal input terminals 37R and 38R, the shaft 56R is rotated in a counter-clockwise direction so as to move slider 22R to the left along slide wire resistance 23R. On the other hand, when an alternating signal of phase opposite to that of the potential supplied to input terminals 16R and 17R is impressed on signal input terminals 37R and 38R, the power output shaft 56R is rotated in a clockwise direction, thereby moving slider 22R to the right along slidewire resistance 23R. When no signal is impressed on signal input terminals 37R and 38R, the shaft 56R remains stationary.

As long as the aircraft stays on the course which the directional gyroscope 10 has been set to maintain, the slider 12R is held stationary in the center of the slidewire resistance 13R. When the aircraft deviates from the established course, the directional gyro 10 moves the slider 12R along the resistance 13R. For example, let it be assumed that the aircraft deviates from its course in such a direction that the slider 12R is moved to the left along the slidewire 13R from the center thereof. When this movement takes place, it will be seen that the potential of output terminal 18R is changed to a value closer to that of input terminal 16R than that of input terminal 17R. There is then a potential difference between output terminals 18R and 19R, and the phase of this potential difference is the same as that of the voltage applied to input terminals 16R and 17R. This potential difference is impressed as a signal on the signal input terminals 37R and 38R of amplifier 40R. As previously described, a potential of this phase impressed on the terminals 37R and 38R acts through the amplifier 40R and the power transmission unit 50R to cause rotation of power output shaft 56R in a counter-clockwise direction. This rotation of shaft 56R acts through pulley 80R and cables 81R to apply a corrective deflection to the rudder (not shown) so as to restore the aircraft to its predetermined course. At the same time, the slider 22R is moved to the left along slidewire resistance 23R. When the slider 22R reaches a position such that the potential of output terminal 19R is equal to the new potential of output terminal 18R, no further signal is applied to the amplifier signal input terminals 37R and 38R, and rotation of shaft 56R ceases.

Because of the corrective deflection of the rudder, the aircraft returns to its established course. As the aircraft returns to its established course, the directional gyroscope 10 moves the slider 12R to the right along resistance 13R, back towards its center position. As this motion takes place, it will be seen that the potential of output terminal 18R becomes closer to that of input terminal 17R than that of the output terminal 19R. Therefore a potential difference again exists between output terminals 18R and 19R, but this time its phase is opposite to that of the voltage impressed on the input terminals 16R and 17R. This potential difference is impressed on the amplifier signal input terminals 37R and 38R, and acts through amplifier 40R and servo-motor unit 50R to cause rotation of shaft 56R in a clockwise direction. This rotation of shaft 56R acts through pulley 80R and cable 81R to restore the rudder to its normal position, and also moves the slider 22R to the right along slidewire resistance 23R. When the slider 22R reaches the position shown on the drawings, no potential difference exists between output terminals 18R and 19R, and the motion of shaft 56R is stopped.

It will be readily understood by those skilled in the art that if the aircraft deviates from its course in such a direction as to move slider 12R to the right, the system responds in a manner entirely analogous to that previously described. The shaft 56R is first rotated clockwise to apply a corrective deflection to the rudder and to move the slider 22R to the right along slidewire resistance 23R so as to rebalance the network 15R. After the aircraft has returned to its established course because of the deflection of the rudder, the slider 12R is moved back to its center position by the directional gyroscope 10, and the system responds to drive shaft 56R counter-clockwise to remove the corrective deflection from the rudder and to drive slider 22R to the left back to the center position shown on the drawing.

The rudder centering rheostats 27R and 30R are preferably mounted in the pilot's compartment where he may operate them manually. Operation of these rheostats changes the position of slider 22R with respect to slidewire 23R at which the network 15R is balanced. For example, assume that rheostat 27R is operated so that its resistance is increased and that rheostat 30 is operated so that the resistance of rheostat 30R is decreased. It will be readily understood that by such operation the potential at the slider 12R is made to approach closer to that of the input terminal 17R. A potential difference then exists between output terminals 18R and 19R which is opposite in phase to the potential applied to the input terminals 16R and 17R. This unbalance potential is applied to the signal input terminals 37R and 38R of amplifier 40R, thereby causing shaft 56R to be rotated clockwise so as to move slider 22R to the right along resistance 23R and rebalance network 15R. It will be readily understood that this action produces a deflection of the rudder which is maintained as long as the rheostats 27R and 30R remain in their adjusted positions. It will be seen that these centering rheostats, in effect, permit manual adjustment of the rudder position which the system maintains when the rudder control potentiometer 14R is in a given position. The centering rheostats are used, for example, to accurately center the rudder in case it is found that for some reason the system tends to maintain the rudder in a slightly deflected position. They may also be used to produce a deflection of the rudder to counteract some unbalance effect acting on the aircraft. For instance, in a multi-motored aircraft, if it becomes necessary to operate the motors at different horsepower outputs, the unbalance produced by the difference in the driving forces acting on opposite sides of the aircraft may be counteracted through the introduction of an opposing rudder deflection.

The ratio adjusting rheostat 34R operates to determine the amount of movement of the rebalancing slider 22R necessary to rebalance the network 15R after a given movement of control slider 12R. It will be readily understood that rheostat 34R, by changing the resistance connected in parallel with slidewire resistance 13R, changes the total difference of potential between the terminals of the slidewire resistance 13R. When the total potential difference across resistance 13R is changed, the voltage drop per unit length of resistance 13R is also changed. The voltage drop per unit length of the slidewire resistance 23R, however, remains constant. When slider 12R moves through a distance corresponding to a certain potential difference along the slidewire resistance 13R, the slider 22R must move along the resistance 23R a sufficient distance to cover the same potential difference in order to rebalance the network 15R. It may therefore be readily seen that if the potential change per unit length of resistance 13R is changed, the distance which the slider 22R must move to rebalance a given movement of slider 12R is also changed.

The ratio adjusting rheostat 34R is also under the control of the pilot. This rheostat enables the pilot to compensate the control system for differences in the controlling effect obtained from a given deflection of the rudder due to changes in air speed of the aircraft, density of the air as affected by temperature, altitude, and weather conditions, and for other causes. For example, when an aircraft is operating at low speed it may require a considerable deflection of the rudder to turn the craft in a circle of given radius. When the same aircraft is operating at high speed, the reactive force on the control surface, such as the rudder, is much greater, and only a small deflection of the rudder will be needed to produce the desired change of course. Similarly, a considerable deflection of the rudder may be necessary to produce a given turning effect when the aircraft is moving through air of low density such as may be encountered at high altitudes, while a much smaller deflection of the rudder will produce the same turning effect when the plane is moving through air of greater density at low altitudes.

Aileron Control System of FIGURE 1

The aileron control system of FIGURE 1 includes an aileron control network 15A, an amplifier 40A and a power transmission unit 50A, each of which is equivalent to the corresponding part of the rudder control system.

The aileron control potentiometer 14A has a slider 12A operated by a shaft 90 which is rotated by a vertical gyroscope indicated schematically at 91. The vertical gyroscope 91 is described more fully in connection with FIGURES 4, 5 and 6. For the present, it is sufficient to say that the shaft 90 is rotated in accordance with the movement of the plane about an axis extending longitudinally through the aircraft from nose to tail. When the plane tilts from its normal position with respect to this axis, the slider 12A is moved along the resistance 13A, causing a responsive deflection of the ailerons to restore the aircraft to its normal position.

The amplifier 40A is provided with an additional pair of power output terminals 78A and 79A, which are connected to power supply terminals C, C' of a network 92, hereinafter referred to as the aileron compensating network.

The compensating network 92 comprises a fixed resistance 93, a slidewire resistance 94 and a fixed resistance 95, all connected in series between the power supply terminals C, C'. The resistances 93 and 95 are provided to determine the potential drop across the slidewire resistance 94, and thereby the relative influence of potentiometers 14A and 97 on the aileron control system. Their values may be chosen as desired, or they may even be omitted. A slider 96 cooperates with the slidewire resistance 94. The slider 96 and the slidewire resistance 94 together form a potentiometer 97, hereinafter referred to as the aileron compensating potentiometer. Slider 96 is operated by shaft 11 of directional gyroscope 10 simultaneously with the operation of slider 12R of the rudder control potentiometer 14R. The slidewire resistance 94 is provided with a pair of spaced adjustable taps 100 and 101. Taps 100 and 101 are connected by conductors 102 and 103, respectively, to a junction 104. Connected between junction 104 and output terminal 18A of the aileron control network 15A is a slidewire resistance 105 forming part of a potentiometer 106, hereinafter referred to as the aileron compensation adjusting potentiometer. The potentiometer 106 includes, in addition to the slidewire resistance 105, a slider 107 movable with respect to the resistance 105. Movement of slider 107 is manually controlled by the pilot. The upper terminal of resistance 105 is connected to junction 104 by a conductor 110, and the lower terminal of resistance 105 is connected to output terminal 18A by a conductor 111. Conductor 111 and slider 96 are connected by a conductor 112. The slider 107 is connected to amplifier signal input terminal 37A by a conductor 113.

In addition to the rudder control potentiometer 14R and the aileron compensating potentiometer 97, the directional gyroscope 10 operates through shaft 11 a cam 115 which controls a switch arm 116. The switch arm 116 is biased into engagement with cam 115. When the shaft 11 is turned a predetermined amount in either direction from the angular position shown in the drawings, the cam 115 causes switch arm 116 to engage a stationary contact 117.

Engagement of switch arm 116 with contact 117 completes an energizing circuit for a relay winding 118. This circuit may be traced from the ungrounded terminal of battery 64 through contact 117, switch arm 116 and relay winding 118, and a ground connection to the grounded terminal of battery 64. Relay winding 118 controls a circuit through a switch arm 119, which normally engages a stationary contact 120, but is moved out of engagement with it when winding 118 is energized.

The function of the switch arm 116, relay winding 118, and switch arm 119 will be more completely described below in connection with FIGURES 4, 5 and 6.

*Operation of Aileron Control System*

The operation of the aileron control network 15A is entirely analogous to the operation of the rudder control network 15R. If the aircraft tips so that the vertical gyroscope 91 causes relative motion between the shaft 90 and the aircraft, the aileron control potentiometer 14A is actuated to cause a deflection of the ailerons and restore the aircraft to its desired position. However, this action is modified by the aileron compensating network 92 in a manner now to be described.

Referring now to the aileron compensating network 92, it may be stated that the purpose of this network is to connect to the signal input terminals 37A and 38A of amplifier 40A, an additional signal, which may be termed a compensating signal, in series with the output signal of control network 15A. This compensating signal consists of a portion of the potential drop across the resistance element 105, which portion may be varied by moving the slider 107. The total potential drop across slidewire resistance 105 is determined by the position of compensating slider 96 with respect to slidewire resistance 94. The taps 100 and 101, together with the conductors 102 and 103 connecting these taps, constitute a shunt around the central portion of the slide wire resistance 94. There is then no potential difference along this portion of the slidewire 94, which may therefore be termed a "dead spot." As long as slider 96 remains in contact with the dead spot on the slide wire resistance 94, there is no potential difference across the resistance 105, and no compensating signal is applied to amplifier 40A.

When slider 96 moves to the left beyond tap 100, or to the right beyond tap 101, a potential exists between slider 96 and junction 104, due to the current flowing in the series circuit between power supply terminals C, C' and including resistance 94. If the slider 96 is at the left of tap 100, for example, the potential of tap 96 will be closer to the potential of power supply terminal C and the potential of junction 104 will be closer to the potential of power supply terminal C'. A potential drop is therefore produced between slider 107 and output terminal 18A which is opposite in phase to the potential of the power supply terminals C, C'. Since the power supply terminals C, C' are supplied with potential in phase with that supplied to the terminals B, B' of control network 15A, then this signal, when impressed on amplifier input terminals 37A and 38A is of the proper phase to cause rotation of shaft 56A in a clockwise direction, thereby moving 22A to the right and causing cables 81A to deflect the aileron. This movement continues until a signal appears between output terminals 18A and 19A of control network 15A which is equal in magnitude and opposite in phase to the signal produced across the lower portion of resistance 105. When this occurs, the two signals oppose and balance each other, and the shaft 56A thereafter remains stationary.

When the compensating slider arm 96 reaches a point on slidewire 94 at the right of tap 101, an alternating potential is impressed across resistance 105, this alternating potential being such that the phase of the lower terminal of resistance 105 with respect to its upper terminal is the same as the phase of power supply terminal C' with respect to that of power supply terminal C. A portion of this potential across the resistance 105 is impressed on the amplifier signal input terminals 37A and 38A, thereby causing a response of power transmission unit 50A so as to drive rebalancing slider 22A to the left along slidewire 23A, thereby producing an unbalance potential at the output terminals 18A and 19A of network 15A. This operation continues until this unbalance potential has become equal in magnitude and opposite in phase to the portion of the potential across resistance 105 which is applied to the amplifier terminals. At this time, the net signal appearing at the amplifier signal input terminals is zero, and rotation of shaft 56A is stopped. It should therefore be apparent that a deflection of the ailerons is produced whenever the slider 96 of compensating potentiometer 97 is moved beyond either of the taps 100 and 101.

Cooperation of Rudder and Aileron Control During Turn

Let it be assumed that the directional gyroscope 10 rotates the shaft 11 a short distance in a clockwise direction, and that this operation indicates the need for a turn to the left by the aircraft in order to maintain its predetermined course. This rotation of shaft 11 moves slider 12R of the rudder control potentiometer to the left along its associated slidewire resistance 13R. At the same time, the slider 96 of the aileron compensating potentiometer 97 is moved to the right along the slidewire resistance 94. Let it be assumed that the motion is sufficient to move slider 96 to the right along slidewire 94 to a point somewhat beyond the tap 101. By this operation, a control signal is introduced into the rudder control system, and a smaller control signal is introduced into the aileron control system.

The control signal introduced into the rudder control system causes power transmission unit 50R to turn output shaft 56R in a counter-clockwise direction, thereby moving slider 22R to the left so as to rebalance network 15R, and deflecting the rudder to the left by means of the cables 81R, so as to produce a change in direction of the plane in the manner called for by the directional gyroscope 10.

The signal introduced into the aileron control system by movement of slider 96 to the right of tap 101 causes rotation of power output shaft 56A in a counter-clockwise direction, thereby moving slider 22A to the left along the slidewire resistance 23A so as to reduce the aileron amplifier input signal to zero. At the same time the cables 81A act on the ailerons to lower the left wing and raise the right wing of the aircraft, thereby banking it as it goes into the turn.

As the plane banks, or tilts about its longitudinal axis, the vertical gyroscope 91 rotates shaft 90 in a counterclockwise direction, thereby driving slider 12A of aileron control potentiometer 14A to the right along slidewire 13A. This impresses another signal on the amplifier signal input terminals 37A and 38A, controlling the operation of shaft 56A so as to move it in a clockwise direction, thereby moving slider 22A to the right to follow the movement of slider 12A and moving the ailerons back toward their neutral undeflected positions. The reason for reducing the deflection of the aileron after initiation of the turn is that while a given deflection of the aileron may be necessary to change a given aircraft from level flight to a certain angle of bank, a smaller deflection of the aileron is thereafter sufficient to maintain that angle of bank. In fact, it has been found that in most cases the ailerons should be returned all the way to their neutral positions and maintained there during the turn.

The ratio between the deflection of the aileron caused by movement of the slider 96 under the control of the directional gyro 10, and the restoring movement of the aileron caused by the movement of the slider 12A to the right under the control of vertical gyroscope 91, may be controlled by moving the slider 107 with respect to the resistance 105. The slider 107 is under the control of the pilot of the aircraft so that it may be readily adjusted in accordance with various flight conditions which may be encountered.

The operations described have shown how the rudder and ailerons are controlled to change the plane from a straight, level course to a curved course with a predetermined degree of bank. As the plane moves along its curved course, it approaches the direction of flight which the gyroscope 10 has been set to maintain. As this change in the course of the plane takes place, the directional gyroscope 10 gradually moves the slider 12R back to its center or neutral position, and by the action of the rudder control system as previously described, the rudder and the slider 22R follow this movement so that the rudder is restored to its undeflected position, and the network 15R is rebalanced with sliders 12R and 22R in their corresponding center positions.

As the aircraft is restored to its desired course, the directional gyroscope 10, in addition to restoring slider 12R to its center positions, moves slider 96 of the aileron compensating potentiometer 97 back to the left. The aileron control system responds to this movement of slider 96 by rotating shaft 56A in a clockwise direction thereby moving slider 22A to the right and operating the cables 81A so as to further decrease or even reverse the deflection of the ailerons. As soon as the slider 96, in its movement to the left, reaches the point on slidewire 94 to which the tap 101 is connected, the directional gyroscope 10 no longer exerts a controlling effect on the aileron position, the ailerons then remaining under the sole control of the vertical gyroscope 91. If the plane is still banked, the aileron control potentiometer 14A is operated by the vertical gyroscope 91 in such a manner as to deflect the ailerons in the opposite sense from the original deflection which caused banking of the plane, thereby lowering the right wing and raising the left wing to restore the aircraft to level flight.

It has been found that when the aircraft is moving along a substantially straight course, it is often desirable to maintain the wings level as long as the rudder deflections are small. For this reason, the taps 100 and 101 are provided ot establish a "dead spot" on the aileron potentiometer. As long as the rudder deflection is small enough that the slider 96 of the aileron potentiometer does not move beyond the "dead spot," the ailerons are not deflected simultaneously with the rudder.

The taps 100 and 101 are made adjustable in order that the amount of rudder deflection which will cause a simultaneous deflection of the ailerons may be adjusted. Since it has been found that the optimum adjustment of these taps depends more on the characteristics of the particular aircraft than on external flight conditions, the adjustment of the taps need not be made accessible to the pilot. If found desirable or necessary for any reasons, however, it would be comparatively simple for one skilled in the art to make these taps conveniently adjustable by any member of the aircraft crew. Furthermore, in some cases, the "dead spot" may be entirely eliminated so that banking will take place upon any rudder deflection, no matter how small.

Operation of Elevator Control System of FIGURE 1

In addition to operating the aileron control potentiometer 14A, the vertical gyroscope 91 operates an elevator control potentiometer 14E in accordance with the movements of the aircraft with respect to an axis passing laterally through it. In other words, the gyroscope 91 operates elevator control potentiometer 14E in accordance with the relative elevations of the nose and tail of the aircraft. The operation of the elevator control circuit is entirely analogous to the operation of the rudder control circuit and need not be discussed in detail. If the aircraft tends to dive or climb, the vertical gyroscope 91 drives the slider 12E of elevator control potentiomter 14E in the proper direction along its slidewire resistance 13E so that the elevators are deflected, by operation of shaft 56E, pulley 80E and cables 81E, in the proper direction to restore the aircraft to level flight. At the same time, the follow-up potentiometer slider 22E is driven in the proper direction to rebalance the elevator control network 15E.

FIGURE 2

There is shown in FIGURE 2 a power transmission unit 50, which may be any of the power transmission units 50R, 50A, or 50E, as shown in FIGURE 1. The power transmitting structure is disclosed somewhat diagrammatically in FIGURE 2, and certain electrical circuit connections are also shown therein. These electrical circuit connections are intended to correspond primarily with the control system of FIGURE 12, rather than that of FIGURE 1. Reference numerals have been applied to FIGURE 2, however, which correspond to those of the terminals of the power transmission units and it is believed that no difficulty will be encountered in applying the disclosure of FIGURE 2 to the control system disclosed in FIGURE 1.

Referring now to FIGURE 2, it will be seen that the motor 57 rotates a pinion 125 which engages a gear 123 fixed on a shaft 128. A gear 126 is also fixed on shaft 128, and engages another gear 127 fixed on a shaft 129. Through these driving connections, the shafts 128 and 129 are rotated in opposite directions. There is also fixed on the shaft 128 a first clutch member 130. Slidably mounted for longitudinal movement with respect to shaft 128 is a sleeve 131, which carries at one end a second clutch member 132 adapted to cooperate with clutch member 130 and at its opposite end a gear 133. The sleeve 131 is grooved as at 134 to receive pins 135 mounted in the opposite portions of a yoke member 136. The yoke 136 is carried on the end of a lever 139 which is supported on a fixed pivot 138. The sleeve 131 also carries a rotary brake member 140, which is engageable upon longitudinal movement of sleeve 131 with a stationary brake member 141.

The lever 139 is biased, by suitable means such as springs 142, to a central position wherein the clutch members 130 and 132 are not in engagement, and the brake members 140 and 141 are also disengaged. The lever 139 carries an armature 143. The armature structure 143 is mounted between two opposed electromagnets 144 and 145. When electromagnet 145 alone is energized, the lever 147 is moved in a counter-clockwise direction about its pivot, and acts through the yoke 136 and a pin 135 to move sleeve 131 to the right, thereby engaging the braking surfaces of members 140 and 141. On the other hand, when electromagnet 144 is energized, the lever 139 is moved in a clockwise direction about its pivot, thereby moving clutch members 130 and 132 into engagement. Electromagnet 144 is made more powerful than electromagnet 145, so that if both are energized at the same time, electromagnet 144 overpowers electromagnet 145 and causes engagement of clutch members 130 and 132, and disengagement of the braking surfaces of members 140 and 141.

In a similar manner, the shaft 129 carries a first clutch member 150. A sleeve member 151 is slidably mounted on shaft 129 for longitudinal movement with respect thereto. The sleeve member 151 carries at its left hand end a second clutch member 152 adapted to engage the first clutch member 150, and at its opposite end a gear 153. A portion of the sleeve 151 is grooved as at 154, to receive pins 155 on the opposite ends of a yoke member 156, which is carried at the end of a lever 157. The lever 157 is pivoted on a fixed support 158. The sleeve 151 also carries a rotary brake member 160, which is engageable with a stationary brake member 161 upon movement of the sleeve 151 to the right. The lever 157 is biased by springs 162 to a central position in which both the clutch members 150 and 152, and the brake members 160 and 161 are disengaged. The lever 157 carries an armature structure 163 which is mounted between a pair of opposed electromagnets 164 and 165. When the electromagnet 165 is energized, lever 157 is rotated in a clockwise direction about its pivot, causing engagement of braking surfaces 160 and 161. When electromagnet 164 is energized, lever 157 is rotated in a counter-clockwise direction about its pivot, causing engagement of clutch members 150 and 152. The electromagnet 164 is made stronger than the electromagnet 165 so that when both are simultaneously energized, solenoid 164 overpowers solenoid 165 and causes engagement of clutch members 150 and 152, and disengagement of brake members 160 and 161. Because of their respective functions, the electromagnets 144 and 164 are hereinafter referred to as the clutch electromagnets and the electromagnets 145 and 165 are termed the brake electromagnets.

Gear 133 engages a set of gear teeth 166 on the circumference of a dual gear 167, which is mounted freely on a shaft 168. The dual gear 167 is also provided on on one of its lateral faces, with a set of bevel gear teeth 170. The bevel gear teeth 170 are adapted to engage a set of bevelled pinions 171 which are mounted on stub shafts 172 carried by a spider 173, which is fixed on shaft 168.

The gear 153 engages a set of gear teeth 174 on the circumference of another dual gear 175, which is also free on the shaft 168. The dual gear 175 also carries, on one of its lateral faces, a set of bevel gear teeth 176, adapted to engage the bevel pinions 171. Fixed on the shaft 168 is a pinion 177 which engages a gear 178 fixed on the power output shaft 56 of power transmission unit 50.

The shaft 56 carries the pulley 80 over which runs the cable 81 extending to the particular control surfaces which are operated by the power transmission unit 50. The shaft 56 also carries the slider 22 which cooperates with the rebalancing potentiometer slidewire resistance 23.

The extremity of slider 22 is adapted to engage one or the other of a pair of limit switches 180 and 181 when it approaches either end of the slidewire resistance 23. The limit switch 181 comprises a switch arm 203 biased into engagement with two stationary contacts 202 and 204, and the switch 180 comprises a switch arm 199 biased into engagement with two stationary contacts 198 and 200.

*Operation of FIGURE 2*

The brake electromagnets 145 and 165 are normally continuously energized. The energizing circuit for electromagnet 145 may be traced from terminal 46, which is adapted for connection to the ungrounded terminal of battery 64, through a conductor 182, electromagnet 145, ground connections 183 and 69, to the grounded terminal of battery 64. The corresponding circuit for electromagnet 165 may be traced from terminal 46 through a conductor 184, electromagnet 165, and ground connections 185 and 69 to the ungrounded terminal of battery 64.

Energization of clutch electromagnets 144 and 164 is controlled by a pair of relays 186 and 187. Relay 186 comprises a winding 190, which when energized causes movement of a switch arm 191 into engagement with a contact 192. Relay 187 comprises a winding 193, which when energized causes movement of a switch arm 194 into engagement with a stationary contact 195.

Upon energization of winding 190 of relay 186, switch arm 191 engages contact 192, thereby completing an energizing circuit for clutch electromagnet 144, which circuit may be traced from terminal 71, which is adapted for connection to the ungrounded terminal of battery 64, through a conductor 196, switch arm 191, contact 192, terminal 43, conductor 51, terminal 53, clutch electromagnet 144, a conductor 197, contact 198, limit switch arm 199, contact 200, grounded terminal 54, and ground connection 69 to the opposite terminal of battery 64.

The corresponding energizing circuit for clutch electromagnet 164 may be traced from terminal 71 through conductor 196, switch arm 194, contact 195, terminal 41, conductor 45, terminal 47, electromagnet 164, a conductor 201, contact 202, limit switch arm 203, contact 204, grounded terminal 48, and ground connection 69 to the opposite terminal of battery 64.

A pilot or tell-tale light 205 is connected in parallel with clutch electromagnet 144 between terminal 43 and ground at 206. Another pilot or tell-tale light 207 is connected in parallel with clutch electromagnet 164 between terminal 41 and ground at 208. It will be understood that whenever either clutch electromagnet 144 or 164 is energized, the corresponding pilot light 205 or 207 is lit.

As previously stated, both brake electromagnets 145 and 165 are normally energized. Under these conditions, both sets of braking surfaces 140 and 141 and 160 and 161 are engaged, and both clutches 130, 132 and 150, 152 are disengaged. Therefore, no motion is transmitted from motor 57 through the power transmission mechanism 50 to the output shaft 56.

If, when both brake electromagnets 145 and 165 are energized, the clutch electromagnet 144 is also energized, the lever 139 will be operated to engage clutch members 130 and 132 and to disengage the brake surfaces 140 and 141. Motion will then be transmitted from input shaft 55 through gear 125, gear 123, shaft 128, clutch member 130 and 132, sleeve 131, gear 133, dual gear 167, pinions 171, shaft 168, pinion 177 and gear 178 to output shaft 56. If the input shaft 55 is presumed to turn clockwise as viewed from the right hand end, it will be seen that the gears 126 and 133 will turn counter-clockwise, thereby rotating gear 167, spider 173 and shaft 168 all clockwise and turning the final output shaft 56 counter-clockwise. At this time, the brake surfaces on members 160 and 161 are held in engagement so that gears 153 and 175 are locked against rotation. The pinions 171 are therefore rolled over the bevel gear teeth 176 by rotation of the bevel gear 170 and motion is imparted to shaft 168 in the same direction as that in which the gear 167 rotates.

On the other hand, consider that both brake electromagnets 145 and 165 are energized, and that clutch electromagnet 164 is then energized. Clutch members 150 and 152 are thereby engaged and brake surfaces 160 and 161 are disengaged. Motion is then transmitted from input shaft 55 through gears 125, 123, 126 and 127, shaft 129, clutch members 150, 152, gears 153 and 175, pinions 171, spider 173, shaft 168, pinion 177 and gear 178 to output shaft 56. Again presuming pinion 125 to be rotating clockwise as viewed from the right hand end, it will be seen that gears 127 and 153 also rotate clockwise, but gear 175, spider 173, and pinion 177 rotate counter-clockwise thereby turning the output shaft 56 clockwise.

It may therefore be seen that upon selective energization of clutch electromagnets 144 and 164, the direction of rotation of output shaft 56 is selectively controlled. It is, of course, understood from the above description that the clutch electromagnets 144 and 164 are effective to control rotation of output shaft 56 only if the brake solenoids 145 and 165 are energized. As noted above, in connection with the description of the energization of clutch magnet 144, the pinions 171 are rolled over the beveled gear 176 by rotation of the beveled gear 170 because of beveled gear 176 being held against movement through the effect of brake surfaces 160 and 161. If brake surfaces 160 and 161 were not engaged upon energization of clutch electromagnet 144, the movement imparted to gear 133 would be simply transmitted into movement of gear 175 with no resultant rotation of spider 173 and hence shaft 168. Similarly, when clutch solenoid 164 is energized, no rotation of shaft 168 will take place unless the braking surfaces 140 and 141 are engaged. Thus, when the brake solenoids 145 and 165 are deenergized, the cable drum 80 and hence the control surface positoned by it is disconnected entirely from the servo-motor means and is free to be moved manually by the conventional manual controls provided in an aircraft.

FIGURE 3

In FIGURE 3 is shown a preferred form of structural arrangement whereby a directional gyroscope generally indicated at 10, may operate the rudder control potentiometer 14 and the aileron compensating potentiometer 97. Elements in FIGURE 3 which correspond to equivalent elements in FIGURE 1 have been given the same reference numerals. The gyroscope 10 may be of any suitable type, and includes a member rotating about a horizontal axis and enclosed in a casing. The complete gyroscope 10 including the casing, is free to move about a vertical axis. Since FIGURE 3 is a plan view, this vertical axis extends perpendicular to the plane of the paper in that figure. The gyroscope 10 is supported by a pair of trunnions 210, which are fixed to a generally cylindrical gimbal 211. The gimbal 211 is mounted to pivot freely with respect to the aircraft in which it is mounted about the vertical axis previously mentioned.

For purposes of explanation, it may be assumed that the axis of rotation of the rotating member of gyroscope 10 is aligned with the trunnions 210. As long as the aircraft maintains a straight course, the angular relation between the trunnions 210 and the aircraft in which the gyroscope is mounted remains the same. If the aircraft deviates from this course, the gyroscope 10 tends to maintain its axis in the same relative position in space, in accordance with the well known characteristics of gyroscopes. Since the gimbal 211 is freely pivoted on the aircraft, when the gyroscope maintains its axis in space, and the aircraft turns, the gimbal 211 is rotated with respect to the aircraft.

A clutch band 212 extends circumferentially around the cylindrical casing 211. The circular configuration of band 212 is interrupted by a laterally extending yoke portion 213. The band 212 and yoke portion 213 are of resilient material. The yoke portion 213 comprises a pair of side portions 214 and 215, and a bight portion 216. A bolt 217 is fixed in the side portion 214 and extends across the yoke portion 213, passing freely through the side portion 215 and extending somewhat beyond the latter. At its extremity, the bolt 217 is threaded to receive a nut 218, which retains a coil spring 220 in compression between the nut and the side portion 215.

A pair of toggle links 221 and 222 are pivotally attached respectively to the side portions 214 and 215. The opposite ends of the toggle links 221 and 222 are pivotally attached to each other and to a third link 223. The opposite end of link 223 is pivotally attached to a crank member 224, which may take the form of a knurled thumb screw. The thumb screw 224 is mounted on the bight portion 216 of yoke 213. The band 212 and the yoke portion 213 are self biased so that the side portions 214 and 215 tend to separate. When the parts are in the position shown in the drawing, the side portions 214 and 215 have separated as far as permitted by the toggle links 221 and 222, which are stretched in the form of a straight line. If the crank member 224 is now rotated through half a revolution, the toggle links 221 and 222 are rotated upwards so that together they form an inverted V. By this action of the toggle links 221 and 222, the side portions 214 and 215 of yoke 213 will be drawn together, thereby moving band portion 212 into clamping engagement with the gimbal 211. If rotation of crank member 224 is stopped with the pivotal attaching point of link 223 spaced 180° from the position shown in the drawing, it will be readily understood that the toggle links 221 and 222 will remain locked in that position, since the center of rotation of crank member 224 will lie on the same straight line as the pivots at the opposite ends of link 223.

It may therefore be seen that the gyroscope 10 may be utilized to rotate the cylindrical casing 211 and the band member 212 in accordance with the deviation of the aircraft from a predetermined course, when the band 212 is in clutching engagement with cylinder 211.

The band 212 is provided with a long lateral extension 225 which extends over a control panel 226, hereinafter referred to for purposes of identification, as the sector panel. The end of extension 225 is provided with a ball 227 which cooperates with a substantially cylindrical socket 228 in a supporting member 230, which is slidable in guides 231 attached to the panel 226. A pair of stops 232 and 233 fixed on the sector panel 226, limit the movement of the supporting member 230.

The slider 96 of the aileron compensating potentiometer 97 is fixed by any suitable means to the upper end of the supporting member 230. The slidewire 94 is mounted on sector panel 226 to cooperate with slider 96, and the adjustable taps 100 and 101 are also mounted thereon. In FIGURE 3, the conductors 102 and 103 of FIGURE 1 take the form of substantially U-shaped supporting members for the taps 100 and 101 respectively. The supporting members 102 and 103 are adjustable with respect to each other and with respect to panel 226 by means of a screw and slot connection indicated at 234. The purpose of this connection is to permit adjustment of the points at which the taps 100 and 101 engage the resistance 94, thereby adjusting the amount of rudder deflection which may be made before a banking deflection of the ailerons is produced by the aileron control system. This adjustment was described functionally in more detail in connection with FIGURE 1.

The supporting member 230 also carries a cam plate 115 which operates a switch arm 116 into engagement with a stationary contact 117. The construction is such that the switch arm 116 is moved into engagement with the contact 117 whenever the supporting member moves a predetermined distance from its central position, which is not shown on the drawing.

The slider 12R of rudder control potentiometer 14R is pivotally mounted as at 235, on the lower end of supporting member 230. Springs 236 are provided to resiliently maintain the slider 12R in a position at right angles to the supporting member 230. The left end of slider 12R, as it appears in the drawing, is provided with a lateral extension 237, to which is pivotally attached a connecting rod 238, whose opposite end is pivotally attached to a piston 239 in a dash-pot 240. The piston 239 may be apertured as at 241, and the dash-pot 240 is preferably filled with some viscous liquid such as oil to delay movement of piston 239 therein.

If the supporting member 230 is moved upward slowly by the gyroscope 10, the oil in the dash-pot 240 will flow through the aperture 241 in piston 239 and accommodate itself to this movement. The slider 12R will therefore remain in a position substantially at right angles to the supporting member 230, as determined by the springs 236. If however, the supporting member 230 is moved rapidly upwards by the gyroscope 10, the upward movement of extension 237 on slider 12R will be delayed by the dash-pot 140, and the contact point on slider 12R will be moved upwards along the slidewire 13R at a rate more rapid than that at which the supporting member 230 is moved. It may therefore be seen that the use of the dash-pot 240 introduces into the network which includes resistance 13R a corrective effect which is dependent upon the rate of change of the controlling condition, in this instance the deviation of the aircraft from a predetermined course as measured by the gyroscope 10. As soon as motion of supporting member 230 stops, the slider 12R is restored slowly to its perpendicular position by the springs 236, which will slowly move the piston 239 in the dash-pot 240. It may therefore be stated that the additional signal introduced into the network 15R by the use of the dash-pot 240 is a sort of anticipating correction, in that it anticipates the need for a greater deflection of the rudder before the craft has deviated from its course sufficiently to actually call for that greater deflection. By thus introducing the anticipating correction, the system is made more sensitive to sudden changes in the course of the aircraft.

FIGURES 4 to 10

These figures show in greater detail, although somewhat diagrammatically, the vertical gyroscope 91 of FIGURE 1, and the control devices operated thereby.

In FIGURES 4, 5 and 6 is shown a casing 250 which may enclose a gyroscopic element (not shown) of any suitable type, mounted for rotation about a vertical axis. The casing 250 is universally mounted, being supported by a pair of trunnions 251 carried at diametrically opposite points on a gimbal ring 252. The gimbal ring 252 is in turn carried by shafts 253 and 90 attached to the ring at points spaced 90° from the trunnions 251 and extending through bearings in an outer casing 255 which encloses the gyroscope. Outside of the casing 255, the shaft 253 carries a permanent bar magnet 256.

The shaft 90 carries, outside the casing 255, a bracket 254 on which is supported an insulating block 268. The block 268 carries slider 12A of aileron control potentiometer 14A and two additional sliders 512 and 96R (see FIG. 12). The sliders 512 and 96R may be omitted when the gyroscope 91 is used in the control system of FIGURE 1. Slider 12A cooperates with slidewire 13A, which is mounted on a stationary base 257 of insulating material. When sliders 512 and 96R are used, the base 257 carries slidewires 513 and 94R which cooperate with the sliders 512 and 96R, respectively.

A pair of shafts 260 and 261 are journaled in the casing 255 at right angles to the shafts 253 and 90. The inner ends of the shafts 260 and 261 are joined by a yoke member 262 of channel-shaped cross-section, as seen in FIGURE 4.

The upper portion of gyroscope casing 250 carries a bracket 263 for supporting a stub shaft 264 carrying a roller 265. The channel-shaped yoke member 262 forms a semicircle above the gyroscope casing 250, and the roller 265 is adapted to roll along the inside lateral faces of the channel section of yoke member 262. Outside the casing 255, the shaft 260 carries a permanent bar magnet 266, and the shaft 261 carries a bracket 270 supporting an insulating block 271, on which is mounted the slider 12E of the elevator control potentiometer 14E. The slidewire resistance 13E of potentiometer 14E is mounted on a stationary base 258 of insulating material.

The bar magnet 256 is positioned normally in a neutral position between the opposed poles of a stationary core structure 272. The core 272 is provided with a pair of selectively energizable windings 273 and 274. Energization of windings 273 and 274 is controlled by a gravity responsive switch device generally indicated at 275. Switch 275 comprises a contact rod 276 extending downwardly from the center of the bottom of casing 250 and two pairs of contact carrying bails 277, 278 and 284, 285. The bails 277 and 278 are joined at their ends by suitable yoke portions 286 which are pivoted to opposite sides of the casing 250 so as to rotate about an axis parallel to the shafts 253 and 90. The bails 284 and 285 are similarly joined at their ends by yoke portions 287, pivoted at opposite sides of casing 250 so as to rotate about an axis parallel to the shafts 260 and 261. The energization of windings 273 and 274 is dependent upon engagement of either bail 284 or 285 with contact rod 276, in a manner more fully described hereinafter.

The bar magnet 266 is similarly positioned normally in a neutral position between the opposed poles of a stationary electromagnetic core member 281. The core 281 is provided with a pair of selectively energizable windings 282 and 283. Energization of windings 282 and 283 is controlled by the switch device 275, particularly by engagement of bail 277 or 278 with contact rod 276, in a manner to be more fully described hereinafter.

Operation of FIGURES 4 Through 10

In accordance with the well known principles of gyroscopic devices, the rotating member within the casing 250 tends to maintain the direction of its axis fixed in space. In the present case, the device is so constructed as to maintain its axis vertical. The casing 255 is mounted in an aircraft whose flight is to be controlled by the gyroscope 91. The orientation of the device within the aircraft is shown by the arrow indicating the direction of flight in FIGURE 6.

If, with the gyroscope 91 mounted in the position described, the aircraft tends to move in a manner such that its left wing drops and his right wing rises, the axis of the casing 250 is maintained vertical by the gyroscope and exerts a torque on gimbal ring 252, tending to rotate it about shaft 253 in a clockwise direction as viewed in FIGURE 5. This rotation of gimbal ring 252 turns the shafts 253 and 90, thereby moving slider 12A of aileron control potentiometer 14A relative to slidewire 13A and producing a deflection of the ailerons in the manner described in connection with FIGURE 1 so as to restore the aircraft to its condition of level flight. If the wings tilt in the opposite direction, that is, so that the right wing drops and the left wing rises, the gimbal ring 252 is rotated counter-clockwise as viewed in FIGURE 5, thereby moving slider 12E relative to slidewire 13E in the opposite direction.

If now the aircraft tends to nose down or dive, the gyroscopic device in the casing 250 again seeks the vertical position, thereby rotating the casing 250 about the trunnions 251 in a clockwise direction as viewed in FIGURE 4. This motion of casing 250 causes roller 265 to engage the righthand side of the channel section 262, thereby rotating shafts 260 and 261 in a clockwise direction also. This moves slider 12E of elevator control potentiometer 14E relative to its slider 13E, thereby producing a corrective deflection of the elevator surfaces so as to again restore the aircraft to level flight. It will be readily understood that if the nose of the aircraft rises, rather than falls, the casing 250 will rotate counter-clockwise as viewed in FIGURE 4, thereby rotating channel section 262 and shafts 260 and 261 also in a counterclockwise direction.

Movement of slider 12E relative to slider 13E causes corrective deflection of the elevator surfaces in the proper direction to restore the aircraft to level flight, as described in connection with FIGURE 1.

As previously mentioned, the natural tendency of gyroscopes is to maintain the direction of their axis of rotation fixed in space. It will therefore be readily understood that when used in an aircraft travelling considerable distances over the surface of the earth, the axis of the device 250 continuously tends to deviate from the true vertical with respect to the earth's surface and to maintain itself in the direction represented by the vertical to the earth surface at the point where the flight of the aircraft started. Furthermore, it will be readily appreciated that there are several small forces continuously applied to the gyroscope, which may be due to the friction in the mounting of the gyroscope, to the torque applied by the electrical connections to the sliders of the control potentiometers, and by the electrical connections to the gyroscope if one of the electrical type is used. All these effects tend to make the gyroscope slowly precess away from the true vertical. Means must therefore be provided to correct the gyroscope for deviations of its axis from the true vertical and to restore its axis to that vertical. In the present arrangement, that function is performed by the bar magnets 256 and 266, their associated electromagnetic structures 272 and 281, and the gravity responsive switch device 275.

By way of example, let it be assumed that the casing 250 tends to deviate from the true vertical in such a sense as to rotate clockwise about shaft 253, as viewed in FIGURE 5. The contact rod 276 is therefore moved slightly to the left from the position shown in the drawing. The bails 277 and 278, however, because of their pendulum effect, tend to remain in a true vertical position. Therefore the bail 277 engages the rod 276, completing an energizing circuit for the winding 283. This circuit may be traced from the lower terminal of battery 64 (see FIG. 5) through switch arm 119, contact 120, a conductor 288, contact rod 276, bail 277, a conductor 290, winding 283, and a conductor 291 to the upper terminal of battery 64. Energization of winding 283 produces a magnetic flux in core 281 of a polarity such that it reacts with the permanent magnet 266 to apply a torque to shaft 260 tending to rotate it in a clockwise direction as view in FIGURE 4. The left side of channel 262, as viewed in FIGURE 4, engages the roller 265, applying to it a force acting to the right as viewed in either FIGURE 4 or FIGURE 6. Referring now to FIGURE 6, it will be seen that the original deviation of the axis of casing 250 from the true vertical moves the roller 265 upwardly as viewed therein. The force now applied to the roller 265 acting in a right-hand direction in FIGURE 6, reacts with the rotating gyroscope 250 so as to cause precession of the gyroscope in a direction to move roller 265 in a downward direction as viewed in FIGURE 6, thereby restoring the gyroscope 250 to its true vertical position.

It will be readily understood by those skilled in the art that a similar reactive force is set up between the permanent magnet 266 or 256 and the poles of the corresponding magnetic structure 281 or 272 when the gyroscope tends to deviate from its true vertical in any of the remaining three directions. When contact rod 276 is moved into engagement with bail 278, for example, an energizing circuit for coil 282 is completed which may be traced from the lower terminal of battery 64 through switch arm 119, contact 120, a conductor 288, contact arm 276, bail 278, a conductor 292, coil 282, and conductor 291, to the upper terminal of battery 64. Upon energization of coil 282, a magnetic flux is induced in core structure 281 of the opposite polarity to that produced by the energization of core 283.

In the same manner, magnetic flux of either polarity may be induced in the core structure 272 by selective energization of coils 273 and 274 under control of gravity responsive switch 275. When contact rod 276 of switch 275 engages bail 284, an energizing circuit is completed for coil 274 which may be traced from the lower terminal of battery 64 through a conductor 295, contact rod 276, bail 284, a conductor 296, coil 274, and a conductor 297 to the opposite terminal of battery 64.

When contact rod 276 moves into engagement with bail 285, an energizing circuit is completed for winding 273, which may be traced from the lower terminal of battery 64 through conductor 295, contact rod 276, bail 285, a conductor 298, coil 273, and conductor 297 to the upper terminal of battery 64.

When the aircraft is making a turn, it is possible that the bails 277 and 278 might be moved by centrifugal force into engagement with contact rod 276, thereby causing a false energization of the electromagnetic erecting structure 281. Such an occurrence is prevented by the switch 119, which is opened by energization of winding 118 (see FIG. 1) whenever the gyroscope 10 calls for a turn of greater than a predetermined curvature, as determined by the configuration of cam 115.

FIGURE 11

In FIGURE 11 is shown the details of an amplifier circuit 40 which corresponds to the circuits 40R, 40A and 40E of FIGURE 1. In FIGURE 11, the terminals 70 and 71, which are supplied with electrical energy from the battery 64 of FIGURE 1 are connected to a vibrator inverter circuit of conventional type. The vibrator comprises a coil 301 which controls the movement of a switch arm 302 between stationary contacts 303 and 304. A condenser 305 is connected between the stationary contacts 303 and 304 in order to reduce sparking at those contacts. A conductor 306 connects terminal 70 with the switch arm 302 and with one terminal of coil 301. The opposite terminal of coil 301 is connected by a conductor 307 to the upper terminal of a primary winding 308 of a power supply transformer 310. The conductor 307 is also connected to the stationary contact 303. Terminal 71 is connected by a conductor 311 to a mid-point tap 312 on the transformer primary winding 308. The lower terminal of primary winding 308 is connected through a conductor 313 to stationary contact 304. A filter condenser 314 connects stationary contact 304 with grounded terminal 70. Another filter condenser 315 connects midpoint tap 312 with switch arm 302.

The operation of the inverter circuit 300, which will be readily understood by those skilled in the art, may be briefly outlined as follows:

When the switch arm 302 engages contact 304, as shown in the drawing, a circuit is completed which may be traced from power input terminal 70 through conductor 306, switch arm 302, contact 304, conductor 313, the lower half of primary winding 308, mid-point tap 312, and conductor 311 to battery terminal 71. At the same time, a circuit is completed for energizing coil 301 which may be traced from terminal 70 through conductor 306, coil 301, conductor 307, the upper half of primary winding 308, mid-point tap 312, and conductor 311 to terminal 71. The current flowing through this second circuit will be much lower than that through the first circuit traced on account of the impedance of coil 301. The net flux in the transformer core therefore has a direction determined by the direction of current flow in the lower half of primary winding 308. The energization of coil 301 causes switch arm 302 to move upwardly into engagement with contact 303. This opens the circuit through the lower half of primary winding 308, and shunts coil 301 so as to increase the current flowing in the upper half of primary winding 308. The direction of flux flowing in the transformer is then determined by the direction of current flow in the upper half of primary winding 308, being the opposite to the direction of current flow occurring when the switch arm 302 engages contact 304. Since the coil 301 has now been shunted, the switch arm 302 drops back to the lower contact 304, to which position it is biased by means not shown, thereby again causing the current flow in the lower half of primary winding 308 to predominate and again reversing the direction of flux flow in the transformer core. This sequence of events repeats itself cyclically, thereby producing an alternating flux in the transformer core 310, and inducing alternating electrical potentials in secondary windings 316, 317 and 318 with which transformer 310 is provided.

The secondary windings 317 and 318 are power supply windings for other parts of the control system, as will be noted by reference to the connections of terminals 76, 77, 78 and 79 in FIGURE 1. These windings therefore need no further discussion in connection with the amplifier circuit 40.

The secondary winding 316 supplies power to the amplifier circuit 40. The amplifier 40 comprises two preliminary voltage amplification stages 320 and 321 and a final power stage 322. A rectifier triode 323 is used to supply power to the voltage amplification stages 320 and 321, and biasing potential for one of those stages. Another rectifier triode 324 is used to supply biasing potential for the final output stage 322.

Signals applied to the input terminals 37 and 38 of amplifier 40 are impressed across a potentiometer resistance 325, one terminal of which is grounded as at 326. An adjustable tap 327 movable along the resistance 325 controls the gain of the amplifier 40. The first voltage amplification stage 320 of amplifier 40 includes a triode 330 having an anode 331, a control electrode 332, a cathode 333, and a heater element 334, which may be supplied with electrical energy from any suitable source (not shown). The input circuit of the first stage 320 may be traced from control electrode 332 through a conductor 335, tap 327, resistance 325, and ground connections 326 and 336 to cathode 333. It should be noted that this input circuit is unbiased.

The output circuits of the stages 320 and 321 are supplied with electrical energy from a rectifier circuit connected to the upper half of transformer secondary winding 316. This rectifier circuit may be traced from the upper terminal of secondary winding 316 through conductors 337, 338 and 340, anode 341, and cathode 342 of a triode 323, a resistance 343, a conductor 344, a fixed resistance 610, a potentiometer resistance 345, ground connections 346 and 347, a conductor 348, a resistance 350 in parallel with a condenser 351, and a conductor 352 to a mid point tap 353 on transformer secondary winding 316. The triode 323 is provided with a control electrode 354 which is connected to the cathode to maintain the triode in a highly conductive condition. Filter condensers 355 and 356 are connected between the opposite terminals of resistor 343 and ground in order to by-pass high frequency components appearing in the output of the rectifier circuit. The conductor 344 serves as the positive terminal of the power supply for the amplification stages 320 and 321, and ground serves as the negative terminal. The direction of current flow through this rectifier circuit is such that the potential drop across resistance 345 renders its right-hand terminal positive with respect to its left-hand terminal, as indicated by the legend in the drawing.

The output circuit of the first stage 320 may be traced from positive power supply terminal 344 through a conductor 357, a load resistance 358, anode 331, and cathode 333, to ground at 336.

The second voltage amplification stage 321 includes a triode 360 having an anode 361, a control electrode 362, a cathode 363 and a heater element 364. Heater element 364 may be energized from any suitable source of electrical energy (not shown).

The output circuit of stage 320 is coupled to the control electrode 362 of stage 321 through a blocking condenser 365, a protective resistance 366, and a protective resistance 367.

The input circuit of stage 321 is divided into two branches. The first branch may be traced from control electrode 362, through protective resistance 367, resistance 368, variable resistance 370, and a by-pass condenser 371 in parallel, a conductor 372, a movable tap 373 associated with variable resistance 345, resistance 345, and ground connections 346 and 374 to cathode 363. The second branch of the input circuit of stage 321, hereinafter termed the feedback circuit, may be traced from contol electode 362 through resistances 367 and 368, a conductor 375, a condenser 376, a conductor 377, resistance 350 in parallel with by-pass condenser 351, conductor 348 and ground connections 347 and 374 to cathode 363. The output circuit of stage 321 may be traced from conductor 344 which serves as the positive power supply terminal, through a load resistance 378, anode 361, and cathode 363 to ground at 374, which is the negative terminal of the power supply.

The final output stage 322 includes a twin tetrode 380, whose individual tetrodes 381 and 382 are oppositely connected to the upper and lower halves of secondary winding 316, respectively. The tetrode 381 includes an anode 383, a first control electrode or screen grid 384, a second control electrode 385, a cathode 386, and a heater filament 387. The tetrode 382 includes an anode 390, control electrodes 391 and 392, a cathode 393, and a heater filament 394. The heater filaments 387 and 394 may be connected to any suitable source of electrical energy (not shown).

A bias potential for the main control electrodes 385 and 392 of the final stage 322 is supplied from a circuit which includes the rectifier triode 324. Triode 324 has an anode 395, a control electrode 396, a cathode 397, and a heater filament 398. The heater filament 398 may be energized from any suitable source of energy. Control electrode 396 is connected to cathode 397 by a conductor 400, so as to maintain triode 324 in a highly conductive condition whenever a sufficiently high potential of proper polarity is applied to the cathode and anode. The circuit through the rectifier triode 324 may be traced from the mid point tap 353 of transformer secondary winding 316 through conductor 352, resistance 350 and its parallel by-pass condenser 351, conductor 348, ground connections 347 and 401, fixed resistance 612, a potentiometer resistance 402, a fixed resistance 611, anode 395, cathode 397, resistance 403, and conductor 404 to the lower terminal of secondary winding 316.

It should be noted in passing that the current flow through the rectifier circuit including triode 323 passes through resistance 350 and its parallel by-pass condenser 351 in a direction opposite to the current flow through rectifier triode 324. Since these two currents are substantially equal and opposite, and since they both flow during the same operative half cycles, that is, when the upper end of secondary winding 316 is positive with respect to the lower end, it will be seen that the net potential drop across resistance 350 produced by these two currents is zero.

A variable portion of the potential drop across resistance 402 is impressed across a condenser 405 by means of a movable tap 406 associated with resistance 402. The direction of current flow through triode 324 is such as to make the left-hand terminal of resistance 402 positive with respect to its right-hand terminal, as indicated by the legend in the drawing.

The tetrodes 381 and 382 of the final output stage 322 have a common input circuit, which may be traced from control electrodes 385 and 392 to conductor 407, resistance 408, a conductor 409, condenser 405, and ground connections 401 and 347 to cathodes 386 and 393. The output circuit of the second preliminary amplification stage 321 is coupled to the common input circuit of the tetrodes 381 and 382 through a blocking condenser 411 connected between anode 361 and conductor 407.

The output circuit of tetrode 381 may be traced from the upper terminal of transformer secondary winding 316 through conductor 337, relay winding 193 and condenser 412 in parallel, a conductor 413, anode 383, cathode 386, conductor 348, resistance 350 and its parallel by-pass condenser 351, and conductor 352 to mid-point tap 353 on transformer secondary winding 316.

The output circuit of tetrode 382 may be traced from the lower end of transformer secondary winding 316 through conductor 404, relay winding 190 and condenser 414 in parallel, conductor 415, anode 390, cathode 393, conductor 348, resistance 350 and its parallel by-pass condenser 351, and conductor 352 to mid-point tap 353 on transformer secondary winding 316.

The control electrode 384 of tetrode 381, which is conventionally termed a screen grid, is connected through resistance 416 and conductors 417, 338 and 337 to the upper terminal of secondary winding 316. Control electrode 391 of tetrode 382 is connected through a resistance 418 and conductors 420, 421, and 404 to the lower terminal of secondary winding 316.

A group of three buffer condensers 422, 423 and 424 in series is connected across the terminals of secondary winding 316 by means of conductors 337, 338, 421 and 404.

The following table shows, by way of example, values of resistance and capacitance for the various circuit elements which have been used in one embodiment of the amplifier circuit of FIGURE 11:

| Reference character of element: | Electrical quantity |
|---|---|
| 305 | 1 microfarad. |
| 314 | ¼ microfarad. |
| 315 | 25 microfarads. |
| 325 | 10,000 ohms. |
| 343 | 5,000 ohms. |
| 345 | 50,000 ohms. |
| 350 | 800 ohms. |
| 351 | 25 microfarads. |
| 355 | 10 microfarads. |
| 356 | 10 microfarads. |
| 358 | ¼ megohm. |
| 365 | .05 microfarad. |
| 366 | ½ megohm. |
| 367 | ½ megohm. |
| 368 | ½ megohm. |
| 370 | ½ megohm. |
| 371 | .1 microfarad. |
| 376 | .04 microfarad. |
| 378 | ¼ megohm. |
| 402 | .1 megohm. |
| 403 | ¼ megohm. |
| 405 | 8 microfarads. |
| 408 | 150,000 ohms. |
| 411 | .05 microfarad. |
| 412 | 1 microfarad. |
| 414 | 1 microfarad. |
| 416 | 10,000 ohms. |
| 418 | 10,000 ohms. |
| 422 | .007 microfarad. |
| 423 | .007 microfarad. |
| 424 | .007 microfarad. |
| 610 | ½ megohm. |
| 611 | 20,000 ohms. |
| 612 | .1 megohm. |

The triodes 330 and 360 may be included in a twin triode tube. For example, a type 7F7 tube has been found satisfactory. The twin tetrode 380 may be of the type 6V6GT. The triodes 323 and 324 may be the two parts of another type 7F7 tube.

*Operation of FIGURE 11*

When an alternating signal potential appears at the input terminals 37 and 38 of amplifier 40, it is amplified in a conventional manner by the first preliminary stage 320, and the amplified signal is transmitted through blocking condenser 365 and is applied to the input circuit of the second voltage amplification stage 321.

The second amplification stage 321 has a peculiar input voltage-output current characteristic which may be better understood by refernce to FIGURES 15 and 16. In FIGURE 15, the curve A represents the grid voltage-anode current characteristic of the triode 360, and it should be noted that the curve A is of a generally conventional form. Referring to FIGURE 16, it will be seen that a high resistance 367 (½ megohm) is connected in series with the control electrode 362, and that the control electrode 362 is positively biased by its connection through resistances 367, 368 and 370 and conductor 372 to the tap 373 which is movable along potentiometer resistance 345. The resistance 345 is connected between the positive power supply line 344 and ground at 346. Since the cathode 363 is grounded at 374, it will be seen that all points on the resistance 345 are positive with respect to the cathode 363. Therefore a current flow takes place through the connection from the tap 373 through conductor 372 and resistances 370, 368 and 367, control electrode 362, cathode 363, and ground 374. The potential drop due to this current flow may be considered as divided into two portions, one portion being the drop across the resistances 367, 368 and 370, and the other portion being the potential between the control electrode 362 and the cathode 363. Since the impedance of the resistances 367, 368 and 370 is very high as compared to the control electrode-to-cathode impedance of the triode 360, the voltage drop across the resistances is very much greater than the control electrode to cathode potential, and the latter potential is in fact very small.

Considering this circuit still further, it will be apparent that if the control electrode to cathode voltage tends to increase, the resulting increase in current flow causes the voltage drop across the resistances 367, 368 and 370 to increase in proportion. This increase in the potential drop across the resistances tends to restore the control electrode to the same potential which it originally had. It may therefore be seen that the potential of the control electrode 362 is maintained at a value only slightly positive with respect to the cathode 363, and that it is not possible to increase the control electrode potential substantially in a positive direction by applying an additional positive potential to the circuit just traced, or to any point on that circuit to the left of the resistance 367.

Because of this interaction of the potential drop across resistance 367 and the positive bias potential obtained from the tap 373, the input voltage-output current characteristics of the stage 321 as a whole is somewhat different from the input voltage-output current characteristics of the triode 360 as shown at A in FIGURE 15. In the present discussion of the input voltage-output current characteristic of the stage 321, the input voltage is intended to signify the potential between the cathode 363 and the terminal of resistance 367 which is opposite to that terminal connected to control electrode 362. In other words, the input voltage is the potential between the left-hand terminal of resistance 367, as it appears in the drawing, and the cathode 363.

Referring now to FIGURE 15, it may be seen, that as a result of the action of the potential drop across resistance 367, described above, when the input voltage of the stage 321 increases from a negative value in a positive direction, the output current increases in the manner indicated by the characteristic A until the input voltage reaches a slightly positive value. After such a slightly positive value of input voltage has been reached, the potential drop across resistance 367 comes into play to maintain the control electrode potential at a substantially constant value, and hence the output current remains at a substantially constant value also. Therefore the characteristic of the stage 321 does not follow the curve A after the input voltage becomes positive, but instead follows the straight line B, indicating that the output current of the stage 321 remains substantially constant for all values of input voltage greater than a small positive value. In obtaining the characteristics A and B experimentally, it has been found that the line B makes a sharp angle with the curve A.

Any tendency of the output current of triode 360 to change is further reduced by the action of the resistance 378. It will be understood that when an increase in the current flow through the resistance 378 takes place, the voltage drop across resistance 378 increases correspondingly, thereby reducing the anode to cathode voltage applied to the triode 360. This results from the fact that the voltage supplied between the line 324 and ground is divided between the drop across resistance 378 and the drop between the anode 361 and cathode 363. The decrease in anode to cathode voltage applied to triode 360 resulting from an increase in current flow through the resistance 378, itself causes a reduction in the current flow through the anode-cathode circuit of the triode 360 thereby tending to restore the current flowing through this circuit to its previous value.

Now consider the operation of the stage 321, having the characteristics described above, in the amplifier circuit shown in FIGURE 11. Referring to FIGURE 15 as an illustration of this operation, let it be assumed that the adjustable tap 373 is set so that the potential drop across resistance 367 has a value indicated at B in FIGURE 15, so that the left-hand terminal of resistance 367 has a positive potential with respect to ground, which potential is equal to the distance C in FIGURE 15. Let it be assumed that an alternating signal potential is impressed on the amplifier input terminals 37 and 38 of a value such that the amplified signal appearing between the left-hand terminal of resistance 367 and ground is represented by the alternating wave D in FIGURE 15. It may be seen that the maximum value of the signal wave D is less than the positive bias potential B. Therefore, the signal wave D, superimposed upon the positive bias voltage C, is never effective to overcome the positive bias voltage so as to render the input voltage of the stage 321 negative. The output current of the triode 360 therefore remains at the same substantially constant value throughout the interval E, during which the signal voltage D is maintained. Since there is no change in the output current flowing in triode 360, no signal is transmitted through the blocking condenser 411 to the control electrodes 385 and 392 of the final power amplification stage 322. The bias voltage established on condenser 405 by means of the rectifier circuit including triode 324 has a polarity such as to maintain the control electrodes 385 and 392 negative with respect to their corresponding cathodes, as indicated by the legend in the drawing. The tap 406 is so adjusted with respect to resistance 402 that the potential across condenser 405 is just sufficient to bias both the control electrodes 385 and 392 to cut off.

Under these conditions, when no signal is transmitted through the blocking condenser 411, the relays 186 and 187 both remain inactive.

The operation of the amplifier circuit will now be considered under the conditions which obtain when the incoming signal applied to the second stage 321 has a miximum value greater than the magnitude of the positive biasing voltage C. Conditions such as these are illustrated in FIGURE 15 as occurring during the interval indicated at G. In order to simplify this discussion of the operation of this circuit, it will first be described as though the feedback circuit including resistance 350 and condensers 351 and 376 were entirely absent.

Let it be presumed then that the alternating input signal superimposed on the positive bias voltage C has a value such as that indicated by the full line F in FIGURE 15. It will be noted that the negative peaks of the alternating signal F completely overcome the positive biasing voltage C and render the input voltage of the stage 321 periodically negative. It may readily be seen by projecting the points on the input signal F upward to the overall input voltage-output current characteristic A—B, and then projecting them to the right along a suitable time axis in a well known manner, that the input voltage represented by the positive biasing voltage C plus the alternating signal F produces in the output circuit of the triode 360 a series of negative impulses H. These negative current impulses produce corresponding positive impulses in the voltage between the anode 361 and the cathode 363. These positive voltage impulses are transmitted through the blocking condenser 411 and applied to the grids 385 and 392 of the tetrodes 381 and 382.

The time phase of the impulses is determined by the time phase of the alternating signal F, which in the system shown depends upon the direction of unbalance of the bridge circuit connected to the amplifier input terminals 37 and 38. Since, in the system shown, the bridge circuit is supplied with electrical energy from secondary winding 317 on the same transformer 310 with the secondary winding 316 which supplies the output circuit of the tetrodes 381 and 382, it should be apparent that the positive voltage impulses appearing on the grids 385 and 392 will be in phase with the anode potential impressed upon one or the other of the tetrodes 381 and 382, depending upon the direction of unbalance of the bridge circuit.

Suppose for example, that the positive voltage waves are applied to the grid 385 so as to make that grid more positive during the same half cycle that the anode 383 is positive with respect to the cathode 386. Corresponding current impulses will then appear in the output circuit of tetrode 381. Each impulse energizes the relay winding 193 and also charges the condenser 411. During the alternate half cycles when no impulse is being transmitted by the tetrode 381, the condenser 412 discharges through the winding 193, thereby maintaining it energized. Energization of relay winding 193 operates through servomotor 50 in the manner previously described to rebalance the bridge circuit and reduce the magnitude of the incoming signal potential to a value less than that of the positive bias voltage C. After the incoming signal potential has been so reduced, the relay winding 193 is no longer energized and the servo-motor 50 is stopped.

It should be noted that, because of the action of the positive bias voltage C, the negative peaks of the input voltage and hence the negative peaks H of the output current are somewhat less than a half cycle in length. Because of this limitation of the length of the impulses, the present amplifier circuit is not critical with respect to the phase of the control electrode potential in the final stage as compared with the anode-cathode potential in that stage. It has been found that in any amplifier circuit, particularly one wherein a plurality of stages are cascaded, a small but nevertheless appreciable phase shift takes place between the signal impressed on the input circuit and the signal produced at the output circuit. Because of this phase shift, a signal of a full half cycle duration appearing on the control electrodes 385 and 392 might overlap both half cycles of the wave during which the anodes 383 and 390 are alternately positive. If the duration of the signal impulses reaching the final stage is limited to less than one-half cycle, as in the present amplifier, considerable latitude as to phase shift of the signal from its normal phase position in either direction is permissible without causing erroneous operation of the two relays, which are to be selectively controlled in accordance with the phase of the signal.

The possibility of erroneous energization of the relays 186 and 187 due to phase shift of the signals is further reduced in the present amplifier by the negative bias on the final stage. The control electrodes of the final stage may be biased sufficiently negatively that an appreciable differential exists between the bias potential and the minimum control electrode potential necessary to produce an output current large enough to energize the relays. The phase of the signal applied to the control electrodes of the final stage may therefore shift by an amount corresponding to the time required for the signal to increase to a value corresponding to that differential without causing erroneous operation of the relays.

The operation of the feedback circuit from the final stage 322 to the second stage 321, and its effect upon the operation of the amplifier as a whole, will now be considered. Referring to FIGURE 11, it will be seen that when the tetrodes 381 and 382 are both non-conductive, no current flows through the resistance 350 and hence no potential difference is maintained across its terminals. If the control electrodes 385 and 392 are not biased to cut-off, a small current flow continuously takes place through the resistance 350, and a small potential drop is maintained across its terminals. Since the operation of the feedback circuit is the same, regardless of whether the normal potential across the resistance 350 is assumed to be zero or some positive value, the operation of this circuit will be considered for the present as though the normal potential across resistance 350 were zero, in order that this explanation may be simplified as much as possible. By the normal potential across the resistance 350 is meant the potential which exists thereacross when no signal is impressed through the blocking condenser 411 to the control electrodes 385 and 392 of the final stage 322. It is believed that if the operation of this circuit is explained when the normal potential across resistance 350 is zero, that its operation under other normal potential conditions will be apparent to those skilled in the art.

Referring to FIGURE 16, it will be seen that when no potential drop exists across resistance 350, that the potential across condenser 376 is equal to the potential between tap 373 and ground, less the potential drop due to current flow through the resistance 370. This potential across condenser 376 is substantially constant, and hence has no effect on the input circuit of the stage 321.

Let it now be assumed that one of the tetrodes 381 or 382 becomes conductive, thereby establishing a potential drop across resistance 350. This potential drop has a polarity such that the upper terminal of resistance 350, as it appears in FIGURE 16, is positive with respect to the lower terminal. The condenser 351 is provided to receive a charge during the half cycles when current is flowing through one of the tetrodes in the final circuit, and to discharge through the resistance 350 during the half cycles when no current is flowing, so as to maintain the potential drop across resistance 350 substantially constant as long as signals are applied to the control electrodes of the final stage 322.

Referring to FIGURE 16, it may be seen that the potentials across resistance 345 and resistance 350 are effectively in series in a loop circuit which may be traced from tap 373 through resistance 345, ground connections 346 and 347, conductor 348, resistance 350, conductor 377, condenser 376, conductor 375, rheostat resistance 370 and condenser 371 in parallel, and the conductor 372 to tap 373. Considering this loop circuit, it may be seen that as the potential drop across resistance 350 increases from zero, the potential applied to the terminals of condenser 356 likewise increases. A charging current therefor flows to the condenser 376 and the direction of flow of this charging current is from tap 353 through resistance 370 and conductor 375 to condenser 376. This charging current produces an additional potential drop across resistance 370 which makes its lower terminal more negative. The variation of the input voltage applied to stage 321 as a result of this charging current is illustrated in FIGURE 15 by the curve J.

This additional negative potential applied to the input circuit of stage 321 tends to increase the magnitude of the current pulses in the output circuit of that stage. These increased output current pulses are in turn reflected in an increased current flow through the resistance 350, with a resulting increase in the charging current flow through resistance 370, thereby making the input voltage of the stage 321 still more negative. The action of the feedback circuit is therefore cumulative but continues so only for a short time, because of the tendency of the triode 360 and tetrodes 381 and 382 of the final stage to become saturated. As the current flow through the resistance 350 approaches its limiting value, which is determined by the saturation of the tetrode through which the current is flowing, the charging current flowing through the resistance 370 begins to decrease in value. This decrease in the potential drop across resistance 370 allows the input voltage of stage 321 to become more positive, thereby decreasing the magnitude of the current pulses in the output circuit of stage 321. A corresponding decrease takes place in the potential drop across resistance 350. As soon as the potential drop across resistance 350 begins to decrease, the potential applied to the plates of condenser 376 is decreased, and the condenser therefore begins to discharge. A discharging current then flows in a direction from condenser 376 through conductor 375, resistance 370, tap 373, resistance 345, and connection 346 to ground. This current flowing through resistance 370 is now in the opposite direction from the charging current which previously flowed therein, and the potential drop produced by this current in resistance 370 is now of a polarity such as to render the input voltage of stage 321 more positive. The magnitude of the current pulses appearing in the output circuit of the stage 321 are thereby further decreased. It may therefore be seen that the effect of the feedback circuit is now becoming cumulative in the opposite direction.

The net effect of the feedback circuit is to supply to the input circuit of stage 321 an alternating potential such as is represented by the curve J in FIGURE 15. Although this curve is shown as substantially a sine wave, it will be readily understood that the shape of the wave may substantially depart from a true sine without interference with the operation of the amplifier circuit. This feedback signal J when added to the input signal F and the positive bias voltage C produces a net input voltage for the amplifier stage 321 which is of the character indicated by the curve K shown in dotted lines in FIGURE 15.

It may therefore be seen that when an alternating signal of constant amplitude is impressed through the blocking condenser 365 to the input circuit of stage 321, the feedback circuit operates to alternately increase and decrease the pulsations which are passed through the second stage 321 and impressed on the control electrodes 385 and 392 of the final stage 322. This characteristic is of great value when the alternating input signals are just sufficiently large to cause current impulses in the output of stage 321, but not large enough to produce voltage impulses on the grids 385 and 392 of the final stage sufficient to overcome the negative bias of that stage and cause operation of the relay. Under such conditions, the feedback circuit comes into play and causes a periodical increase in the magnitude of the current pulses so that the relay is periodically operated, thereby causing the servo-motor 50 to intermittently move the control device along.

For example, in the operation as illustrated in FIGURE 15, let it be assumed that a current impulse of an amplitude greater than the distance between the line B and the line M is necessary if the negative bias of the final stage 322 is to be overcome so as to cause operation of one of the relays. Under such conditions, an alternating input signal of constant amplitude, such as the curve F, would produce current impulses H in the output circuit of stage 321, which would not cause operation of a relay if the feedback circuit were not provided. The feedback circuit comes into play, however, and transforms the input potential of the stage 321 from the value indicated by the curve F to the value indicated by the curve K. Therefore, the current pulsations in the output of stage 321 are of a magnitude indicated by the dotted lines L in FIGURE 15. It will be seen that the amplitude of the pulsations L substantially exceeds the distance between the line B and the line M, thereby causing energization of one of the relays. Because of the operation of the condenser in parallel with the particular relay which is energized, the relay remains energized over the period of at least three cycles during which the impulses L are greater than the distance between the lines B and M.

As a result of the action of the feedback circuit, as soon as the amplitude of the alternating input signal exceeds the positive bias voltage C, a particular relay to be selected in accordance with the phase of the signal is energized for spaced periods of time. As the magnitude of the alternating input signal increases, the frequency of these spaced periods of time remains the same, but the duration of each period of energization increases, so that the average rate of operation of the servo-motor 50 is increased in accordance with the magnitude of the input signal. It may also be seen that as the magnitude of the alternating input signal continues to increase, it will eventually reach such a value that the feedback signal J will not be great enough to overcome it and periodically deenergize the relay. When such a value of alternating input signal is reached, the relay selected is continuously energized.

By adjustment of the tap 373 along the resistance 345, the positive bias voltage indicated at C in FIGURE 15 may be adjusted to any desired value. This positive bias voltage determines the minimum alternating signal passing through blocking condenser 385 which causes operation of the relay. In other words, the adjustment of tap 373 along resistance 345 regulates the sensitivity of the control system. Adjustment of rheostat resistance 370 varies the amplitude of the potential drop due to the charging and discharging current of the condenser 376, and hence varies the amplitude of the feedback signal applied to the input of stage 321. By adjusting the amplitude of this feedback signal, the range of values of alternating input signal which cause intermittent operation of the relays may be established. In other words, while adjustment of the tap 373 along resistance 345 regulates the value of input signal at which the relay starts to be intermittently operated, adjustment of rheostat 370 determines the value of the input signal at which intermittent operation of the relay ceases and continuous operation begins. The rheostat 370 should not be adjusted to make the amplitude of the feedback voltage J greater than the magnitude of the positive biasing potential C, or a condition might be obtained wherein both relays would be operated simultaneously upon the occurrence of a large alternating input signal.

Adjustment of rheostat 370 also changes the time constant of the feedback circuit to some extent and hence affects the frequency of the feedback signal J. The particular frequency chosen is unimportant, however as long as it is sufficiently high to permit the desired sensitivity of the system.

It may therefore be seen that when the amplifier of FIGURE 11 is used in conjunction with the power transmission unit of FIGURE 2, that the power output shaft of the transmission unit is operated at an average rate which varies in accordance with the magnitude of the signal impressed on the amplifier input terminal.

Furthermore, when the amplifier 40 is used in a control system such as the aileron or elevator control systems of FIGURE 1, the power output shaft is operated at an average rate which varies in accordance with the magnitude of the controlling condition. In the rudder control system of FIGURE 1, however, the movement of the slider 12R is affected not only by the magnitude of the controlling condition, but by the rate of change of that magnitude, as explained in connection with FIGURE 3. Therefore, when the amplifier 40 is used in a system such as the rudder control system of FIGURE 1, the output shaft is operated at an average rate which varies in accordance with the resultant of the magnitude and the rate of change of the controlling condition.

The reason for operating the rudder at a rate proportional to the resultant of the deviation and the rate of deviation is that most aircraft have an inherent tendency to "hunt," or oscillate, about a vertical axis. In other words, the aircraft tends to change its direction alternately to opposite sides of the course which it is desired to maintain. It has been found that this tendency may be overcome by introducing into the control system a signal proportional to the rate of deviation of the aircraft from its desired course. On the other hand, there is substantially no tendency of the usual aircraft to hunt about any horizontal axis. If such a tendency were found, it might be overcome in a similar manner.

Therefore, for optimum operation of a flight control system, the elevators and ailerons should be operated at a rate proportional to the deviation of the aircraft from a normal position, and that the rudder should be operated at a rate proportional to the resultant of the deviation and the rate of deviation of the aircraft from a normal direction. From the foregoing description, it will be readily understood that the system disclosed herein has these characteristics.

When the amplifier of FIGURE 11 and the servo motor unit of FIGURE 2 are used in connection with an automatic flight control system such as that shown in FIGURE 1, the adjustment of tap 373 with respect to resistance 345 is placed under the control of the pilot, in order that he may regulate the sensitivity of the control system. In other words, by means of this adjustment, he may regulate the minimum movement of the controlling gyroscope or other instrument which will cause a responsive deflection of a control surface of the airplane. It is quite important that the pilot be able to make this adjustment in order to properly coordinate the system for various air conditions which may be encountered. For example, in rough air, it is usually desirous to operate the system with a somewhat insensitive control and permit the aircraft to "wallow" somewhat. If the control were not made insensitive under such conditions, the control system would be continuously operating first in one direction and then in the other and would thereby produce a very undesirable vibration of the control surfaces which might even lead to their serious damage.

On the other hand, under certain flight conditions it may be desired to keep the control system very sensitive and accurate. For example, when the control system is used on a bomber and it is desired to position the aircraft very accurately in the air above the target, the control system must be made very sensitive in order to secure the utmost possible accuracy of bombing. This accuracy and sensitivity of control need be maintained only for a short period before the moment of releasing the bombs. During such short periods, the control surfaces may be permitted to vibrate if necessary to secure the desired results, without running undue risk of damaging them, as the sensitivity of the control system can immediately be reduced as soon as the need for high sensitivity is passed.

FIGURE 12

In this figure is shown a complete automatic flight control system for operating the control surfaces of an aircraft. The system of FIGURE 12 includes all of the essential features of the system shown in FIGURE 1. Elements in the system of FIGURE 12 which correspond to equivalent elements in FIGURE 1 have been given the same reference characters as their corresponding element in FIGURE 1. For example, the basic rudder, aileron and elevator control net-works are the same in FIGURES 12 and 1 and have been given the reference characters 15R, 15A and 15E respectively.

In addition to the features common to FIGURES 12 and 1, FIGURE 12 shows a system in which a common power supply is used for all the control networks and the amplifiers. The system of FIGURE 12 uses an amplifier unit 500, which is a modification of the amplifier 40 of FIGURE 1, shown in detail in FIGURE 11, and especially adapted for use with this common power supply system. FIGURE 12 also shows an improved interlocking switch arrangement for starting up or shutting down the automatic system when shifting from manual to automatic operation of the control surfaces or vice versa.

In the control system, per se, FIGURE 12, as distinguished from the auxiliaries of the system such as the power supply arrangement and the interlocking starting switches, there are included several novel features which are not present in the system of FIGURE 1. For example, the rudder control network is compensated in accordance with the movements of the aircraft about its longitudinal axis, and the elevator control network is also compensated, but in a somewhat different manner, in accordance with the movements of the aircraft with respect to its longitudinal axis. Furthermore, there is provided in FIGURE 12 an arrangement by which the pilot of the aircraft, by operating a simple electrical control device, may take control of the system away from the directional gyroscope and utilize the power of the servo motors and the automatic compensating features of the control system to change the course of the aircraft.

In order to understand more completely the details of the system of FIGURE 12, first consider the parts of the rudder control system which determine the nature of the signals applied to the input terminals 37R and 38R of rudder amplifier 500R. Connected in series between the signal input terminals 37R and 38R are three signal producing networks, the rudder control network 15R, a rudder compensating network 92R, and a manual rudder control network 501R. The rudder control network 15R is substantially the same as the rudder control network 15R of FIGURE 1. There are two relatively minor differences. One of these is that the centering adjustment rheostats 27R and 30R are simultaneously operable by a single rotatable control member 29R. The other is that an additional centering adjustment rheostat 20R has been provided in one branch of network 15R, so as to permit changes in the centering adjustment smaller than the minimum adjustment of which the main adjustment control member 29R is capable.

The rudder compensating network 92R is electrically equivalent to the aileron compensating network 92 of FIGURE 1. The slider 96R of the rudder compensating potentiometer 97R is operated by the shaft 90 in accordance with the deviation of the aircraft with respect to a longitudinal axis extending therethrough. The rudder compensating network serves to introduce into the rudder control system a signal indicative of the amount of bank and effective to reduce the rudder deflection, as explained hereinafter.

The manual control network 501R is provided to permit the pilot of the aircraft to manually introduce a signal into the rudder control system, and thereby utilize the automatic control system to turn the aircraft. This network 501R comprises a slidewire resistance 502R connected between power supply terminals E, E'. A slider 503R cooperates with resistance 502R, and forms therewith a rudder manual control potentiometer 504R. The slider 503R is movable with respect to resistance 502R by a manual control knob 585. A pair of spaced adjustable taps 506 and 507 engage spaced points near the center of resistance 504R. The taps 506 and 507 are connected through a conductor 508 to the tap 107R of the rudder compensation adjusting potentiometer 106R. A conductor 510R connects the slider 503R of manual control network 501R with signal input terminal 37R of amplifier 500R.

Since the taps 506 and 507 are electrically connected, they create a dead-spot at the center of resistance 502R, and as long as the slider 503R engages this dead-spot no signal is introduced into the input circuit of amplifier 500R by the rudder manual control network 501R. If, however the slider 503R moves beyond either of the taps 506 and 507, it will be readily understood that a portion of the voltage drop across resistance 502R is introduced into the amplifier input circuit as a signal.

In the same manner, the signal impressed on the input terminals 37A and 38A of aileron amplifier 500A are produced in a series circuit including three networks, the main aileron control network 15A, an aileron compensating network 92A, and a manual aileron control network 501A.

The aileron control network 15A is the same as the aileron control network 15A of FIGURE 1, except for the differences mentioned in connection with the rudder control network 15R, and for the fact that the ratio adjusting rheostat 34A is connected in parallel with follow-up resistace 23A rather than in parallel with the resistance 13A of the aileron control potentiometer 14A. The operation of the aileron ratio adjusting potentiometer 34A is the same as in the network of FIGURE 1.

The aileron compensating network 92A is electrically the same as the corresponding network in FIGURE 1, and the aileron manual control network 501A is electrically the same as the rudder manual control network 501R of FIGURE 12. The network 501A is provided to permit the pilot to manually introduce a signal into the aileron control system, and thereby cause banking of the aircraft during a manually controlled turn.

Referring now to the elevator control system of FIGURE 12, it will be seen that the signals supplied to amplifier input terminals 37E and 38E are produced either in the main elevator control network 15E or in an elevator compensating network 511. The main elevator control network 15E is electrically similar to the main aileron control network 15A of the present figure, and need not be further described.

The elevator compensating network 511 includes a slider 512 and a slidewire resistance 513, which together form an elevator compensating potentiometer 514. The slider 512 is moved with respect to the slidewire 513 by shaft 90 of the vertical gyroscope 91 in accordance with the movements of the aircraft about a longitudinal axis passing through it. Both terminals of the resistance 513 are connected through a fixed resistance 515 and a parallel variable resistance 516 to the same supply terminal L. The other supply terminal L' is connected through conductors 517, 518, and 520 to a pair of adjustable taps 521 and 522 associated with the slidewire resistance 513. A slidewire resistance 523 forming part of an elevator compensation adjusting potentiometer 524 is connected between slider 512 and conductor 520. An adjustable slider 525 of the compensating adjustment potentiometer 524 is connected to input terminal 37E of amplifier 500E through a conductor 526.

Since the taps 521 and 522 provide a shunt around the center portion of the slide wire resistance 513, they create a dead-spot at the center of resistance 513. Until the slider 512 moves beyond this dead-spot, the elevator compensating network 511 produces no signal to be impressed on the amplifier 500E. When the slider 512 moves beyond the range of the dead-spot, a potential is impressed between slider 512 and taps 521 and 522 which is transferred to slidewire 523 of the compensation adjusting potentiometer 524. A variable portion of this potential is pressed on the input terminals of the amplifier, depending upon the position of tap 525 on resistance 523. Since the dead spot on the slidewire resistance 513 is connected to power supply terminal L', and since both terminals of the resistance 513 are connected to power supply terminal L, it may be seen that no matter in which direction the slider 512 moves off the dead spot, a signal of the same phase will be applied to amplifier input terminals 37E and 38E. The elevator compensating network 511 is therefore quite different from the other compensating networks numbered 92. In the compensating network 92, the signal produced is of one phase or of the opposite phase, depending upon the direction of movement of the slider away from its center position. In the elevator compensating network 511, however, the phase of the signal is the same regardless of the direction in which slider 512 moves away from its center position. The reason for this difference will be more completely understood in connection with the description of the operation of the system of FIGURE 12.

FIGURE 10 shows in detail the structure by which the taps 521 and 522 may be adjusted to determine the dead-spot on slidewire 513. The taps 521 and 522 comprise a pair of fingers adjustably mounted on the base 257 by a screw and slot connection of conventional type. The ends of the fingers 521 and 522 are bent so as to extend through an aperture in the base 257 and engage the resistance 513. It will be readily understood that a similar arrangement is provided for the taps 100R and 101R of the rudder compensating network, as indicated in FIGURES 7 and 8.

Each of the three amplifiers 500R, 500A, and 500E of FIGURE 12 are provided with five power supply terminals numbered 530, 531, 532 and 533 and 71. The terminals 530 and 531 are connected by conductors 534 and 535 through a suitable source of alternating electrical energy, such as the output terminals 540 and 541 of a rotary converter 542. Power input terminals 71 of the amplifiers are connected through conductors 538, a conductor 543, a push button switch 544, and a conductor 545 to one terminal 67 of battery 64. The other terminal of battery 64 is grounded, and the respective amplifiers 500 are provided with suitable ground connections 539. Rotary converter 542 is supplied with electrical energy from battery 64 through a circuit which may be traced from the left-hand terminal of battery 64 through conductor 545, switch 544, conductors 543 and 538, rotary converter 542, and ground connections 546 and 69 to the opposite terminal of battery 64.

The output terminals 540 and 541 of rotary converter 542 are also connected to the primary winding 550 of a transformer 551 having a secondary winding 552. The secondary winding 552 supplies alternating current to a pair of full wave rectifier circuits. One of the rectifier circuits includes a twin triode 553. One of the triodes in the twin triode 553 includes an anode 554, a control electrode 555, a cathode 556, and a heater filament 557. The other of the triodes in the twin triode 553 comprises an anode 558, a control electrode 559, a cathode 560, and a heater filament 561. The heater filaments 557 and 561 may be energized from any suitable source of electrical energy. The anodes 554 and 558 of the twin triode 553 are connected respectively to opposite ends of the transformer secondary winding 552. The cathodes and the control electrodes of twin triode 553 are connected together and to a filter network comprising a resistance 562 and condensers 563 and 564 connected between the opposite ends of resistance 562 and ground.

The first full-wave rectifier circuit, which includes the twin triode 553 may be traced through separate branches from the opposite terminals of secondary winding 552, one branch going through anode 554 and cathode 556 and thence to a junction with the other branch, which goes through anode 558 and cathode 560. From this junction, the first rectifier circuit may be traced through resistor 562, conductors 536, the various amplifier input terminals 532, and ground connections 539 and 566 to mid-point tap 565 on transformer secondary winding 552.

Since the two triodes of twin triode 553 are alternately conductive, it may be seen that a unidirectional potential is established between the connection of the two cathodes and ground. This potential is applied to the amplifiers 500 through the filter network and the conductors 536, 536R, 536A, and 536E.

The second rectifier circuit supplied by transformer secondary winding 552 includes a twin triode 570. One of the triodes of twin triode 570 includes an anode 571, a control electrode 572, a cathode 573 and a heater filament 574. The other of the triodes in twin triode 570 includes an anode 575, a control electrode 576, a cathode 577, and a heater filament 578. The heater filaments 574 and 578 may be energized from any suitable source of electrical energy. The second full wave rectifier circuit, which includes the twin triode 570 may be traced from mid point tap 565 on secondary winding 552 through ground connection 566, ground connections 539 and terminals 533 on the various amplifiers, conductors 537, anodes 571 and 575, and cathodes 573 and 577 to the opposite terminals of secondary winding 552. Since the two triodes of twin triode 570 are connected oppositely to the respective section of secondary winding 552, the triodes are alternately conductive, and it should therefore be apparent that a direct current flow is produced in conductor 537 and in the various amplifier circuits connected to conductor 537.

It should be noted that anode 554 of twin triode 553 is connected to the left-hand terminal of secondary winding 552 while cathode 573 of twin triode 570 is connected to the same terminal of secondary winding 552. On the other hand, anode 558 of twin triode 553 is connected to the right-hand terminal of secondary winding 552, while cathode 577 of twin triode 570 is connected to the same terminal of secondary winding 552.

It will therefore be seen that the left-hand section of transformer secondary winding 552 supplies current through the left-hand triode of twin triode 553 on one half cycle and through the left-hand triode of twin triode 570 on the other half cycle. In the same manner, the right-hand section of secondary winding 552 supplies current through one-half of twin triode 553 on one-half cycle and current through the one-half of twin triode 570 on the other half cycle. The transformer secondary winding 552 therefore has both its sections active at all times, resulting in a smoother distribution of current through the transformer winding and a more sufficient utilization of the capacity of the transformer.

The battery 64 supplies electrical energy through the terminal N connected to conductor 538 to both the directional gyroscope 10 and the vertical gyroscope 91.

Three push-button switches 580R, 580A and 580E control the flow of direct electrical energy from battery 64 through conductors 581R, 581A and 581E respectively, to the corresponding terminals 46 of the respective power transmission units 50. The current flowing through these circuits serves to energize the brake electromagnets 145 and 165 of the respective power transmission units.

The switches 580 and the switch 544 are of the push-button type, which remain in either opened or closed position when actuated to such position. The switch 544 is provided with a long interlocking bar 581 which extends over the push buttons of the switches 580. By means of the bar 581, when the switch 544 is actuated to open position, all the switches 580 are simultaneously actuated to open position.

From the foregoing description, it should be apparent that the switch 544 controls the supply of electrical energy to all parts of the system except the brake solenoids of the various power transmission units 50. When it is desired to start the control system working, the pilot first closes the switch 544, which starts the rotary converter and the gyroscopes and energizes the amplifier circuits. As soon as the amplifier circuits are heated and ready to function, and the gyroscopes are rotating at full speed, which may take about 15 minutes, the pilot then operates first the rudder centering control 29R until both the signal lights 205R and 207R go out, indicating that the rudder control system is not calling for a turn. The operator then closes the push-button switch 580R, energizing the brake solenoids of the rudder power transmission unit 50R, thereby placing the rudder under control of the automatic system. Until these brake solenoids are energized, the rudder is still under the sole control of the conventional manual operators and is effectively disconnected from the servo-motor mechanism 50R forming part of the automatic system. This process is repeated for both the aileron and elevator control systems. In this manner, the pilot makes sure that the system is not calling for operation of a control surface when it is first connected. Otherwise, when the system is thrown into operation, it might be calling for a substantial deflection of one or more of the control surfaces, thereby resulting in a violent change in the course of the aircraft.

Referring now to the pilot's turn control device 505, it will be seen that this comprises a manually operable knob 585 carrying a pointer 586 which is movable with respect to a stationary scale. The knob 585 is fixed on a shaft which also carries the sliders 503R and 503A of the manual rudder control potentiometer 504R and the manual aileron control potentiometer 504A respectively. The shaft 587 also carries a cam 588 which cooperates with a switch arm 590. The switch arm 590 is flexibly supported at one end, being self-biased for engagement with cam 588, and carries at its free end a contact 591. Positioned immediately below switch arm 590 is a second switch arm 592, also flexibly supported at one end and carrying at its free end a contact 593 which extends completely through it. Positioned immediately below switch arm 592 is a third switch arm 594, also flexibly supported at one end and carrying at its free end a contact 595.

Contact arm 590 is electrically connected with a terminal 596 of a solenoid device 597 (see FIGURE 13) whose opposite terminal 598 is connected to ground. Switch arm 592 is connected to terminal 67 of battery 64. Switch arm 594 is connected to terminal 122 which in turn is connected with relay winding 118, which corresponds exactly to the relay winding 118 of FIGURE 1, and operates a switch arm 119 which controls a circuit disclosed in detail in FIGURE 5.

When the pilot turn control device 505 is in the position shown on the drawings, the sliders 503R and 503A are both in their dead-spot positions, and the circuits controlled by the cam 588 are all opened. The pilot's control device is then in a center or neutral position, in which it is not calling for a turn.

When the turn control device 505 is moved in one direction or the other from its center position, the sliders 503R and 503A are operated to introduce the proper control signals in the rudder and aileron control systems so as to cause the aircraft to turn. At the same time, the cam 588 moves switch arms 590 down so as to engage contact 591 with contact 593 on switch arm 592, and switch arm 592 is also forced downwardly so that contact 593 engages contact 595 on switch arm 594. Upon engagement of contacts 593 and 595, an energizing circuit is completed for winding 118 which may be traced from terminal 67 of battery 64 through switch arm 592, contacts 593 and 595, switch arm 594, terminal 122, and winding 118 to ground and through ground connection 69 to the opposite terminal of battery 64. Energization of relay winding 118 causes switch arm 119 to move out of engagement with back contact 120, which thereby takes gravity responsive switch 275 (see FIGURE 5) out of control of the electromagnetic device 281 which controls the erection of the gyroscope 91 about the longitudinal axis of the aircraft. If the gravity responsive switch 275 were not so disconnected, the centrifugal forces due to the turning of the aircraft might cause false operation of the magnetic erecting structure 281.

At the same time, engagement of contacts 591 and 593 completes an energizing circuit for solenoid 597 (see FIGURE 13.) This circuit may be traced from terminal 67 of battery 64 through switch arm 592, contacts 593 and 591, switch arm 590, terminal 596, solenoid 597, terminal 598 to ground and through ground connection 69 to the opposite terminal of battery 64.

FIGURE 13

In FIGURE 13 is shown an arrangement for clamping the extension 225 which operates the sector panel under the influence of directional gyroscope 10 (see FIGURE 3).

Referring again to FIGURE 13, there is shown a plate 600 having an aperture 601 through which the extension lever 225 passes. The aperture 601 is large enough to permit lateral movement of extension lever 225 throughout its range of movement. The plate 600 supports a solenoid 597, which operates a plunger 602, which is spring biased by means not shown to the upward position shown on the drawing. A lever 603 is pivoted on the plate 600 as at 604. The lever 603 has a long arm pivotally attached to the plunger 602, and a short arm which is pivoted to a connecting link 605. The other end of link 605 is attached to a lever 606, pivoted as at 607 to the plate 600. At an intermediate point, the lever 606 is provided with a bearing surface 608, adapted to engage the extension lever 225 and clamp it against one side of the aperture 601.

When the parts of the clamping device shown in FIGURE 13 are in the position shown, the bearing surface 608 is not engaging extension lever 225, and the latter is free to move. When the solenoid 597 is energized, the plunger 602 is moved downwardly pivoting lever 603 in a counterclockwise direction about the pivot 604, thereby moving link 605 upwardly and rotating lever 606 in a counter-clockwise direction about its pivot 607, thereby moving bearing surface 608 into engagement with extension 225 and securely clamping the latter against movement.

When the extension 225 is clamped, it is no longer under the control of directional gyroscope 10, but maintains its position relative to the plane. It may therefore be seen that if the pilot wants to change the course to be maintained by the gyroscope, he merely operates the control device 505, which closes the circuit previously traced for energizing solenoid 597, thereby clamping the extension lever 225 and taking the gyroscope out of control, and at the same time operates the sliders 503R and 503A so as to cause the aircraft to make a turn. When the aircraft approaches the desired direction of flight, the pilot returns the control device 505 to its neutral position. At this time, the operation of sliders 503R and 503A cause the aircraft to resume a straight course, and at the same time the solenoid 597 is deenergized, so that the control of the direction of flight is returned to the directional gyroscope 10.

*Operation of FIGURES 12 and 13*

When the aircraft is operating in straight level flight, the rudder, aileron, and elevator control systems of FIGURE 12 operate in the same manner as described in connection with the rudder, aileron, and elevator control systems of FIGURE 1. During such operation, the compensating sliders 96R, 96A and 512 do not, except under very unusual conditions, move off the dead-spots of their associated slidewires, and therefore do not affect the operation of the control system.

Now assume that, while operating in a straight level flight, the aircraft deviates from its course for some reason. Let it be further assumed that the directional gyroscope 10 responds to this deviation from the course by calling for a turn of the aircraft to the left. In calling for a turn to the left, the directional gyroscope 10 moves the slider 12R of rudder control potentiometer 14R to the left. At the same time, the cam 115 is rotated clockwise, causing switch arm 116 to engage contact 117, and slider 96A is rotated clockwise, thereby moving downwardly along slide wire resistance 94A.

Movement of slider 12R to the left operates through the rudder control system to cause rotation of shaft 56R counter-clockwise, thereby driving the cables 81R in a direction to deflect the rudder so as to cause a turning of the aircraft, and at the same time operating rebalancing potentiometer 24R to move slider 22R to the left, thereby rebalancing rudder control network 15R.

Closure of switch arm 116 against contact 117, energizes relay winding 118, thereby operating switch arm 119 to remove the gravity responsive switch 275 from control of the vertical gyroscope erecting device, in the manner and for the reasons previously described.

Operation of slider 96A downward along the slide wire resistance 94A introduces a signal into the aileron control system having the proper characteristics to cause shaft 56A to be driven counter-clockwise, thereby moving rebalancing slider 22A to the left and operating the ailerons through the cable 81A so as to lower the left wing of the aircraft and raise the right wing. This movement of slider 22A to the left continues until an unbalance signal appears at the terminals of network 15A which is equal in magnitude and opposite in phase to the signal produced in the system by the aileron compensating network 92A.

The deflection of the rudder to the left, and the operation of the aileron so as to lower the left wing and raise the right wing cause the aircraft to bank and start turning towards a direction indicated by the directional gyroscope 10. In response to the banking of the aircraft, the vertical gyroscope 91 operates the control system in a manner so as to tend to maintain the angle of bank, the turn and the altitude. Specifically, the gyroscope 91 operates the shaft 90 so as to move the sliders 96R, 12A, and 512 to the right along their respective slide wire resistances.

When slider 96R moves to the right, it operates the rudder compensating network 92R so as to introduce into the rudder control system a signal opposite in phase to that previously introduced by the main control network 15R. The effect of this new signal is to reduce the deflection of the rudder and to move slider 22R to the right. This reduction in the rudder deflection is stopped as soon as slider 22R has moved to the right sufficiently to produce at the output terminals of network 15R a signal equal in magnitude and opposite in phase to that introduced by the compensating network 92R. The relative influence of the compensating network 92R and the main control network 15R on the rudder control system may be adjusted by means of the compensation adjusting potentiometer 106R so that the amount of rudder deflection remaining after the second rebalancing action of slider 22R is just sufficient to maintain the aircraft turning in the desired curve without side-slipping or skidding. In most instances this means returning the rudder substantially to its neutral position.

Movement of slider 12A to the right introduces into the aileron control system an alternating signal of phase opposite to that of the signal introduced by downward movement of the slider 96A. The effect of this new signal is to reduce the aileron deflection and to move slider 22A to the right. The slider 22A is moved to the right until the unbalance of the network 15A is equal in magnitude and opposite in phase to the signal introduced by the aileron compensating network 92A. The ratio of the aileron deflection caused by operation of compensating network 92A to the reduction in aileron deflection caused by operation of network 15A may be adjusted through the use of compensation adjusting potentiometer 106A so that the amount of aileron deflection remaining after the signal introduced by both sliders 96A and 12A have been balanced out is just sufficient to maintain the aircraft turning in the desired curve, without side-slipping or skidding. In many cases, the ailerons will thus be returned to their neutral position, since once the plane is banked, it will remain banked with the ailerons in their neutral positions.

Movement of slider 512 to the right introduces into the elevator control system a signal which causes a deflection of the elevators either up or down, as may be required by the particular design of plane on which the system is used to prevent the plane from gaining or losing altitude during the turn. At the same time, the rebalancing slider 22E is operated to the right to produce in the network 15E a signal equal in magnitude and opposite in phase to the signal introduced from the compensating network 511.

It has been found that most aircraft tend to gain or lose altitude during a turn. A given aircraft tends either to gain altitude during every turn in either direction, or to lose altitude during every turn in either direction, depending upon the relationship existing between its center of gravity and the center of balance of the banked horizontal surface areas. Therefore, the elevator compensating network 511 has been devised to introduce a compensating deflection of the elevators in the same sense regardless of the direction of a turn.

In the sequence of operation now under consideration, the aircraft has been turned and banked, and the control surfaces have been adjusted so as to maintain the proper degree of curvature and amount of bank so as to prevent skidding, side-slipping, or gain or loss of altitude.

As the craft continues through its turn, the directional gyroscope 10 gradually moves the rudder control slider 12R to the right back toward its normal central position, rotates the cam 115 counter-clockwise so as to again move switch arm 116 out of engagement with contact 117, and rotates slider 96A counter-clockwise so as to restore it to its central position.

Operation of slider 12R to the right introduces in the rudder control system a signal of characteristics such as to not only bring the rudder completely back to its normal position but additionally to cause a reverse deflection of the rudder. A rebalancing movement of the slider 22R of course then takes place.

Movement of switch arm 116 away from contact 117 deenergizes relay winding 118, allowing switch arm 119 to again engage back contact 120 and to restore the gravity responsive switch 275 to control of the gyroscope erecting device 281.

Rotation of slider 96A clockwise moves it upwardly along resistance 94A thereby operating the aileron compensating network 92A so that it introduces no signal into the aileron control system. The signal at the output terminal of network 15A is therefore not balanced by an equal and opposite signal from compensating network 92A, and causes operation of the ailerons back from their normal position to the opposite position thereby banking the plane in the opposite direction.

Because of the restoring action of the rudder and ailerons under the control of the directional gyroscope 10, the aircraft again tends to resume its original level position. Until it does so however, the vertical gyroscope 91 continues to exert a controlling effect on the various control surfaces in a manner tending to return the rudder to neutral, return the ailerons to neutral and return the elevator to neutral to restore the aircraft more quickly to its normal level position. As the aircraft resumes its level position, the vertical gyro 91 operates sliders 96R, 12A and 512 to the left back toward their normal central position.

As the slider 96R moves to the left, the rudder is moved by cables 81 back towards the normal position and the rebalancing potentiometer 24R is operated to rebalance network 15R. In the same manner, movement of sliders 12A, and 512 to the left tend to restore the ailerons and elevator respectively to their normal positions, and at the same time the rebalancing potentiometers 24A and 24E are operated to rebalance their associated control networks.

During the phase of the turn when the aircraft is being restored to its level position, the compensating potentiometers and the control potentiometers are operating simultaneously, although their operation has of necessity been described separately. It should therefore be borne in mind that the actual position of any control surface at a given time is not controlled by either the main control potentiometer or the compensating potentiometer alone, but is determined by the algebraic sum of the effects of these two potentiometers.

As the operation of the system on a turn to the right is exactly analogous to its operation on a turn to the left, it is believed that a detailed description of such an operation is not necessary.

When a turn is made by the use of the manual control device 505, the positions of the sliders 12R and 96A are fixed by the clamping arrangement shown in FIGURE 13, and the functions of the control potentiometer 14R and of the aileron compensating potentiometer 97A are taken over by the manual control potentiometers 504R and 504A, respectively. During a manually controlled turn, the extension lever 225 is clamped upon a first movement of control device 505, thereby fixing it with respect to the aircraft. The gyroscope 10, however, maintains its position in space, and the clutch band 212 slips over the casing 211 (see FIG. 3). At the same time the aileron axis automatic erecting means is rendered inoperative by energization of relay 118. During this first movement of manual control device 505, the rudder and ailerons are not operated because of the "dead spots" in the slidewire of potentiometers 504R and 504A. On continued movement of the manual control device, these potentiometers are operated to move the rudder and ailerons in order to turn and bank the plane.

When the aircraft is in the banked turn as a result of such manual operation of the rudder and ailerons, the resulting banking of the aircraft will cause the vertical gyroscope of the automatic part of the control system, which incidentally has not been disconnected by actuation of the manual controller 505, to operate the compensating potentiometers 97R, 14A, in the manner heretofore described in connection with the completely automatic operation of flight control system. In other words, the rudder will be returned to its substantially neutral position since with the aircraft once in a banked turn practically no rudder deflection is required to maintain it in such banked turn. Additionally, the ailerons will be returned to their neutral position or substantially thereto since again no aileron deflection or substantially none is required to maintain the aircraft in the same degree of bank after the initial banking movement has taken place. Furthermore, the elevator will be operated in the proper direction to maintain the aircraft at a substantially constant altitude even though a banked turn is being made.

The manual controller 505, after having been initially operated to place the aircraft into the desired turn need not be operated further until the aircraft has turned sufficiently to approach the new direction of flight desired. When this occurs, the manual controller 505 is returned towards its original position. The first movement of this manual controller 505 will return the potentiometer sliders 503R and 503A to the "dead spots" of their associated slidewires. Such action moves the rudder past its neutral position in a direction opposite to the initial rudder movement and likewise operates the ailerons in a direction reversed to that in which they were initially operated. Such rudder movement straightens the aircraft so that it is no longer turning and such operation of the ailerons takes the aircraft out of its bank and places it in level flight again. During this return "unbanking" movement of the aircraft the vertical gyroscope again comes into action and operates the various compensating potentiometers to return the rudder to its neutral position and to likewise return the ailerons and elevator to their neutral positions. The aircraft is now again in normal level flight headed in the new direction desired by the pilot.

Continued movement of the manual control member 505 brings it all the way back to its original position opening the two switches defined by contacts 591, 593 and 595 whereupon the clamping means for the directional gyroscope is released, thereby placing it again back into automatic control in the new direction and the automatic erecting means for the vertical gyroscope is likewise placed back into operation.

It is important that the complete turning operation take place as the result of operation of a single manual controller such as controller 505, since this means that the pilot need operate but a single member. At the same time, it is very important that the aircraft be given time to return to normal level flight in the new direction before the clamping means for the directional gyroscope is released, thereby placing the directional gyroscope back into control of the rudder. This segregation and proper correlation of these functions is obtained in the system of the present invention through the provision of the dead spots on the manually controlled potentiometers, whereby movement of the single manual controller 505 back to its "automatic position" first places the aircraft into normal level flight and thereafter returns the complete system to automatic control.

It is to be understood, of course, that certain of the controlling functions which have been segregated in the above description will overlap certain of the other controlling functions under actual conditions of operation but for the purposes of explanation it has been necessary to segregate them somewhat to illustrate the various control actions which take place automatically as a result of or as an incident to actuation of the manual controller 505.

When the aircraft approaches the desired direction of flight, the pilot returns the control device 505 to a position wherein the sliders 503A and 503R engage the dead spots on their respective resistors, but the cam follower on switch arm 590 remains in engagement with the high dwell portion of the cam 588. (By reference to FIG- URE 12, it may be seen that the dead spots on the potentiometers 504A and 504R are made relatively wider than the notch in cam 588, to permit such an operation.) Due to the inherent lag of the control system, the aircraft is still turning when the potentiometer sliders 503A and 503R reach their respective dead spots, and the gyroscope 10 is still moving relative to the extension lever 225. It is therefore desirable to maintain the lever 225 clamped until the turn is completed and the aircraft is heading in the desired direction. When the aircraft finally straightens out, some time after the movement of potentiometer sliders 503A and 503R to their respective dead spots, the control device 505 is operated to allow the cam follower on switch arm 590 to drop into the notch on cam 588. The lever 225 is then unclamped and the gyroscope 10 operates the lever 225 so as to maintain the new course of the aircraft.

FIGURE 14

There are shown in FIGURE 14 the details of an amplifier circuit 500, which is generally similar to the amplifier circuit 40 shown in FIGURE 11, but which is especially adapted for use in the control system of FIGURE 12, wherein all three amplifiers are provided with a common grid bias supply for the final stage and a common plate voltage and grid bias supply for the preliminary stages. The operation and construction of details of this circuit have been in general completely described in connection with FIGURE 11, and need not be repeated here.

There are several minor differences between the circuit of FIGURE 11 and the circuit of FIGURE 14, which should be mentioned briefly. The gain control potentiometer 325 of FIGURE 11 has been omitted from the circuit of FIGURE 14. The negative terminal of the resistance 402 has been connected to ground through a filter condenser 613. Shields 614, 615 and 616 have been added around the conductors 375, 377 and 352 respectively. The transformer 310 has an added secondary winding 319 not present in FIGURE 11. This secondary winding 319 is used in the rudder and aileron control systems to supply energy to the manual control networks 501R and 501A.

While I have shown and described certain preferred embodiments of my invention, other modifications thereof will readily occur to those skilled in the art, and I therefore wish my invention to be limited only by the scope of the appended claims.

I claim as my invention:

1. A flight control system for an aircraft having a rudder, an elevator and ailerons, comprising in combination, a pair of directional responsive devices a first operated in accordance with the deviation rate of said aircraft from a predetermined couse and the second in accordance with the extent of deviation, a third and fourth control device operated in accordance with the movements of said aircraft about an axis extending longitudinally thereof, a fifth control device operated in accordance with the movements of said aircraft about an axis extending laterally thereof, means for controlling said rudder including the first of said directional control devices, means for controlling said elevator including said fourth control device and fifth control device, and means for controlling said ailerons including the third control device and the other of said directional responsive devices.

2. A flight control system for an aircraft having a control surface movable with respect to said aircraft to cause movement thereof about a predetermined axis, comprising in combination, a normally balanced electrical network, a control device responsive to the movements of said aircraft about said axis, means including said control device for unbalancing said network, means for rebalancing said network, motor means for driving said control surface and said rebalancing means, means responsive to unbalance of said network for controlling operation of said control surface and rebalancing means by said motor, and means responsive to movement of said aircraft about an axis perpendicular to said first-mentioned axis for additionally controlling operation of said motor.

3. A flight control system for an aircraft having a control surface movable with respect to said aircraft to cause movement thereof about a predetermined axis, comprising in combination, an electrical control device responsive to the movements of said aircraft about said axis and operative to produce an electrical signal variable in magnitude in accordance with the deviation of said aircraft from a predetermined position with respect to said axis, motor means for driving said control surface, and means for controlling said motor means including said device and an electronic amplifier having a characteristic such that when said signal is relatively small said control surface is intermittently operated by said motor, while when said signal is relatively large said control surface is continuously operated.

4. A flight control system for an aircraft having a control surface movable with respect to said aircraft to cause movement thereof about a predetermined axis, comprising in combination, a control device movable in accordance with the movements of said aircraft about said axis, motor means for driving said control surface, means including said control device for controlling operation of said control surface by said motor, and means for producing a control effect of a single sense on said motor means and responsive to movement in either direction of said aircraft about an axis perpendicular to said first mentioned axis to produce an additional controlling effect on the operation of said control surface by said motor.

5. In a control system, in combination, a device to be controlled, a normally balanced electrical network including input terminals and output terminals, first variable impedance means for unbalancing said network, second variable impedance means for rebalancing said network, potential responsive means for operating said device and said rebalancing means, a resistance element, means connecting said output terminals and at least a portion of said resistance element in series with said potential responsive means, a slidewire resistance having terminals and a tap at a substantially central point thereon, a source of electrical energy connected between both said slidewire terminals in parallel and said tap, a slider cooperable with said slidewire, means responsive to a condition indicative of a need for modified operation of said device for moving said slider along said slidewire, and connections between said slider, said tap and said resistance element.

6. A flight control system for an aircraft having a control surface, comprising in combination, a pair of control devices, means for operating each of said control devices in accordance with the deviation of said aircraft from a predetermined angular position with respect to one of a pair of mutually perpendicular axes extending through said aircraft, motor means for operating said surface, means operatively connecting said control devices and said motor means so that said motor means is controlled by said devices, manually operable means for effectively removing one of said devices from control of said motor means and for controlling said motor means independently of said one device.

7. A flight control system for an aircraft having aileron control surfaces movable with respect to said aircraft to control the angular position of said aircraft with reference to a predetermined axis, a first control device responsive to the deviation of said aircraft from a predetermined angular position with reference to said axis, a second control device responsive to craft roll attitude, motor means for operating said surface, means operatively connecting both said control devices and said motor means so that said motor means is controlled by said devices, a manual control member having a normal ineffective position, first means operated by movement of said control member away from said normal position for effectively removing said first device from control of said motor means, and second means operated by movement of said control member away from said normal position for controlling said motor means.

8. A flight control system for an aircraft having a control surface, comprising in combination, a pair of control devices, means for operating each of said control devices in accordance with the deviation of said aircraft from a predetermined angular position with respect to one of a pair of mutually perpendicular axes extending through said aircraft, means operated by said devices for varying an electrical potential, motor means for driving said control surface, an electronic amplifier having an input circuit and an output circuit, said amplifier having a characteristic such that said output circuit is energized intermittently or continuously, depending on the magnitude of a potential applied to said input circuit, a connection between said potential varying means and said input circuit, and a connection between said output circuit and said motor means.

9. A flight control system for an aircraft having a control surface, comprising in combination, a pair of control devices, means for operating each of said control devices in accordance with the deviation of said aircraft from a predetermined angular position with respect to one of a pair of mutually perpendicular axes extending through said aircraft, means operated by said devices for varying an electrical potential, motor means for driving said control surface, an electronic amplifier having an input circuit and an output circuit, said amplifier having a characteristic such that said output circuit is energized intermittently or continuously, depending on the magnitude of a potential applied to said input circuit, means for controlling the sensitivity of said amplifier, a connection between said potential varying means and said input circuit, and a connection between said output circuit and said motor means.

10. In a control system for an aircraft having a rudder, an aileron, and an elevator, means for operating said rudder and said aileron in a manner to place said aircraft into a banked turn, and craft tilt responsive means responsive to the banking of the aircraft for operating said elevator in the same direction irrespective of the direction of bank to maintain said aircraft at a substantially constant altitude during said banked turn.

11. In a control system for an aircraft having a control surface for changing the direction of movement of the aircraft in respect to one of its three mutually perpendicular axes, automatic means in control of said control surface for maintaining said aircraft constantly moving in the direction of said one of said axes, manually operable means for removing control of said control surface from said automatic means, manually operable means for controlling said control surface to change the direction of movement of said aircraft in respect to said one of said three axes, and a single manually operable controller for controlling said two manually operable means and arranged to prevent simultaneous movement of said control surface to its normal position and return of the control of said control surface to said automatic means.

12. A flight control system for an aircraft having a control surface movable with respect to said aircraft to control the angular position of said aircraft with reference to a predetermined axis, means for producing a control effect indicative of the deviation of said aircraft from a predetermined angular position with respect to said axis, motor means for driving said control surface, second means for producing a follow-up control effect and driven by said motor means, and means responsive to said two opposing control effects for controlling said motor means so that said motor means operates continuously when the difference of said control effects is large, and intermittently when the difference of said control effects is small.

13. A flight control system for an aircraft having a control surface movable with respect to said aircraft to control the angular position of said aircraft with reference to a predetermined axis, means for producing a control effect indicative of the deviation of said aircraft from a predetermined angular position with respect to said axis, motor means for driving said control surface, second means for producing a follow-up control effect and driven by said motor means, and means responsive to said two opposing control effects for controlling said motor means, and varying its speed in accordance with the magnitude of the difference of said control effects, said speed variation being obtained at least in part by intermittent energization of said motor.

14. A flight control system for an aircraft having a rudder, comprising in combination, a heading responsive means, a control device movable thereby in response to changes in the angular position of said aircraft with respect to a vertical axis and developing a voltage signal variable in magnitude with such changes, variable speed motor means for operating said rudder, means operatively connecting said device and said motor means so that said motor means is controlled by said device at a speed in accordance with said variable signal, a manual control member remote from said heading responsive means and having a normal ineffective position, first means operated by movement of said control member away from said normal position for clamping said control device, and second means operated by movement of said control member away from said normal position developing a second voltage signal in accordance with change in position of said control member for controlling said motor means.

15. A flight control system for an aircraft having a rudder, an elevator, and ailerons comprising in combination, a pair of control devices a first thereof operated in accordance with the direction and rate of deviation of said aircraft from a predetermined course and a second operated in accordance with the direction and extent of deviation, a third and fourth control device operated in accordance with the extent of angular movement of said aircraft about an axis extending longitudinally thereof, a fifth control device operated in accordance with the extent of angular movements of said aircraft about an axis extending laterally thereof, means for controlling said rudder including the first of said control devices, means for controlling said elevator including said fourth control device and said fifth control device, and means for controlling said ailerons including the second of said pair of control devices and the third control device, the third control device having an opposite effect on said ailerons from the second of said pair of devices.

16. A flight control system for aircraft having an elevator control surface comprising in combination, gyroscope means, a pair of control devices operated by said gyroscope means in accordance with the movement of said aircraft about a pair of mutually perpendicular axes extending therethrough, each of said control devices being associated with one of said axes, and means for controlling said control surface including both said control devices.

17. A flight control system for aircraft having an elevator control surface comprising in combination, gyroscope means, a pair of control devices operated by said gyroscope means in accordance with the movement of said aircraft about a pair of mutually perpendicular axes extending therethrough, each of said control devices being associated with one of said axes, and means for controlling said control surface including both said control devices, one of said control devices always acting in the same sense irrespective of the direction of movement of the aircraft.

18. A flight control system for an aircraft having a control surface, comprising in combination, a pair of control devices operated only in accordance with the movements of said aircraft about a pair of mutually perpendicular axes extending therethrough, each of said control devices being associated with one of said axes, means for producing a control effect on said control surface including one of said control devices, and means for producing an additional control effect on said surface in response to operation of the other of said control devices, beyond a predetermined range.

19. A flight control system for an aircraft having a rudder, comprising in combination, means normally freely movable about a vertical axis, a control device operated by said means in accordance with the movements thereof with respect to said axis, clutch means having driving and driven members continually engaged connecting said means and said device, operating means for said rudder, means operatively connecting said device and said operating means, a manual control member having a normal ineffective position, first means operated by movement of said control member away from said normal position for clamping said control device, said clutch means permitting relative movement of said driving and driven members in their direction of action and thus of said freely movable means and said control device when the latter is clamped, and second means operated by movement of said control member away from said normal position for controlling said operating means.

20. A flight control system for an aircraft having a control surface movable with respect to said aircraft to control the angular position of said aircraft with reference to a predetermined axis, a control device responsive to the deviation of said aircraft from a predetermined angular position with reference to said axis, motor means for operating said surface, means operatively connecting said device and said motor means so that said motor means is controlled by said device, a manual control member having a normal ineffective position, first means operated by movement of said control member away from said normal position for effectively removing said device from control of said motor means, and second means operated by movement of said control member away from said normal position for controlling said motor means, said second means being operative only after a predetermined movement of said first means.

21. A flight control system for an aircraft having a control surface movable with respect to said aircraft to control the angular position of said aircraft with reference to a predetermined axis, means for producing a control effect in response to the deviation of said aircraft from a predetermined angular position with respect to said axis, motor means for driving said control surface, means for producing a follow-up control effect and driven by said motor means, and means responsive to the difference of said control effects and operable intermittently when said difference is small and operable continuously when said difference is large for controlling said motor means.

22. A flight control system for an aircraft having a control surface movable with respect to said aircraft to control the angular position of said aircraft with reference to a predetermined axis, means for producing a control effect in response to the deviation of said aircraft from a predetermined angular position with respect to said axis, motor means for driving said control surface, means for producing a follow-up control effect and driven by said motor means and means responsive to the difference of said control effects for controlling said motor means so that said motor means operates continuously when the difference of said control effects is large, and intermittently when the difference of said control effects is small, said responsive means being adjustable so as to be non-responsive to small deviations of the aircraft.

23. A flight control system for an aircraft having a control surface movable with respect to said aircraft to control the angular position of said aircraft with reference to a predetermined axis, means for producing a control effect in response to the deviation of said aircraft from a predetermined angular position with respect to said axis, motor means for driving said control surface, and means responsive to said control effect for controlling said motor means so that said motor means operates continuously when said control effect is large, and intermittently when said control effect is small, said responsive means being adjustable so as to be non-responsive to small deviations of the aircraft, said responsive means including an amplifier whose bias may be altered to prevent operation of said motor means for small deviations.

24. Electrical control apparatus, comprising in combination, a load device to be positioned, motor means for driving said load device, a source of power and variable resistance means connected to said source of power to provide a first electrical network having a pair of terminals across which appears a voltage dependent upon the condition of said variable resistance means, means responsive to a variable condition indicative of the need for operation of said device for varying said variable resistance means to vary the voltage across said pair of terminals, a resistance element having an impedance high in comparison to that of said one network and connected across said terminals, a contact movable along said resistance, a further source of power and further variable resistance means connected to said source of power to provide a second electrical network having a pair of output terminals across which appears a voltage dependent upon the condition of said further variable resistance means, manually operable means for varying said further variable resistance means in said second network, means for connecting one of said second network terminals to said contact, a third source of power and a third variable resistance means connected thereto and forming a third network having a pair of output terminals across which appears a voltage dependent on the condition of said third variable resistance means, operating connections from said motor means for varying said third variable resistance, a connection from a third network terminal to a first network terminal, potential responsive means for controlling said motor means and connected to one of said third network terminals and the other of said second network terminals, and means for moving said contact along said resistance to control the relative effects of said networks on said potential responsive means and manually operable means in said third network for varying the ratio of motor means operation with respect to the response of said condition responsive means and the operation of said manual means.

25. In an automatic control device for a craft, the combination with a position-maintaining means for detecting movement of said craft about a control axis thereof, a control surface controlling the attitude of said craft about said control axis and servomotor connected to said control surface, of a pick-off means actuated by movement of said position-maintaining means relative to said craft for producing alternating voltage the magnitude of which varies as a function of the deviation of said craft from a predetermined attitude and the phase of which relative to a reference voltage varies in accordance with the direction of said deviation, follow-up means actuated by movement of said control surface relative to said craft for producing an alternating voltage the magnitude of which varies as a function of deviation of said control surface from a neutral position and the phase of which relative to said reference voltage varies in accordance with the direction of movement of said control surface from said neutral position, means for comparing the voltages produced by said pickoff means and said follow-up means so as to produce a resultant control voltage the magnitude and phase of which is indicative of the positions of the control surface and position-maintaining means relative to each other, and means controlled by said resultant voltage for controlling energization of said servomotor whereby it may be energized intermittently or continuously depending on the magnitude of said resultant voltage to actuate said control surface in a direction determined by the phase of said resultant voltage and at an average rate variable as a function of the magnitude of said resultant voltage.

26. Control apparatus for an aircraft comprising: course responsive means for detecting change in angular position of said craft about its vertical axis; an adjustable control device controlled thereby for producing a voltage signal in proportion to the deviation; an attitude responsive device for detecting changes in attitude of said craft about its longitudinal axis; a second adjustable control device controlled by the attitude responsive device for producing a voltage signal in proportion to change in attitude; a first means for obtaining a voltage signal which is the resultant of the signals obtained from the two adjustable control devices; and a rudder power means controlled by the first means and responsive to the resultant signal.

27. Control apparatus for an aircraft comprising: a course responsive means for detecting changes in angular position of said craft about its vertical axis; a control device controlled thereby for producing a voltage signal in proportion to the magnitude of the deviation, an attitude responsive device for detecting changes in attitude of said craft about its longitudinal axis; a second control device controlled by the attitude responsive device for producing a voltage signal in proportion to the change in attitude; each control device including a part adapted to be connected to a source of alternating current and a coacting part, wherein relative movement of said parts from a normal position in either of two directions provides a signal in the unenergized part in proportion to the magnitude and direction of the relative movement; combining means for obtaining a resultant voltage signal from said first and second control devices; and aileron power means controlled by said combining means.

28. Control apparatus for an aircraft comprising: a first control surface power means; a second control surface power means; means for operating the first control surface power means in either direction; means responsive to tilt of said aircraft in either direction about a first axis from a normal position resulting from the operation of the first control surface power means; and further means operated by said tilt responsive means for operating the second control surface power means in a manner to cause rotation of the craft in a single direction about a second axis of the craft irrespective of the direction of tilt of said aircraft from said normal position about said first axis.

29. Control apparatus for an aircraft comprising: individual power means adapted to be connected to a rudder; ailerons, and elevator; control means for each power means, each control means including a balanceable system having adjustable control devices for affecting the balance of said system; means for adjusting a control device in the control means for each of said rudder power means and said aileron power means; a rebalancing control device in said rudder power control means operatively driven by said rudder power means in accordance with displacement thereof; a rebalancing control device in said aileron power control means operated by said aileron power means in accordance with displacement thereof; means responsive to roll of said craft for operating a third control device in each of the rudder power control means and the aileron power control means and also operating a control device in the elevator power control means to effect return of the rudder power means and aileron power means toward normal position and to move the elevator power means in a single direction irrespective of the direction of roll.

30. Control apparatus for an aircraft comprising: a control surface power means; means for controlling operation of said power means; a balanceable control circuit connected to said controlling means including three signal providing devices; a first gyroscope responsive to change in its angular position for operating one device; follow up means driven by said power means for operating a second device; manually operable means for operating a third device, a second gyroscope having gravitational responsive means to maintain its rotor in a selected relation with respect to its support, and means operated by said manually operable means for rendering said gravitational responsive means ineffective with respect to said second gyro rotor and to render said first gyroscope ineffective to operate said one device.

31. Control apparatus for an aircraft comprising: a control surface power means; a gyroscope responsive to change in its angular position; a pick-off device having two relatively movable parts; operative connections comprising a plurality of elements from said gyroscope to one part of said pick-off to displace one part with respect to the other in either direction from a normal position said elements being arranged to enable relative displacement of said elements on rapid change in angular position; control means including said pick-off for obtaining an alternating voltage signal proportional to the magnitude and rate of change in the angular position of said gyroscope; and two windings alternatively energized depending on the phase of said signal for controlling said power means.

32. Control apparatus for an aircraft comprising: a gyroscope responsive to change in its angular position; an angular position transmission means including means enabling relative displacement of elements thereof only on sudden position changes; a member operated by said gyroscope through said transmission means; a fixed member, means for obtaining solely from the relative movements of said operated and fixed members an alternating signal which varies in phase with the direction of change in angular position of said gyroscope and whose magnitude varies with the magnitude and rate of change in angular position of said gyroscope; alternative means one of which is energized depending on the phase of said signal, and control surface power means controlled by said alternative means.

33. An automatic pilot for an aircraft having movable aileron and elevator control surfaces thereon, a servomotor for operating said aileron surface, a servomotor for operating said elevator surface, an artificial horizon gyro defining a fixed reference for said craft, bank and pitch signal take-off means on said gyro for producing electrical signals in response to a bank or pitch of said craft to operate said motors to actuate said surfaces whereby said craft is caused to return to a predetermined attitude, means connected for operation by said aileron motor for producing a follow-back electrical signal upon movement of said aileron surface for mixing with the bank signal to modify operation of said aileron motor, means connected for operation by said elevator motor for producing a follow-back electrical signal upon movement of said elevator surface for mixing with the pitch signal to modify operation of said elevator motor and further means responsive to bank for operating said elevator servomotor.

34. Control apparatus for an aircraft having aileron and rudder control surfaces for controlling desired turning of the aircraft, said apparatus comprising: aileron and rudder servomotor means for positioning said control surfaces; a first and a second signal responsive means for operating respectively said rudder and aileron servomotor means; a first means providing a signal proportional to the amount and direction of deviation of said aircraft from a predetermined heading; a second means providing a signal dependent upon the rate and direction of said deviation; a third means connected to the first means and adapted to vary the magnitude of said signal from said first means without affecting said signal from said second means; and means for energizing said first and second signal responsive means respectively in accordance with the signals from said second means and said third means.

35. In an automatic pilot for an aircraft having rudder and aileron control surfaces for controlling the attitude of said craft about the turn and back axes thereof; position-maintaining means for detecting movement of the craft about said turn and bank axes thereof; a rudder and an aileron servomotor means for moving the rudder and aileron control surfaces respectively; control means associated with each servomotor means for controlling said servomotor means, each said control means comprising a pickoff voltage controller and a follow-up voltage controller, each of said voltage controllers having a control member adjustable in either direction from a normal position, means including said pickoff and said follow-up voltage controllers and including connections to a source of alternating voltage power for producing a resultant alternating current voltage, the magnitude and phase of which varies in accordance with the algebraic sum of the directions and amounts of movements of said control members from their normal positions, phase sensitive means responsive to the phase and magnitude of said resultant alternating current voltage for controlling the speed and direction of movement of the associated servomotor means in accordance with the magnitude of and the phase of said voltage with respect to the power source, means actuated by said position-maintaining means for actuating the control member of said pickoff voltage controller to affect the magnitude and phase of said resultant voltage in accordance with the extent and direction of relative deviation of the craft and the position-maintaining means, and means responsive to movement of the control surface for actuating the control member of said follow-up voltage controller in a direction to reduce the magnitude of said resultant voltage so that the servomotor through its positioning of the control surface tends to cause said craft to be stabilized in a predetermined attitude about the particular control axis; said control means for said rudder and aileron servomotor means thus being effective to maintain the aircraft in a stabilized attitude about both the turn and roll axes; and voltage changing means controlled by a single manual operator for simultaneously changing the value of said resultant alternating voltage in connection with each of said servomotor means to cause a banked turn of said craft.

36. An automatic pilot for an aircraft having movable aileron and elevator control surfaces thereon, a servomotor for operating said aileron surface, a servomotor for operating said elevator surface, a gyro defining a fixed reference for said craft, bank and pitch signal takeoff means on said gyro for producing signals in response to a bank or pitch of said craft to operate said motors to actuate said surfaces whereby said craft is caused to return to a predetermined attitude, means connected for operation by said aileron motor for producing a followback signal upon movement of said aileron surface for mixing with the bank signal to modify operation of said aileron motor, means connected for operation by said elevator motor for producing a follow-back signal upon movement of said elevator surface for mixing with the pitch signal to modify operation of said elevator motor, manually controlled means movable in either of two directions for producing a further signal to operate said aileron motor to cause banking of said aircraft in a direction dependent upon movement of said manually controlled means, and further means effective during banking of said aircraft resulting from operation of said manually controlled means to supply a further signal to operate said elevator motor in an up-elevator direction regardless of the direction of operation of said manually controlled means.

37. In an automatic pilot mechanism for an aircraft having control surfaces for controlling the craft about its turn, roll, and pitch axes: position-maintaining means for detecting movement of said craft about each of its turn, roll, and pitch axes; a servomotor means connected to the control surface for each axis to position the control surface; means for controlling each of said servomotor means from the position-maintaining means to cause the craft to be stabilized about the control axes with which that servomotor means is associated so that the craft is normally automatically stabilized about all three axes; turn control means including a control member manually movable with respect to a normal position and effective when said manual control member is moved from said normal position to cause the control of the servomotor means associated with the turn and roll axes to be modified so as to cause the craft to enter a banked turn in a direction depending upon the direction of movement of said manually movable member with respect to said normal position; means for causing the servomotor means associated with the pitch axis to move the control surface associated with the pitch axis in a direction tending to cause upward tilt of the craft; and means effective during the time that said craft is in such a banked turn as the result of operation of said turn control means to cause operation of said last named means regardless of the direction of said banked turn.

38. In an automatic pilot for an aircraft having a control surface that is manually or automatically operable, in combination: a position-maintaining means for detecting movement of said craft about a control axis thereof, a servomotor, a pickoff means actuated by movement of said position-maintaining means relative to said craft for producing an alternating voltage the magnitude of which varies as a function of the deviation of the said craft from a predetermined attitude, a follow-up pickoff actuated by movement of said control surface relative to said craft for producing an alternating voltage the magnitude of which varies as a function of the movement of said control surface from a neutral position, means for connecting or disconnecting said servomotor from said control surface to permit automatic operation of said surface or manual operation of said surface without operating said motor, and means responsive to the algebraic sum of both said pickoff alternating voltages for controlling the extent of operation of said servomotor whereby said control surface is positioned in accordance with the voltage from said position-maintaining means pickoff, said follow-up pickoff being connected to said control surface on the driven side of said connecting means so that the voltage produced by said follow-up pickoff is always determined by the extent of movement of said control surface regardless of any slippage in said connecting means.

39. A flight control apparatus for an aircraft having a rudder and ailerons, comprising in combination: a control device movable in response to changes in the angular position of said aircraft with respect to a vertical axis, motor means for operating said rudder and ailerons, means operatively connecting said device and both said aileron and rudder motor means so that both said motor means are controlled by said device, a manual control member having a normal ineffective position, first means effective upon movement of said control member away from said normal position for clamping said control device against movement thereof, and second means operated by movement of said control member away from said normal position for controlling both of said motor means.

40. Flight control apparatus for an aircraft having aileron and rudder control surfaces movable with respect to said aircraft to control the angular position of said aircraft with refeernce to two predetermined axes, said apparatus comprising: heading sensing means and heading rate sensing means responsive respectively to the deviation and deviation rate of said aircraft from a predetermined angular positiion with reference to one of said axes, motor means for operating said rudder surface, means operatively connecting said heading rate sensing means and said motor means so that said motor means is controlled by said heading rate sensing means, roll attitude sensing means responsive to deviation of said aircraft about the second axis, motor means for operating said ailerons, means operatively connecting said attitude sensing means and said aileron and rudder motor means so that said ailerons and rudder are controlled by said attitude sensing means, means connecting said heading sensing means and aileron motor means, a manual control member having a normal ineffective position, first means operated by movement of said control member away from said normal position for effectively removing said heading sensing means from control of said aileron motor means, and further means operated by movement of said control member away from said normal position for controlling said aileron motor means.

41. In an automatic pilot for an aircraft having a control surface for altering the position of said craft about an axis, the combination of: servo means for operating the surface; course change responsive means; means including said course change responsive means for producing a resultant voltage signal in accordance with the extent of course change of said craft about said axis, the rate of course change about said axis, and the extent of operation of said servo means; means controlled thereby for operating said servo means, for stabilizing said craft with respect to said axis; manually operable means connected to said controlled means for producing a voltage signal to alter the course of said craft with respect to said axis; and means actuated by said manually operable means for preventing said course change responsive means from affecting said resultant voltage signal during manually selected changes in course.

42. In an automatic pilot for aircraft provided with rudder, aileron and elevator surfaces, the combination of servomotors for actuating said surfaces, course change responsive means for controlling said rudder servomotor to actuate said rudder when said craft departs from a predetermined course, attitude change responsive means for controlling said aileron and elevator servomotors to actuate said ailerons and elevator when said craft departs from a predetermined attitude, and means including switch means operable by the pilot of said craft for connecting said servomotors to and disconnecting said servomotors from their respective control surfaces and for operatively connecting said course change responsive means to and disconnecting it from said rudder servomotor.

43. Control apparatus for an aircraft provided with a rudder and ailerons, said apparatus comprising: rudder servo means; aileron servo means; heading control means comprising a movable member, a first signal generator, a second signal generator both said generators being driven by said member and developing an electrical signal proportional to the movement of said member; a rudder servo follow-up signal generator positioned by said rudder servo means; an aileron servo followup signal generator positioned by said aileron servo means; a first signal combining and responsive means controlled by a resultant signal from said first and rudder servo follow-up signal generators for operating said rudder servo means; a second signal combining and responsive means controlled by a resultant signal from said second and aileron servo follow-up generators for controlling said aileron servo means; and means for modifying the relative proportion of the signals from the first and second signal generators applied to their signal responsive means to correlate the amount of aileron to rudder displacement.

44. A flight control apparatus for an aircraft comprising attitude responsive means; means for supporting said attitude responsive means for tilt about a lateral and longitudinal axis; means including a first control device operable from a normal position in one or the other of two directions in accordance with movements of said attitude responsive means about the lateral axis to provide a signal which varies in phase with direction of movement; a second control device operable from a normal position in one or the other of two directions in accordance with movements of said attitude responsive means about the longitudinal axis; a second means operated by the second control device to provide a signal of a single phase irrespective of the direction of movement of said second control device; elevator power means; and means for controlling said elevator power means including said first control device means and said second means.

45. Control apparatus for an aircraft having a control surface movable with respect to said aircraft to cause movement thereof about a predetermined axis, said apparatus comprising: course responsive means for detecting movement of said craft about its vertical axis; a first control device adapted to provide a variable voltage signal by having a part thereof movable in accordance with the movements of said craft about said vertical axis; reversible electric motor means for driving said control surface; means including said control device for controlling operation of said motor; attitude responsive means; and means including a second control device connected to the attitude responsive means and adapted to provide a variable voltage signal by having a part thereof responsive to movement of said aircraft away from a predetermined normal position about an axis perpendicular to said first mentioned axis, said second control device being connected in series electrically with said first control device to produce an additional controlling effect on the control surface by said motor, said additional control effect varying in sense in accordance with the direction of deviation of said aircraft from said predetermined position, said first device including a ratio control to select a desired fraction of the variable voltage signal therefrom.

46. Control apparatus for an aircraft comprising: a position maintaining device; a first signal controller operated from said device in accordance with change in position of said aircraft relative to said position mantaining means and developing an alternating voltage variable in phase in accordance with the direction of relative movement of said craft and device and in mangitude in accordance with extent of difference of position of said craft and device; a rotatable electric motor having an output shaft; a pair of gears; means for reversely rotating said gears from said motor; an output shaft adapted to position a control surface of said craft; clutch means between each gear and output shaft; a second controller operated by said output shaft for generating an alternating voltage variable in phase with the direction of rotation of said output shaft from a normal position and variable in magnitude in accordance with the amounts of rotation of said shaft; and control means connected to said two controllers and energizing one or the other of said clutch means depending upon the resulting signal from said two controllers.

47. In a control system, having a device to be controlled, in combination, a normally balanced electrical network including input terminals and output terminals, first variable impedance means for unbalancing said network, second variable impedance means for rebalancing said network, potential responsive means for operating said device and said rebalancing means, means connecting an output terminal of said network to said potential responsive means, a slide-wire resistance having two terminals and a tap at a substantially central point thereon, a source of electrical energy having one power terminal connected to both said slide-wire terminals in parallel and the other power terminal to said tap, a slider co-operable with said slide-wire, means for moving said slider along said slide-wire, connections from said tap to the remaining terminal of said network, and connections from said slider to said potential responsive means.

48. Control apparatus for an aircraft comprising: a manually operable controller; motor means connected to said controller and controlled thereby for placing said aircraft in a banked turn; a balanceable electrical network; a further motor means controlled by said network; means for unbalancing said network in but one direction during bank of said craft in either direction; means driven by said further motor means for rebalancing said network; and means operated by said further motor means to oppose loss in the altitude of the craft while said craft is in said banked turn.

49. In an automatic pilot for an aircraft having rudder and aileron control surfaces for controlling the attitude of said craft about the turn and bank axes thereof; position-maintaining means for detecting movement of the craft about said turn and bank axes thereof; a rudder and an aileron servomotor means for moving the rudder and aileron control surfaces respectively; control means associated with each servomotor means for controlling said servomotor means, each said control means comprising a pick-off voltage controller and a follow-up voltage controller, each of said voltage controllers having a control member adjustable in either direction from a normal position, means including said pick-off and said follow-up voltage controllers and including connections to a source of alternating voltage power for producing a resultant alternating current voltage, the magnitude and phase of which varies in accordance with the algebraic sum of the directions and amounts of movements of said control members from their normal positions, phase sensitive means responsive to the phase and magnitude of said resultant alternating current voltage for controlling the speed and direction of movement of the associated servomotor means in accordance with the magnitude of and the phase of said voltage with respect to the power source, means actuated by said position-maintaining means for actuating the control member of said pick-off voltage controller to affect the magnitude and phase of said resultant voltage in accordance with the extent and direction of relative deviation of the craft and the position-maintaining means, and means responsive to movement of the control surface for actuating the control member of said follow-up voltage controller in a direction to reduce the magnitude of said resultant voltage so that the servomotor through its positioning of the control surface tends to cause said craft to be stabilized in a predetermined attitude about the particular control axis; means further included in the control means associated with the rudder servomotor means for varying the resultant voltage in said control means in accordance with the rate of movement of the craft about the turn axis thereof; said control means for said rudder and aileron servomotor means thus being effective to maintain the aircraft in a stabilized attitude about both the turn and roll axes; a manual control member having a normal ineffective position; clamping means effective upon movement of said control member away from said normal position for clamping the control member of the pick-off voltage controller in the control means associated with the rudder servomotor means; and voltage changing means electrically connected to both of said control means and operated by said movement of said single manual operator for simultaneously changing the value of said resultant alternating voltage in connection with each of said servomotor means to cause a banked turn of said craft.

50. In an automatic pilot for aircraft provided with a rudder surface, the combination of course change responsive means developing a signal of a magnitude variable with extent of course error, servo means operated at a rate in accordance with said error for normally controlling the rudder surface to maintain the craft against deviation from a prescribed course during linear flight, selective rudder turn means for developing a signal variable in magnitude with extent of its operation to actuate the servo means and rudder surface and thereby change the craft course independently of said course change responsive means, means for operating said rudder turn means, means for making the course change responsive means ineffective on said servo means and rudder, and rudder trim means connected in series with said rudder turn means and actuating said servo means for trimming the rudder surface.

51. In an automatic pilot for aircraft provided with a rudder surface, the combination of course change responsive means developing a signal of a magnitude variable with extent of course error, servo means operated thereby at a rate in accordance with said signal for normally controlling the rudder surface to maintain the craft against deviation from a prescribed course during linear flight, selective rudder turn means comprising a normally balanced potentiometer device for developing, when unbalanced, a signal variable in magnitude with the extent of operation thereof to actuate the servo means and rudder surface and thereby change the craft course independently of said change responsive means, means for unbalancing said potentiometer device, and means for making the course change responsive means ineffective on said rudder.

52. In an automatic pilot for aircraft provided with a rudder surface, the combination of course change responsive means for normally controlling the rudder surface to maintain the craft against deviation from a prescribed course during linear flight, rate of course change responsive means for modifying operation of the rudder surface, rudder turn means connected in series with said rate of course change responsive means for developing a signal to actuate the rudder surface and thereby change the craft course, means for actuating said rudder turn means, and means for making the course change responsive means ineffective on said rudder.

53. In an automatic steering system for mobile craft having a control surface and driving means operating at a rate dependent on the signal applied thereto for operating the surface, the combination of reference means for producing a first signal variable in magnitude in response to the extent of departure of said craft from a predetermined position to energize the driving means, follow-up means connected for operation by the driving means for producing a second variable magnitude signal opposing said first signal for modifying the energization of the driving means, turn means connected with said second signal producing means for altering craft position comprising a normally balanced potentiometer device having a wiper arm at a central point thereof for developing a third variable magnitude signal to energize the driving means and thereby turn the craft in a preselected manner, and means operable during operation of said turn means for making said reference means ineffective on said driving means.

54. In an automatic pilot for dirigible craft having a control surface for controlling movement of said craft about an axis thereof, means for actuating said control surface, a pair of means including a first means responsive to turning movements of said craft about one axis and a second means responsive to turning movements of said craft about a second axis, said pair of means being connected to control said actuating means, and means for varying the relative proportionality of the control exercised by said pair of means over said actuating means.

55. In combination in an automatic control system for maintaining a condition at a desired value, said system having means to control said condition, detecting means to detect departure of said condition from said value, signal means connected to said control means and producing an electrical signal of variable magnitude, and connecting means for connecting and disconnectig said detecting means and said signal means and serving to maintain the variable magnitude electrical signal therefrom constant for a limited time while disconnected at the zero error value of the system, said connecting means and said signal means serving to compensate for any zero error in the system by reconnection after disconnection whereby said signal means continually produces said maintained signal containing said zero error and introduces it into the system by said reconnection.

56. In an automatic pilot control system for maintaining a movable craft on a desired course, said automatic pilot operating means to control said craft with respect to said course, in combination: detecting means to detect departure of said craft from said course, signal means connected to said control means and providing a variable magnitude alternating voltage signal and two-position variable connecting means joining said detecting means and said signal means, in one position of said connecting means said signal means producing an alternating voltage signal determined by said detecting means and in another position of said connecting means said signal means producing a constant alternating voltage signal equal to the last previous value detected by said detecting means, said signal means thus being caused to signal to said control means detected departures from said course and any zero error in the system whereby said craft can be stabilized on a selected course and any zero error compensated.

57. An automatic control system for maintaining a condition at a predetermined value comprising a detector giving a mechanical indication of the deviation of the condition from the predetermined value, a signal generator mechanically coupled to said detector through a clutch and giving a signal in accordance with said deviation, a servo system controlling the condition and controlled by said signal, means for effecting driving and preventing driving of said signal generator through the clutch, the signal from the generator being prevented from varying upon the preventing of driving through said clutch and during such time as the clutch is so controlled, and means for causing relative movement of the engaging members of said clutch when driving is prevented, whereby, if any zero error exists in the system so that the condition is stabilized at a value other than the predetermined value, the generator may be made nondrivable from the detector or drivable therefrom with the condition at the predetermined value and the generator emitting a signal compensating for said zero error.

58. An automatic control system for maintaining a condition at a predetermined value comprising a detector giving a mechanical indication of the deviation of the condition from a predetermined value; an electrical potentiometer the moving part thereof being mechanically coupled through a clutch to said detector, giving an electric signal in accordance with said deviation; an electric servo system controlling the condition and controlled by said signal, means for effecting driving and for preventing driving through the clutch means for insuring that the signal does not vary upon the preventing of driving through said clutch and during such time as driving through said clutch is prevented, and means remote from said detector and providing a second electric signal to said servo system to change the condition for causing relative movement of the engaging members of said clutch when driving is prevented whereby if any zero error exists in the system so that the condition is stabilized at a value other than the predetermined value, the potentiometer may be drivingly declutched from the detector and drivingly reclutched with the condition at the predetermined value and the potentiometer emitting a signal compensating for said zero error.

59. An automatic control system for maintaining an aircraft in a predetermined attitude about one of the axes of the aircraft comprising a detector for detecting deviation of the aircraft about said axis, said detector giving a mechanical indication of said deviation, a signal generator generating an alternating voltage signal reversible in phase in accordance with the displacement from a datum position of a moving part thereof, coupling means having driving and driven members to couple said detector and said moving part, a reversible, voltage phase discriminator servomotor system controlled by said alternating voltage signal and controlling the appropriate control surface of the aircraft, means for effecting driving through and preventing driving through the engaging members of said coupling means, means for ensuring that the signal does not vary upon driving being prevented through said coupling and during such time as driving is prevented, and means for causing relative movement of said members when driving is prevented whereby, if any zero error exists in the system so that the aircraft is stabilized at an attitude other than the predetermined attitude, the generator may be effectively uncoupled from the detector and effectively recoupled with the aircraft in the predetermined attitude and the generator emitting an alternating voltage signal compensating for said zero error.

60. An automatic control system as claimed in claim 59 in which said generator is an electrical potentiometer and said motor control system is electrical.

61. An automatic control system for maintaining a condition at a predetermined value comprising a detector giving a mechanical indication of the deviation of the condition from the predetermined value, a reversible phase variable magnitude alternating voltage signal generator mechanically coupled to said detector through a clutch and giving a signal in accordance with said deviation, an alternating voltage discriminator servo means responsive to said signal and controlling said condition, means for ensuring that the signal from the generator does not vary upon driving through said clutch being prevented and during such time as driving is prevented, whereby if any zero error exists in the system so that the condition is stabilized at a value other than the predetermined value the generator may be made nondrivable from the detector and drivable therefrom with the condition at the predetermined value and the generator emitting a signal compensating for said zero error.

62. In combination in an automatic control system for maintaining a condition at a desired value, a directional gyro arranged to detect deviations of said condition from said value, a potentiometer having a movable arm and providing a signal varying in magnitude with said deviation, drive means having a clutch connecting said arm and said gyro and connected to move said arm in response to said gyro, said arm being constructed to remain stationary upon driving through said clutch means being prevented and indicate zero error voltage signal in the system upon return of said condition to said value whereby said condition can be stabilized at a value representing the algebraic sum of said desired value and any zero error.

63. Control apparatus for an aircraft comprising: means responsive to deviation of the craft about its turn axis; power means for tilting the craft about the roll axis for effecting bank turns of the craft about said turn axis; pickoff means operated by said deviation means for supplying a voltage proportional to the extent of deviation; follow-up pickoff means driven by said power means for supplying a voltage in proportion to the extent of operation of said power means; means energized by said deviation pickoff for varying the relative magnitudes of utilized portions of said pickoff voltages; and means operated by said relatively varied pickoff voltages for controlling said power means.

64. In an automatic pilot for an aircraft having movable bank attitude and pitch attitude changing means thereon, a servomotor operating said bank attitude changing means; a servomotor operating said pitch attitude changing means; means providing a fixed vertical reference for said craft; bank and pitch signal pickoffs operable by said vertical reference for producing variable magnitude electrical signals in response to a displacement in bank or pitch of said craft; motor control means operated by said bank and pitch signals and adapted to operate said servomotors intermittently or continuously to effect displacement of said attitude changing means at a rate in accordance with the magnitude of said signals, whereby said craft is caused to return to a predetermined attitude.

65. In an automatic pilot for an aircraft having turn position changing means and bank position changing means for changing the attitude of said craft about the turn and bank axes thereof, in combination: position-maintaining means for detecting movement of the craft about said turn and bank axes; a turn control servomotor means and a bank control servomotor means for moving the turn position changing means and bank position changing means respectively; control means associated with each servomotor means for controlling each servomotor means, each said control means comprising a pickoff voltage controller and a follow-up voltage controller, each of said voltage controllers having a control member adjustable in either direction from a normal position; means including said pickoff and said follow-up voltage controllers and including connections to a source of alternating voltage power for producing a resultant alternating current voltage, the magnitude and phase of which varies in accordance with the algebraic sum of the directions and amounts of movements of said control members from their normal position; phase sensitive means responsive to the phase and magnitude of said resultant alternating current voltage for controlling the speed and direction of movement of the associated servomotor means in accordance with the magnitude of and the phase of said voltage with respect to the power source; means actuated by said position-maintaining means for actuating the control member of said pickoff voltage controller to affect the magnitude and phase of said resultant voltage in accordance with the extent and direction of relative deviation of the craft and the position-maintaining means; and means responsive to movement of the control surface for actuating the control member of said follow-up voltage controller in a direction to reduce the magnitude of said resultant voltage, said control means for said turn control and bank control servomotor means thus being effective to maintain the aircraft in a stabilized attitude about both the turn and roll axes, and voltage changing means controlled by a single manual operator for simultaneously changing the value of said resultant alternating voltage in connection with each of said servomotor means to cause a banked turn of said craft.

66. In an automatic steering system for a vehicle having a control surface movable with respect thereto for controlling said vehicle about an axis thereof, in combination: a servomotor operating said surface; reference means on said vehicle; a pickoff operated by said reference means for generating a signal in response to a departure of said vehicle from a predetermined position to energize said motor, said pickoff including departure rate means responsive to operation rate of said reference means modifying the magnitude of said signal for modifying operation of said servomotor.

67. In control apparatus for an aircraft having a control surface movable with respect thereto for controlling said craft about an axis thereof in combination: a servomotor operating said surface; reference means on said craft; a pickoff having one part controlled by said reference means and another part by said craft for generating a signal in response to a departure of said craft from a predetermined position relative to said reference means to energize said motor; and a time delay device interconnecting the two parts of said pickoff for modifying the operation thereof in accordance with the departure rate.

68. Control apparatus for an aircraft having a rudder comprising: course responsive means; a pickoff comprising a member operated by said responsive means in accordance with the extent of and the rate of operation thereof and a member connected to said craft; means controlled solely by the relative displacement with respect to each other of the members of said pickoff for providing a control signal of a magnitude and sense that is in accordance with the magnitude of deviation and rate of deviation of the aircraft from a desired course; motor control amplifier means including a pair of operation direction control windings operatively energized in accordance with the sense of the control signal; a motor positioning said rudder; means responsive to one or the other energized windings for controlling the direction of rotation of said motor; follow-up means operated by said motor for supplying a signal; and means summing said control and follow-up signals and connected to said amplifier.

69. The apparatus of claim 68; and a manually controlled third pickoff supplying a signal to said combining means to change craft course.

70. In an automatic pilot for aircraft, in combination: a heading change responsive device; a roll attitude change responsive device; aileron servomotor means controlled from both of said devices whereby the craft is banked in accordance with the magnitude of heading change; rudder servomotor means; means for producing a signal resulting from craft movement about the bank axis due to operation of said aileron; and further means controlling said rudder servomotor means from said signal.

71. Control apparatus for an aircraft provided with ailerons and a rudder, said apparatus comprising: aileron servo means; rudder servo means; course change responsive control means comprising a movable member; a first signal generator controlled by said member and developing an electrical signal in accordance with the movement of said member; an aileron servo signal generator operated by said aileron servo means; a first signal combining and responsive means controlled by a resultant signal from said first and aileron servo operated signal generators for controlling the operation of said aileron servo means; a second signal generator providing a signal in accordance with the movement of said movable member; a rudder servo signal generator operated by said rudder servo means; a second signal combining and responsive means controlled by a resultant signal from said second and rudder servo operated generators for controlling said rudder servo means; and means for modifying the relative portion of the signals from the first and second signal generators applied to their signal responsive means to correlate the amount of aileron to rudder displacement.

72. The apparatus of claim 71, wherein one of said servo means is additionally controlled in accordance with the course change rate of said craft.

73. The apparatus of claim 71, bank attitude responsive means; and means for additionally controlling said first signal combining and responsive means from said bank attitude means for limiting the bank attitude of said craft.

74. Control apparatus for an aircraft comprising: a rudder power means; an aileron power means; a first control means for said rudder power means; a second control means for said aileron power means, each control means including a balanceable electric system having a controller operable in one or the other direction from a normal position to unbalance the system and initiate control means operation; a manually operable member; means controlling the operation of the controller in the control means for the aileron power means from said manual member to alter bank attitude; and further means controlling the operation of said controller in the control means for the rudder power means from said manual member, the arrangement being such that when the right aileron is moved from its normal position, the rudder surface is moved from its normal position.

75. Flight control apparatus for an aircraft having a rudder, an elevator, and aileron control surfaces, said apparatus comprising: a rudder servomotor, an elevator servomotor, and an aileron servomotor; three control devices operated in accordance with the tilt of said aircraft about its longitudinal axis, means controlling said aileron servomotor from one control device to stabilize craft attitude about the longitudinal axis; further means controlling said elevator surface from a second control device to prevent loss of altitude during longitudinal stabilization; and additional means controlling said rudder servomotor from a third control device to resist yaw of the craft during displacement of the aileron servomotor during longitudinal stabilization.

76. In an automatic pilot for aircraft having servomotor means and ailerons operable thereby for controlling the roll attitude of the craft, a craft heading reference means, a servomotor control means operated by said heading reference means for producing a first signal voltage having a magnitude of potential and a sense in accordance with the magnitude and direction of craft deviation from a selected heading, and manually operable means remote from said reference means producing a second signal voltage having a magnitude of potential and a sense in accordance with the extent and direction of operation of the operable means and electrically summed with said first signal for modifying said first signal to thereby effect a bank and thus a turn of said craft at a commanded rate in accordance with the difference of said signals to effect the turn of the craft toward a desired new course.

77. In an automatic pilot for aircraft provided with roll attitude changing means, in combination: course change responsive means for normally controlling the roll attitude changing means to maintain the craft against deviation from a prescribed course during linear flight; selective turn means comprising a normally balanced signal generating device for developing when unbalanced a signal to actuate the roll attitude changing means and thereby change the course independently of said change responsive means; means for unbalancing said signal generating device; and remote means controlled by said means for unbalancing for making the course change responsive means ineffective on said attitude changing means.

78. In a control system for an aircraft having a movable control surface arranged to turn said craft about an axis, means generating a first signal proportional to the displacement of said control surface from a normal position; course change rate means responsive to the rate of turn of said craft about said axis for generating a second signal; servo means responsive to said two signals for moving said surface; selective turn means operating said servo means to effect an ordered turn about said axis; and means for making the course change rate responsive means ineffective on said control surface during ordered turns resulting from operation of the selective turn means.

79. Flight control apparatus for an aircraft having aileron and rudder control surfaces movable with respect to said aircraft to effect change in angular positions of said aircraft, said apparatus comprising: heading sensing means responsive to the amount of deviation of said aircraft from a predetermined angular position with reference to one axis, first motor means operating said rudder surface, control means operated by both said heading sensing means and said first motor means and controlling said first motor means so that said motor means operates in accordance with the heading deviation sensed, attitude sensing means responsive to the amount of angular deviation of said aircraft about a second axis, second motor means operating said ailerons, a second control means operated by both said attitude sensing means and said second motor means and controlling said second motor means so that said motor means is controlled in accordance with the response of said attitude sensing means, a manually operable control member having a normal ineffective position, first means operated during displacement of said control member away from said normal position for effectively removing said heading sensing means from control of said first motor means, and further means operated by displacement of said manually operable control member away from said normal position and operating both said control means, and means for varying the relative control of said further means in said two control means for a predetermined movement of said control member.

80. Flight control apparatus for an aircraft having aileron and rudder control surfaces movable with respect to said aircraft to control the angular positions of said aircraft with reference to two predetermined axes thereof, said apparatus comprising: course sensing means responsive to deviations in course of said aircraft; attitude sensing means responsive to deviation of said aircraft about one of said axes; motor means operating said ailerons; means operatively connecting both said course sensing means and said attitude sensing means to said aileron motor means so that said ailerons are controlled by both sensing means; motor means operating said rudder surface; a manual control member having a normal ineffective position; first means operated by displacement of said manual control member from said normal position for removing said course sensing means from control of said aileron motor means; further means operated by displacement of said control member from normal position for controlling said aileron motor means; and means operated during change in aircraft roll attitude due to said displaced ailerons for controlling said rudder motor means.

81. Flight control apparatus for an aircraft having aileron and rudder control surfaces, said apparatus comprising: heading sensing means responsive to the extent of deviation in heading of said aircraft in a horizontal plane from a predetermined direction; roll attitude sensing means responsive to the extent of deviation in roll of said aircraft; motor means operating said ailerons; means operatively connecting said heading sensing means and attitude sensing means to said aileron motor means so that said ailerons are controlled by said two sensing means; a second means dependent upon the rate and direction of deviation in heading; motor means operating said rudder surface; means operatively connecting said second sensing means and said rudder motor means so that said rudder motor means is controlled by said second sensing means; a manual control member having a normal ineffective position; first means operated by displacement of said control member from normal position for effectively removing said heading sensing means from control of said aileron motor means; further means controlled by said control member for controlling said aileron motor means; and means responsive to roll of said craft due to operation of said ailerons, operating said rudder motor means.

82. Flight control apparatus for an aircraft having aileron and rudder control surfaces movable with respect to said aircraft to control the angular position of said aircraft with reference to two predetermined axes thereof, said apparatus comprising: course sensing means responsive to the amount of angular deviation of said aircraft from course; motor means operating said aileron surfaces; means operatively connecting said course sensing means and said aileron motor means so that said motor means is controlled by said course sensing means; a second means providing a signal dependent both upon the rate and direction of said course deviation; motor means operating said rudder surface; means operatively connecting said second means and said rudder motor means so that said rudder motor means is controlled by said second means; a manual course change member having a normal ineffective position; first means operated by displacement thereof for effectively removing said heading sensing means from control of said aileron motor means; further means operated by said manual member for operating said aileron motor means to cause bank of said craft; and means responsive to a function of the angular change in bank of said craft for controlling said rudder motor means.

83. Flight control apparatus for controlling the pitch attitude of an aircraft comprising: pitch attitude responsive means; a first electrical voltage controller operated by said responsive means in either direction from a normal position to provide a signal of a magnitude and sense in accordance with change in craft pitch attitude; motor means controlled by said voltage controller for operating pitch attitude changing means of the craft; a second voltage controller operable upon banking of the aircraft from a normal position in either direction to provide a voltage control effect of varying magnitude but of a single phase or sense irrespective of the direction of movement of said second voltage controller from normal position; and means for modifying the operation from the first controller of said attitude changing means by said second voltage controller.

84. In flight control apparatus for an aircraft having means to place said craft in a banked turn, further means to prevent loss of altitude of the craft in a banked turn comprising in combination: a control device operable from a normal position in one or the other of two directions; a voltage providing device operated by said control device and providing a variable magnitude signal of a single sense or direction irrespective of the direction of operation from the normal position of said control device; elevator actuator means; and means for controlling said elevator actuator means from said voltage providing device.

85. An automatic pilot for an aircraft having movable bank attitude changing means and pitch attitude changing means thereon, said automatic pilot comprising a servomotor operating said bank attitude changing means; a servomotor operating said pitch attitude changing means; attitude means defining fixed references for said craft; bank and pitch attitude signal takeoff means on said attitude means for producing electrical signals in response to a bank or pitch of said craft to operate said servo motors to actuate said attitude changing means whereby said craft is caused to return to a predetermined attitude in bank and to a predetermined attitude in pitch; means connected for operation by said bank attitude changing means servomotor for producing a follow back electrical electrical signal upon movement of said bank attitude changing means for mixing with the bank signal to modify operation of said bank changing means motor; means connected for operation by said pitch attitude means motor for producing a follow back electrical signal upon movement of said pitch attitude means for mixing with the pitch signal to modify operation of said pitch attitude changing means motor; manually controlled means movable in either of two directions from a normal position for producing a further electrical signal to operate said bank attitude means motor to cause banking of said craft in a direction dependent upon movement of said manually controlled means from normal position; and further means effective during banking of said aircraft resulting from operation of said manually controlled means to supply a further electrical signal to operate said pitch attitude means motor tending to cause upward change of pitch attitude regardless of the direction of operation of said manually controlled means.

86. Flight control apparatus for an aircraft comprising: a course control pickoff; bank control motor means connected to said pickoff and controlled thereby for placing said aircraft in a banked attitude; a second pickoff responsive to the bank of the craft; means controlled by said second pickoff for opposing loss in altitude of the aircraft while said aircraft is in said banked attitude; and means modifying the controlling effect of said second pickoff on said means controlled thereby.

87. Control apparatus for an aircraft comprising: a manually operable controller; motor means connected to said controller and controlled thereby and displacing ailerons and rudder surfaces for placing said aircraft in a banked turn; and additional means controlled by the banking of the aircraft for operating the rudder and elevator surfaces of the craft so that as said craft is banked the rudder surface is moved about its axis to decrease its displacement and the elevator surface is moved upwardly about its axis.

88. A navigating system for aircraft, having bank attitude changing means and turn axis attitude changing means, whereby the craft may be caused to approach and thereafter maintain a chosen course, said system comprising means for obtaining a signal proportional to the error between the present craft course and the desired course, means for limiting the maximum value of said signal to some predetermined value, means for obtaining a signal corresponding to the angle of bank of the craft, and means connected to receive said signals for supplying two outputs at least partially in accordance with the algebraic sum thereof; means controlling separately from each output one of the attitude changing means; and means altering, for a given course error, the amount of limited signal used in one output.

89. The system according to claim 6, wherein said pair of control devices together develop an electrical signal variable both in sense and magnitude in accordance with the directions of deviation and extents of deviation of said aircraft from a predetermined angular position with respect to said pair of axes.

90. The system according to claim 16, wherein the pair of control devices together develop an electrical signal variable in magnitude and variable in sense in accordance with the magnitude of and direction of movements of the craft about said axes.

91. The system according to claim 20, wherein the control device provides an electrical signal variable in both sense and magnitude in accordance with the direction of deviation and extent of deviation of said craft from the predetermined angular position.

92. The automatic pilot according to claim 54, wherein each of the pair of means provides an electrical signal variable both in sense and magnitude, one signal being responsive to the direction and magnitude of turning movement about said one axis the other being responsive to the direction and magnitude of turning movement about said second axis.

93. An automatic steering system for an aircraft, comprising a servomotor for operating the rudder of said craft, yaw reference means responsive to the rate of turning of said craft for actuating said servomotor by a signal, roll reference gyro means for developing a signal corresponding to the roll attitude of said craft, and means connecting said roll reference means and the yaw reference means to said servomotor for actuating the latter by a summation of the signals.

94. An automatic pilot system for an aircraft, comprising a servomotor connected to the rudder of said craft for applying a moment of force about its yaw axis, gyro reference means responsive to displacement of the craft about its roll axis, said craft being subject to the development of a moment about the yaw axis during displacement about the roll axis, and means connecting said reference means and said servomotor for operating the latter to apply a moment in opposition to said inherent moment.

95. In an automatic pilot for aircraft: a positional reference device; servomotor means for positioning said craft; and control means for said servomotor means including two relatively movable elements for producing a signal upon relative displacement thereof, means connecting one of said relatively movable elements to said reference device for operation thereby, means connecting the other element to the craft for movement therewith, said first connecting means including a first movable member and a second member movably attached to the first movable member, motion retarding means connected between said second movable member and said craft, and centering means connected between said first and second movable members and effective for minimizing the effect of said retarding means on said second member for slow movement of said first and second members but causing movement of said second member relative to said first member in accordance with the speed of movement of said first member for the more rapid movements of said first member, the relative movement of said relatively movable elements thus being a function of both the amount and rate of operation of said positional reference device.

96. A flight control apparatus for an aircraft, said apparatus comprising: aileron control surface power means; reference means; a pair of control devices each comprising two relatively movable parts with one part of each device operated by said reference means in accordance with the movements of said aircraft about a pair of mutually perpendicular axes and with one part of each control device adapted to be energized from a source of electrical current, whereby each of said control devices is associated with one of said axes and provides an electrical signal having a magnitude in proportion to the displacement of said craft about said axis; means for directly combining the signals from said control devices in opposing relation and obtaining a resultant voltage; voltage divider ratio means in the combining means for controlling the relative magnitude of the signals from said control devices that are combined and thus controlling their relative authority; an amplifier connected to said combining means and controlled by said resultant voltage; and means connecting said amplifier in controlling relation to said aileron control surface power means.

97. In control apparatus for an aircraft having craft roll tilt changing means and craft pitch tilt changing means: reference means having roll pickoff means responsive to changes in roll attitude of said craft; and means connected to the roll pickoff means and thus controlled by said roll attitude responsive means for operating both said roll tilt and pitch tilt changing means in accordance with roll attitude.

98. Control apparatus for an aircraft having roll tilt changing means, said apparatus comprising: roll tilt responsive means having roll attitude pickoff means providing a craft roll tilt signal; motor means operating said roll tilt changing means; means connecting said roll pickoff means in controlling relation to said motor means for operation thereof in accordance with the roll tilt signal from said roll tilt responsive means; a second motor means connected to the roll pickoff means in a manner to be controlled by said roll tilt signal from the roll tilt responsive means; and means operated by said second motor means for opposing loss in altitude of the craft while said craft is tilted about the roll axis.

99. The apparatus of claim 98, and auxiliary means controlled at least in part by said roll tilt responsive means and operating a yaw control surface of the craft to oppose movement thereof about its vertical axis while said craft is tilted about the roll axis.

100. In an automatic pilot for aircraft provided with craft turn changing means and roll attitude changing means, in combination: course change responsive means and roll tilt responsive means for normally controlling the roll attitude changing means to proportion roll tilt to course change and also jointly operate the craft turn changing means to maintain the craft against deviation from a prescribed course during linear flight, selective turn means for developing a signal to actuate the roll attitude changing means and craft turn changing means and thereby change the craft course independently of said course change responsive means, means for operating the selective turn means, and means including an electric circuit controlled by said operating means for making the course change responsive means ineffective on said roll attitude changing means.

101. The apparatus of claim 77 wherein said aircraft is also provided with craft turn changing means, means responsive to rate of course change of the craft, and means operating the craft turn changing means from the rate of course change responsive means.

102. Control apparatus for an aircraft having an elevator surface comprising: a course control signal generator; means including a motor controlled thereby for placing said aircraft in a banked turn; means responsive to the bank of said craft in either direction providing a bank attitude signal; and second means including a motor controlled by the bank attitude signal from said bank responsive means operating the elevator unidirectionally from normal for opposing loss in altitude of the craft while said craft is in said banked turn.

103. A navigation system for an aircraft having a craft attitude control device by means of which a craft may be controlled to maintain a chosen course, attitude sensing means responsive to the bank of the craft, course responsive means movable relative to the craft, a pickoff having two relatively displaceable elements, a further means connecting one pickoff element to a part such as said craft, and additional means connecting the other pickoff element to a part such as the course responsive means, one connecting means arranged for relative movement of one pickoff element and the part connected thereto, the other connecting means holding the other pickoff element fixed with respect to the part connected thereto, motion retarding means between the one pickoff element and the part connected to the fixed pickoff element, and centering means between the one pickoff element and the part connected thereto whereby the pickoff is responsive to the departure and rate of departure of the craft from a chosen course, and means responsive to said attitude sensing means and to said pickoff operating the craft attitude control device to alter the craft course whenever the craft is off the desired course until the craft is back on the desired course.

104. The apparatus according to claim 97, with the reference means, roll pickoff means and the means connected thereto controlling said roll tilt changing means by an electrical signal variable both in sense and magnitude with the direction and extent of changes in roll attitude.

105. In an aircraft having ailerons and a rudder, said ailerons and rudder each having a normal position, means for causing the aircraft to approach and maintain a chosen heading including a vertical reference means and a directional reference means, said directional reference means providing an error signal responsive to the difference between the actual heading of the craft and the desired heading, the vertical reference means providing an error signal responsive to deviations of the aircraft about its roll axis, actuator means for said ailerons, actuator means for said rudder, means connecting said directional reference means to said actuator means for said ailerons so that a heading error signal will cause said ailerons to be actuated from their normal position and thus cause banking and turning of the aircraft, means connecting said vertical reference means to said actuator means for said ailerons in a manner such that the heading error signal will operate to balance the roll deviation signal from the vertical reference means as the aircraft banks, and means operated in accordance with a function of the roll attitude of the aircraft connected to said actuator means for said rudder to cause operation of said rudder.

106. Apparatus as recited in claim 105 including means whereby the maximum value of the heading error signal is limited to some predetermined value.

107. Apparatus as recited in claim 105 including means operable as a function of heading error also connected in controlling relation to the actuator for the rudder.

108. Course stabilizing control apparatus for an aircraft having aileron and rudder surfaces for effecting a banked turn of the craft while stabilizing the course of the craft, including signal providing means in the apparatus for controlling the magnitude of the bank angle of the craft during the turn, the signal providing means including a first means sensing error in position between the actual course and desired course and a second means sensing change in angular position in roll of the craft from a normal position and opposed to the first means and controlling the ailerons whereby the bank angle magnitude is in accordance with the course error, means for deflecting the rudder surface at the start of the turn, and means responsive to a function of roll attitude operating to remove the rudder deflection during the turn.

References Cited in the file of this patent

UNITED STATES PATENTS

| Number | Name | Date |
|---|---|---|
| Re. 23,066 | Moseley | Dec. 21, 1948 |
| 602,709 | Vetter | Apr. 19, 1898 |
| 746,047 | Dodge | Dec. 8, 1903 |
| 1,195,660 | Dodge | Aug. 22, 1916 |
| 1,326,945 | Macy | Jan. 6, 1920 |
| 1,703,280 | Minorsky | Feb. 26, 1929 |
| 1,743,545 | Helpbringer | Jan. 14, 1930 |
| 1,801,948 | Boykow | Apr. 21, 1931 |
| 1,826,013 | Meredith | Oct. 6, 1931 |
| 1,869,840 | Boykow | Aug. 2, 1932 |
| 1,942,470 | Bassett | Jan. 9, 1934 |
| 1,958,258 | Alexanderson | May 8, 1934 |
| 1,999,528 | Rouse | Apr. 30, 1935 |
| 2,005,530 | Boykow | June 18, 1935 |
| 2,109,776 | Johnson | Mar. 1, 1938 |
| 2,126,243 | Busse et al. | Aug. 9, 1938 |
| 2,153,217 | Van Der Mark | Apr. 4, 1939 |
| 2,162,862 | Protzen | June 20, 1939 |
| 2,179,448 | Dome | Nov. 7, 1939 |
| 2,190,390 | Thiry | Feb. 13, 1940 |
| 2,196,385 | DeFlorez et al. | Apr. 9, 1940 |
| 2,205,610 | Van Nes | June 25, 1940 |
| 2,208,400 | Steinmetz | July 16, 1940 |
| 2,217,254 | Langgasser | Oct. 8, 1940 |
| 2,232,077 | Rosecky | Feb. 18, 1941 |
| 2,234,326 | Tiebel | Mar. 11, 1941 |
| 2,238,300 | Zand et al. | Apr. 15, 1941 |
| 2,246,686 | Jones | June 24, 1941 |
| 2,263,497 | Harrison | Nov. 18, 1941 |
| 2,270,875 | Hanson et al. | Jan. 27, 1942 |
| 2,273,275 | Kutzler | Feb. 17, 1942 |
| 2,283,754 | Matthews | May 19, 1942 |
| 2,286,561 | Meredith | June 16, 1942 |
| 2,289,947 | Wills | July 14, 1942 |
| 2,336,994 | MacKay | Dec. 14, 1943 |
| 2,351,977 | Kronenberger et al. | June 20, 1944 |
| 2,364,128 | Carlson | Dec. 5, 1944 |
| 2,369,131 | Braddon et al. | Feb. 13, 1945 |
| 2,398,421 | Frische et al. | Apr. 16, 1946 |
| 2,401,168 | Kronenberger | May 28, 1946 |
| 2,401,354 | Holt | June 4, 1946 |
| 2,410,468 | Van Auken | Nov. 5, 1946 |
| 2,415,429 | Kellogg et al. | Feb. 11, 1947 |
| 2,415,819 | Halpert et al. | Feb. 18, 1947 |
| 2,446,567 | White et al. | Aug. 10, 1948 |
| 2,496,809 | Moseley | Feb. 7, 1950 |

FOREIGN PATENTS

| Number | Country | Date |
|---|---|---|
| 379,109 | Great Britain | Aug. 25, 1932 |
| 515,123 | Great Britain | Nov. 27, 1939 |